US012812287B2

(12) United States Patent
Li et al.

(10) Patent No.: US 12,812,287 B2
(45) Date of Patent: Nov. 24, 2026

(54) SPEAKER DEVICE

(71) Applicant: SHENZHEN SHOKZ CO., LTD., Guangdong (CN)

(72) Inventors: Chaowu Li, Shenzhen (CN); Yongjian Li, Shenzhen (CN); Yueqiang Wang, Shenzhen (CN); Zhuyang Jiang, Shenzhen (CN); Fen You, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 101 days.

(21) Appl. No.: 18/744,678

(22) Filed: Jun. 16, 2024

(65) Prior Publication Data

US 2024/0340570 A1 Oct. 10, 2024

Related U.S. Application Data

(63) Continuation of application No. 18/320,170, filed on May 18, 2023, which is a continuation of application (Continued)

(30) Foreign Application Priority Data

Jan. 5, 2019 (CN) ......................... 201910009874.6
Jan. 5, 2019 (CN) ......................... 201910009887.3
Jan. 5, 2019 (CN) ......................... 201910009927.4

(51) Int. Cl.
*H04R 1/10* (2026.01)
*H04R 1/1025* (2026.01)

(52) U.S. Cl.
CPC ......... *H04R 1/1066* (2013.01); *H04R 1/1008* (2013.01); *H04R 1/1025* (2013.01);
(Continued)

(58) Field of Classification Search
CPC .... H04R 1/1008; H04R 1/1025; H04R 1/105; H04R 1/1041; H04R 1/1066; H04R 1/1075; H04R 2460/13; H04R 1/345
See application file for complete search history.

(56) References Cited

U.S. PATENT DOCUMENTS

| | | |
|---|---|---|
| 4,564,955 A | 1/1986 | Birch et al. |
| 5,369,857 A | 12/1994 | Sacherman et al. |

(Continued)

FOREIGN PATENT DOCUMENTS

| | | |
|---|---|---|
| CN | 1722910 A | 1/2006 |
| CN | 201063827 Y | 5/2008 |

(Continued)

OTHER PUBLICATIONS

International Search Report in PCT/CN2019/102400 mailed on Nov. 22, 2019, 8 Pages.

(Continued)

*Primary Examiner* — Kile O Blair
(74) *Attorney, Agent, or Firm* — METIS IP LLC

(57) ABSTRACT

The present disclosure relates to a speaker device. The speaker device may include a core housing, a circuit housing, an ear hook, and a housing sheath. The core housing may be configured to accommodate an earphone core. The circuit housing may be configured to accommodate a control circuit or a battery. The control circuit or the battery may be configured to drive the earphone core to vibrate to produce sound. The ear hook may be configured to connect the core housing with the circuit housing. The housing sheath may at least partially cover the circuit housing and the ear hook. The housing sheath may include waterproof material. The waterproof effect of a speaker device may be improved through sealed connections between various components of the speaker device in this the present disclosure.

20 Claims, 25 Drawing Sheets

Related U.S. Application Data

No. 17/450,456, filed on Oct. 8, 2021, now Pat. No. 11,678,102, which is a continuation of application No. 17/218,204, filed on Mar. 31, 2021, now Pat. No. 11,159,877, which is a continuation of application No. PCT/CN2019/102400, filed on Aug. 24, 2019.

(52) U.S. Cl.
CPC .......... *H04R 1/1041* (2013.01); *H04R 1/105* (2013.01); *H04R 1/1075* (2013.01); *H04R 2460/13* (2013.01)

(56) References Cited

U.S. PATENT DOCUMENTS

| | | | |
|---|---|---|---|
| 6,385,325 | B1 | 5/2002 | Nageno et al. |
| 9,742,887 | B2 | 8/2017 | Hosoi et al. |
| 9,967,646 | B2 | 5/2018 | Hankey et al. |
| 10,154,334 | B1 | 12/2018 | Lin et al. |
| 2001/0002928 | A1 | 6/2001 | Cummins |
| 2003/0031336 | A1 | 2/2003 | Harrison et al. |
| 2004/0032964 | A1 | 2/2004 | Liang |
| 2004/0141628 | A1 | 7/2004 | Villaverde et al. |
| 2007/0291971 | A1 | 12/2007 | Halteren |
| 2008/0025541 | A1 | 1/2008 | Watanuki |
| 2010/0061583 | A1 | 3/2010 | Taenzer et al. |
| 2011/0135134 | A1 | 6/2011 | Essabar et al. |
| 2011/0170723 | A1 | 7/2011 | Ryann |
| 2011/0194718 | A1 | 8/2011 | Ratay et al. |
| 2012/0177206 | A1 | 7/2012 | Yamagishi et al. |
| 2013/0163791 | A1 | 6/2013 | Qi et al. |
| 2013/0177193 | A1 | 7/2013 | Orzel et al. |
| 2014/0254848 | A1 | 9/2014 | Petterson et al. |
| 2014/0307891 | A1 | 10/2014 | Burgett et al. |
| 2014/0334658 | A1 | 11/2014 | Wang et al. |
| 2015/0063607 | A1 | 3/2015 | Li et al. |
| 2016/0066082 | A1 | 3/2016 | Fujise et al. |
| 2016/0373851 | A1 | 12/2016 | Prelogar et al. |
| 2016/0381472 | A1 | 12/2016 | Feeley et al. |
| 2017/0111728 | A1 | 4/2017 | Kim et al. |
| 2017/0180841 | A1 | 6/2017 | Koido et al. |
| 2017/0195768 | A1 | 7/2017 | Kim et al. |
| 2017/0195770 | A1 | 7/2017 | Cheney et al. |
| 2018/0184186 | A1 | 6/2018 | Kang et al. |
| 2019/0132689 | A1 | 5/2019 | Qi et al. |
| 2020/0221221 | A1 | 7/2020 | Zhang et al. |
| 2021/0127193 | A1 | 4/2021 | Li et al. |
| 2021/0165243 | A1 | 6/2021 | Wang et al. |
| 2021/0211795 | A1 | 7/2021 | Wang et al. |
| 2021/0219043 | A1 | 7/2021 | Li et al. |
| 2021/0329360 | A1 | 10/2021 | Li et al. |
| 2021/0329371 | A1 | 10/2021 | Li et al. |

FOREIGN PATENT DOCUMENTS

| | | | |
|---|---|---|---|
| CN | 201259657 | Y | 6/2009 |
| CN | 201298911 | Y | 8/2009 |
| CN | 201995259 | U | 9/2011 |
| CN | 202001741 | U | 10/2011 |
| CN | 202160267 | U | 3/2012 |
| CN | 202268994 | U | 6/2012 |
| CN | 202385256 | U | 8/2012 |
| CN | 202931524 | U | 5/2013 |
| CN | 103327435 | A | 9/2013 |
| CN | 203661251 | U | 6/2014 |
| CN | 104023288 | A | 9/2014 |
| CN | 203827497 | U | 9/2014 |
| CN | 204067124 | U | 12/2014 |
| CN | 204360945 | U | 5/2015 |
| CN | 204408589 | U | 6/2015 |
| CN | 204425593 | U | 6/2015 |
| CN | 204442871 | U | 7/2015 |
| CN | 204465795 | U | 7/2015 |
| CN | 204539469 | U | 8/2015 |
| CN | 105246282 | A | 1/2016 |
| CN | 204948313 | U | 1/2016 |
| CN | 204968063 | U | 1/2016 |
| CN | 205336486 | U | 6/2016 |
| CN | 205946108 | U | 2/2017 |
| CN | 206149457 | U | 5/2017 |
| CN | 206283647 | U | 6/2017 |
| CN | 304188284 | S | 6/2017 |
| CN | 206323527 | U | 7/2017 |
| CN | 206340466 | U | 7/2017 |
| CN | 107124682 | A | 9/2017 |
| CN | 107454492 | A | 12/2017 |
| CN | 107484054 | A | 12/2017 |
| CN | 107493532 | A | 12/2017 |
| CN | 207010974 | U | 2/2018 |
| CN | 207039848 | U | 2/2018 |
| CN | 207039849 | U | 2/2018 |
| CN | 207039850 | U | 2/2018 |
| CN | 207039851 | U | 2/2018 |
| CN | 207039852 | U | 2/2018 |
| CN | 207070281 | U | 3/2018 |
| CN | 207070282 | U | 3/2018 |
| CN | 207070284 | U | 3/2018 |
| CN | 108231462 | A | 6/2018 |
| CN | 207612391 | U | 7/2018 |
| CN | 108391213 | A | 8/2018 |
| CN | 207783068 | U | 8/2018 |
| CN | 209089198 | U | 7/2019 |
| CN | 209184800 | U | 7/2019 |
| CN | 209358729 | U | 9/2019 |
| JP | H1023599 | A | 1/1998 |
| JP | H1056698 | A | 2/1998 |
| JP | 2008283408 | A | 11/2008 |
| JP | 2009088607 | A | 4/2009 |
| JP | 2011114454 | A | 6/2011 |
| KR | 20040027660 | A | 4/2004 |
| KR | 100865959 | B1 | 10/2008 |
| KR | 20090036497 | A | 4/2009 |
| KR | 100921524 | B1 | 10/2009 |
| KR | 101673414 | B1 | 11/2016 |
| TW | M272344 | U | 8/2005 |
| TW | 201419337 | A | 5/2014 |
| WO | 2011025163 | A2 | 3/2011 |
| WO | 2012140921 | A1 | 10/2012 |
| WO | 2015109002 | A2 | 7/2015 |
| WO | 2018175192 | A1 | 9/2018 |

OTHER PUBLICATIONS

Written Opinion in PCT/CN2019/102400 mailed on Nov. 22, 2019, 8 Pages.

Decision on Examination of Patent Invalidation Request in Chinese Application No. 201721044773.5 mailed on Sep. 25, 2023, Case No. 564054, 29 pages.

Decision on Examination of Patent Invalidation Request in Chinese Application No. 201721044430.9 mailed on Nov. 30, 2023, Case No. 564898, 65 pages.

First Office Action in Chinese Application No. 201710716285.2 mailed on Mar. 9, 2023, 21 pages.

SPEAKER DEVICE

CROSS REFERENCE TO RELATED APPLICATIONS

This application is a continuation of U.S. application Ser. No. 18/320,170, filed on May 18, 2023, which is a continuation of U.S. application Ser. No. 17/450,456, filed on Oct. 8, 2021, now issued as U.S. Pat. No. 11,678,102 B2, which is a continuation of U.S. application Ser. No. 17/218,204, filed on Mar. 31, 2021, now issued as U.S. Pat. No. 11,159, 877 B2, which is a continuation of International Patent Application No. PCT/CN2019/102400, field on Aug. 24, 2019, which claims priority of Chinese Patent Application Nos. 201910009874.6, 201910009927.4 and 201910009887.3, all filed on Jan. 5, 2019, and the entire contents of each of which are incorporated herein by reference.

TECHNICAL FIELD

The present disclosure relates to a speaker device, and in particular, to a speaker device with waterproof function.

BACKGROUND

In general, people can hear the sound because the air transmits vibration to the eardrum through the external ear canal, and the vibration formed by the eardrum drives the human auditory nerve, and therefore people can perceive the vibration of the sound. At present, earphones are widely used in people's lives. For example, users can use earphones to play music, answer calls, etc. Earphones have become an important item in people's daily life. Generally, earphones in the market may not satisfy user's requirement in some scenes, such as swimming, outdoor rainy days, etc. An earphone with waterproof function with relatively good sound quality is more popular. Therefore, it is desirable to provide a speaker device with waterproof function.

SUMMARY

According to an aspect of the present disclosure, a speaker device is provided. The speaker device may include a core housing, a circuit housing, an ear hook, and a housing sheath. The core housing may be configured to accommodate an earphone core. The circuit housing may be configured to accommodate a control circuit or a battery. The control circuit or the battery may be configured to drive the earphone core to vibrate to produce sound. The ear hook may be configured to connect the core housing with the circuit housing. The housing sheath may at least partially cover the circuit housing and the ear hook. The housing sheath may include waterproof material.

DETAILED DESCRIPTION

Figure 1:
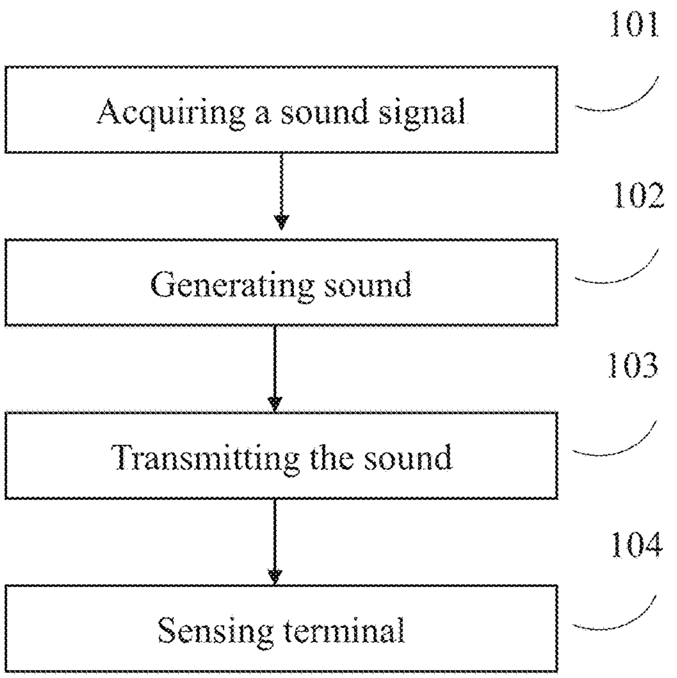
FIG. 1 is a flowchart illustrating an exemplary process for generating auditory sense through a speaker device according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless apparent from the locale or otherwise stated, like reference numerals represent similar structures or operations throughout the several views of the drawings.

As used in the disclosure and the appended claims, the singular forms "a," "an," and/or "the" may include plural forms unless the content clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements. The term "based on" is "based at least in part on. The term "one embodiment" means "at least one embodiment". The term "another embodiment" means "at least one other embodiment". Related definitions of other terms will be provided in the descriptions below. In the following, without loss of generality, the description of "speaker device", "speaker", or "headphone" will be used when describing the speaker related technologies in the present disclosure. This description is only a form of speaker application. For a person of ordinary skill in the art, "speaker device", "speaker", or "earphone" can also be replaced with other similar words, such as "player", "hearing aid", or the like. In fact, various implementations in the present disclosure may be easily applied to other non-speaker-type hearing devices. For example, for those skilled in the art, after understanding the basic principles of the speaker device, multiple variations and modifications may be made in forms and details of the specific methods and steps for implementing the speaker device, in particular, an addition of ambient sound pickup and processing functions to the speaker device so as to enable the speaker device to function as a hearing aid, without departing from the principle. For example, a sound transmitter such as a microphone may pick up an ambient sound of the user/wearer, process the sound using a certain algorithm, and transmit the processed sound (or a generated electrical signal) to a user/wearer. That is, the speaker device may be modified and have the function of picking up ambient sound. The ambient sound may be processed and transmitted to the user/wearer through the speaker device, thereby implementing the function of a hearing aid. For example, the algorithm mentioned above may include a noise cancellation algorithm, an automatic gain control algorithm, an acoustic feedback suppression algorithm, a wide dynamic range compression algorithm, an active environment recognition algorithm, an active noise reduction algorithm, a directional processing algorithm, a tinnitus processing algorithm, a multi-channel wide dynamic range compression algorithm, an active howling suppression algorithm, a volume control algorithm, or the like, or any combination thereof.

FIG. 1 is a flowchart illustrating an exemplary process for generating auditory sense through a speaker device according to some embodiments of the present disclosure. The speaker device may transfer sound to an auditory system through bone conduction or air conduction by a built-in loudspeaker, thereby generating an auditory sense. As shown in FIG. 1, the process for generating the auditory sense through the speaker device may include operations 101-104.

In 101, the speaker device may acquire or generate a signal (also referred to as a "sound signal") containing sound information. In some embodiments, the sound information may refer to a video file or an audio file with a specific data format. The sound information may refer to data or files that may be converted to be sound through specific approaches. In some embodiments, the signal containing the sound information may be obtained from a storage unit of a speaker device itself. In some embodiments, the signal containing the sound information may be obtained from an information generation system, a storage system, or a transmission system other than the speaker device. The signal containing the sound information may be not limited to an electrical signal, and may also include other forms of signals other than the electrical signal, such as an optical signal, a magnetic signal, and a mechanical signal, or the like. In principle, as long as the signal includes information that may be configured to generate sounds by speaker device, the signal may be processed as the sound signal. In some embodiments, the sound signal may not be limited to one signal source, and it may come from a plurality of signal sources. The plurality of signal sources may be independent of or dependent on each other. In some embodiments, manners of generating or transmitting the sound signal may be wired or wireless and may be real-time or time-delayed. For example, the speaker device may receive an electrical signal containing sound information via a wired or wireless connection or may obtain data directly from a storage medium and generate a sound signal. Taking bone conduction technology as an example, components with sound collection function may be added to a bone conductive loudspeaker. The bone conductive loudspeaker may pick up sound from ambient environment and convert mechanical vibration of the sound into an electrical signal. Further, the electrical signal may be processed through an amplifier to meet special requirements. The wired connection may be realized by using including but not limited to metal cables, optical cables, or hybrid cables of metal and optical, such as coaxial cables, communication cables, flexible cables, spiral cables, non-metal sheathed cables, metal sheathed cables, multi-core cables, twisted pair cables, ribbon cables, shielded cables, telecommunications cables, double-stranded cables, parallel twin-core wires, and twisted pairs. The wired connection may also be realized by using other types of transmission carriers, such as transmission carriers for electrical or optical signal.

The storage device or storage unit mentioned herein may include a direct attached storage, a network attached storage, a storage area network, and other storage systems. The storage device may include but is not limited to common types of storage devices such as a solid-state storage device (a solid-state drive, a solid-state hybrid hard drive, etc.), a mechanical hard drive, a USB flash drive, a memory stick, a storage card (e.g., CF, SD, etc.), and other drives (e.g., CD, DVD, HD DVD, Blu-ray, etc.), a random access memory (RAM), a read-only memory (ROM), etc. The storage device/storage unit mentioned above are only used for illustration purposes. The storage medium used in the storage device/storage is not limited.

In 102, the speaker device may convert the signal containing sound information into vibrations to generate a sound. The speaker device may use a specific transducer to convert the signal into mechanical vibrations accompanying with energy conversion. The conversion process may include multiple types of energy coexistence and conversion. For example, the electrical signal may be directly converted into mechanical vibrations by the transducers to generate a sound. As another example, the sound information may be included in an optical signal, which may be converted into mechanical vibrations by a specific transducer. Other types of energy that may be coexisted and converted when the transducer works may include thermal energy, magnetic field energy, or the like. In some embodiments, an energy conversion manner of the transducer may include but is not limited to, a moving coil type, an electrostatic type, a piezoelectric type, a moving iron type, a pneumatic type, an electromagnetic type, or the like. A frequency response range and sound quality of the speaker device may be affected by the energy conversion manner and a property of each physical component of the transducer. For example, in a transducer with the moving coil type, a wound cylindrical coil is connected to a vibration plate, the coil driven by a signal current drives the vibration plate to vibrate in the magnetic field, and generate a sound. Factors, such as material expansion and contraction, folds deformation, size, shape, and fixed manner of the vibration plate, the magnetic density of the permanent magnet, etc., may have a large impact on the sound quality of the speaker device.

The term "sound quality" used herein may indicate the quality of sound, which refers to an audio fidelity after post-processing, transmission, or the like. In an audio device, the sound quality may include audio intensity and magnitude, audio frequency, audio overtone, or harmonic components, or the like. When the sound quality is evaluated, measuring manner and the evaluation criteria for objectively evaluating the sound quality may be used, other manners that combine different elements of sound and subjective feelings for evaluating various properties of the sound quality may also be used. Thus, the sound quality may be affected during the processes of generating the sound, transmitting the sound, and receiving the sound.

In 103, the sound is transmitted by a transmission system. In some embodiments, the transmission system refers to a substance that can deliver vibration signals containing sound information, such as the skull, bony labyrinth, inner ear lymph, and spiral organs of humans or/and animals with auditory systems. As another example, the transmission system also refers to a medium that may transmit sound (e.g., air and liquid). To illustrate the process of transmitting sound information by the transmission system, a bone conductive loudspeaker may be taken as an example. The bone conductive loudspeaker may directly transmit sound waves (vibration signals) converted from electrical signals to an auditory center through bones. In addition, the sound waves may be transmitted to the auditory center through air conduction. For the content of air conduction, please refer to the description elsewhere in the specification.

In 104, the sound information is transmitted to a sensing terminal. Specifically, the sound information is transmitted to the sensing terminal through the transmission system. In a working scenario, the speaker device picks up or generates a signal containing sound information, converts the sound information into a sound vibration by the transducer. The speaker device transmits the sound to the sensing terminal through the transmission system, and finally a user can hear the sound. Generally, the subject of the sensing terminal, the auditory system, the sensory organ, etc. described above may be a human or an animal with an auditory system. It should be noted that the following description of the speaker device used by a human does not constitute a restriction on the use scene of the speaker device, and similar descriptions may also be applied to other animals.

Figure 2:
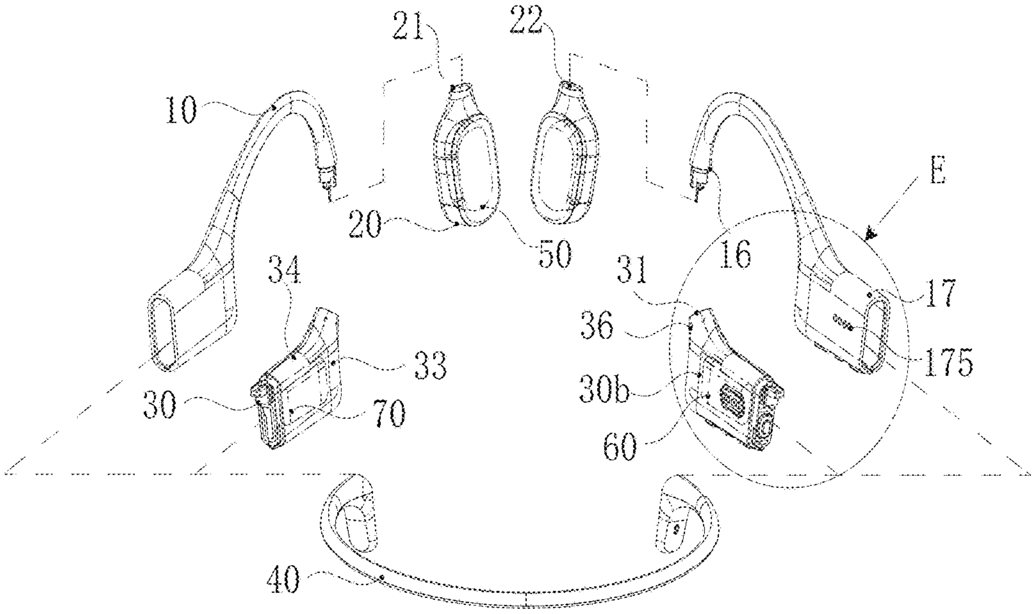
FIG. 2 is schematic diagram illustrating an exploded structure of an exemplary MP3 player according to some embodiments of the present disclosure.
Figure 3:
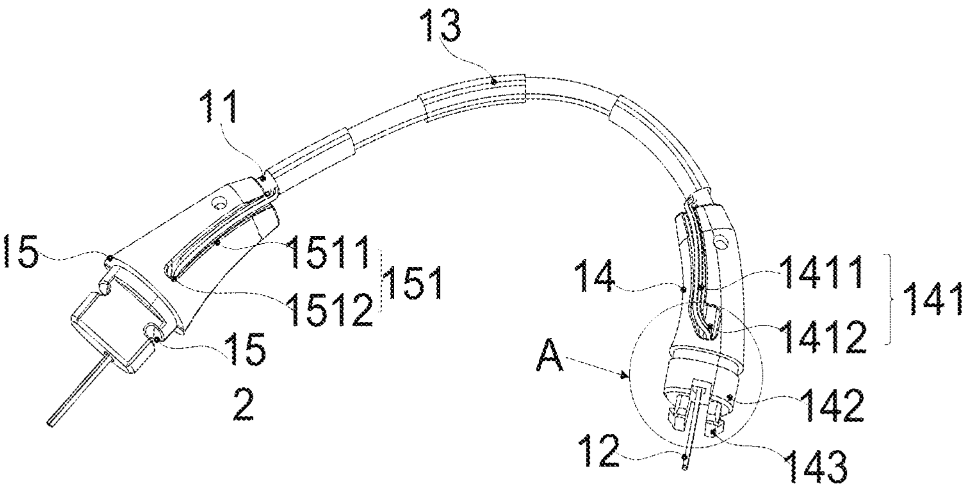
FIG. 3 is a schematic diagram illustrating a part of a structure of an ear hook of an MP3 player according to some embodiments of the present the present disclosure.
Figure 4:
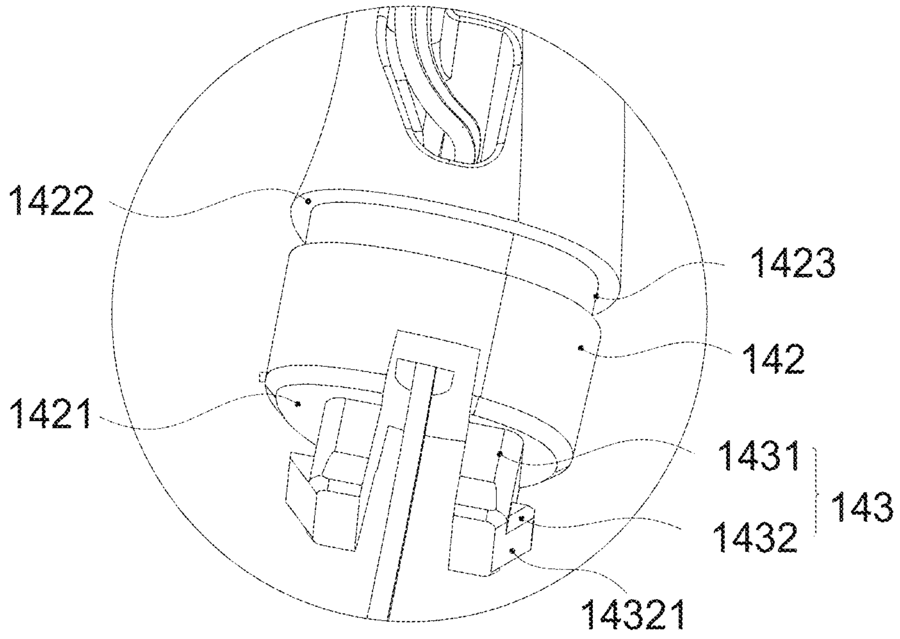
FIG. 4 is a schematic diagram illustrating a partial enlarged view of part A in FIG. 3.

The speaker device in the specification of the present disclosure may include, but is not limited to, an earphone, an MP3 player, and a hearing aid. In the following specific embodiments of the present disclosure, an MP3 player is taken as an example to describe the speaker device in detail. FIG. 2 is schematic diagram illustrating an exploded structure of an exemplary MP3 player according to some embodiments of the present disclosure. FIG. 3 is a partial structural diagram of an ear hook in an MP3 player according to some embodiments of the present disclosure. FIG. 4 is an enlarged view of part A in FIG. 3. As shown in FIG. 1, in some embodiments, an MP3 player may include an ear hook 10, a core housing 20, a circuit housing 30, a rear hook 40, an earphone core 50, a control circuit 60, and a battery 70. The core housing 20 and the circuit housing 30 are disposed at two ends of the ear hook 10 respectively, and the rear hook 40 is further disposed at an end of the circuit housing 30 away from the ear hook 10. The number of the core housings 20 is two, which are configured to accommodate two earphone cores 50 respectively. The number of the circuit housings 30 is also two, which are configured to accommodate the control circuit 60 and the battery 70 respectively. The two ends of the rear hook 40 are connected to the corresponding circuit housings 30 respectively. The ear hook 10 refers to a structure surrounding and supporting a user's ear when the user wears a bone conductive MP3 player, and then suspending and fixing the core housing 20 and the earphone core 50 at a predetermined position of the user's ear.

FIG. 3 is a schematic diagram illustrating a part of a structure of an ear hook of an MP3 player according to some embodiments of the present the present disclosure.

Referring to FIG. 2, FIG. 3, and FIG. 4, in some embodiments, the ear hook 10 may include an elastic metal wire 11, a wire 12, a fixing sleeve 13, a first plug end 14, and a second plug end 15. The first plug end 14 and the second plug end 15 may be disposed at both ends of the elastic metal wire 11. In some embodiments, the ear hook 10 may further include a protective sleeve 16 and a housing sheath 17 integrally formed with the protective sleeve 16. The elastic metal wire 11 is mainly configured to keep the ear hook 10 in a shape that matches the user's ear. The elastic metal wire 11 has a certain elasticity, so as to generate a certain elastic deformation according to the user's ear shape and head shape to adapt to users with different ear shapes and head shapes. In some embodiments, the elastic metal wire 11 may include a memory alloy, which has good deformation recovery ability. Thus, even if the ear hook 10 is deformed by an external force, it may still be restored to its original shape when the external force is removed, and continue to be used by users, thereby extending the life of the MP3 player. In other embodiments, the elastic metal wire 11 may also include a non-memory alloy.

The wire 12 may be used for electrical connection with the earphone core 50, the control circuit 60, the battery 70, etc. for power supply and data transmission for the operation of the earphone core 50. The fixing sleeve 13 may be configured to fix the wire 12 on the elastic metal wire 11. The count (the number) of fixing sleeves 13 may be any positive integer, which may be determined according to actual requirements. In this embodiment, there are at least two fixing sleeves 13. The at least two fixing sleeves 13 may be spaced apart along the elastic metal wire 11 and the wire 12, and disposed on the outer periphery of the wire 12 and the elastic metal wire 11 by wrapping to fix the wire 12 on the elastic metal wire 11.

In some embodiments, the first plug end 14 and the second plug end 15 may include hard materials, such as plastic. In some embodiments, the first plug end 14 and the second plug end 15 may be formed respectively on both ends of the elastic metal wire 11 in an injection molding manner. In some embodiments, the first plug end 14 and the second plug end 15 may be formed in an injection molding manner, separately. Connection holes to connect with the end of the elastic metal wire 11 may be respectively reserved during the injection molding of the first plug end 14 and the second plug end 15. After the injection molding is completed, the first plug end 14 and the second plug end 15 may be inserted into the corresponding ends of the elastic metal wire 11 respectively by the connection holes or fixed in a bonding manner.

In some embodiments, the first plug end 14 and the second plug end 15 may not be directly formed by injection molding on the periphery of the wire 12, which avoids the wire 12 during injection molding. Specifically, when the first plug end 14 and the second plug end 15 are injection molded, the wire 12 located at both ends of the elastic metal wire 11 may be fixed to be far away from the position of the first plug end 14 and the second plug end 15. Further, a first wiring channel 141 and a second wiring channel 151 may be disposed respectively on the plug 14 and the second plug end 15 to extend the wire 12 along the first wiring channel 141 and the second wiring channel 151 after the injection molding. Specifically, the wire 12 may be threaded into the first wiring channel 141 and the second wiring channel 151 in a threading manner after the first wiring channel 141 and the second wiring channel 151 are formed. In some embodiments, the first plug end 14 and the second plug end 15 may be directly injection molded on the periphery of the 1 12 according to actual conditions, which is not specifically limited herein.

In some embodiments, the first wiring channel 141 may include a first wiring groove 1411 and a first wiring hole 1412 connecting with the first wiring groove 1411. The first wiring groove 1411 may be connected with the side wall of the first plug end 14. One end of the first wiring hole 1412 may be connected to one end of the first wiring groove 1411 and another end of the first wiring hole 1412 may be connected to the outer end surface of the first plug end 14. The wire 12 at the first plug end 14 may extend along the first wiring groove 1411 and the first wiring hole 1412 and be exposed on the outer end surface of the first plug end 14 to further connect with other structures.

In some embodiments, the second wiring channel 151 may include a second wiring groove 1511 and a second wiring hole 1512 connecting with the second wiring groove 1511. The second wiring groove 1511 may be connected with the side wall of the second plug end 15, one end of the second wiring hole 1512 may be connected with one end of the second wiring groove 1511, and another end of the second wiring hole 1512 may be connected with the outer end surface of the second plug end 15. The wire 12 at the second plug end 15 may extend along the second wiring groove 1511 and the second wiring hole 1512 and be exposed on the outer end surface of the second plug end 15 to further connect to other structures. In some embodiments, the outer end surface of the first plug end 14 refers to the surface of the end of the first plug end 14 away from the second plug end 15. The outer end surface of the second plug end 15 refers to the surface of the end of the second plug end 15 away from the first plug end 14.

In some embodiments, the protective sleeve 16 may be injection molded around periphery of the elastic metal wire 11, the wire 12, the fixing sleeve 13, the first plug end 14, and the second plug end 15. Thus, the protective sleeve 16 may be fixedly connected with the elastic metal wire 11, the wire 12, the fixing sleeve 13, the first plug end 14, and the second plug end 15 respectively. There is no need to form the protective sleeve 16 separately by injection molding and then further wrap protective sleeve 16 around the periphery of the elastic metal wire 11, the first plug end 14, and the second plug end 15, thereby simplifying the manufacturing and assembly processes and improving the reliability and stability of the fixation of the protective sleeve 16.

In some embodiments, when the protective sleeve 16 is formed, a housing sheath 17 disposed on the side close to the second plug end 15 may be integrally formed with the protective sleeve 16. In some embodiments, the housing sheath 17 may be integrally formed with the protective sleeve 16 to form a whole structure. The circuit housing 30 may be connected to one end of the ear hook 10 by being fixedly connected to the second plug end 15. The housing sheath 17 may be further wrapped around the periphery of the circuit housing 30 in a sleeved manner. In some embodiments, the protective sleeve 16 and the housing sheath 17 may include soft material with certain elasticity, such as silica gel, rubber, or the like, or any combination thereof.

In some embodiments, the ear hook 10 may be manufactured according to the following steps.

In step S101, the fixing sleeve 13 may be used to fix the wire 12 on the elastic metal wire 11. An injection position is reserved at both ends of the elastic metal wire 11. Specifically, the elastic metal wire 11 and the wire 12 may be placed together in a preset way e.g., side by side, and the fixing sleeve 13 may be sleeved around the wire 12 and the elastic metal wire 11 to fix the wire 12 on the elastic metal wire 11. Since the two ends of the elastic metal wire 11 may need the injection molded first plug end 14 and the second plug end 15, the two ends of the elastic metal wire 11 may not be completely wrapped by the fixing sleeve 13. A corresponding injection position needs to be reserved for injection molding of the first plug end 14 and the second plug end 15.

In step S102, the first plug end 14 and the second plug end 15 may be injection molded at the injection positions of the two ends of the elastic metal wire 11, respectively. The first wiring channel 141 and the second wiring channel 151 may be disposed on the first plug end 14 and the second plug end 15, respectively.

In step S103, the wire 12 may be disposed to extend along the first wiring channel 141 and the second wiring channel 151. Specifically, after the forming of the first plug end 14 and the second plug end 15 is completed, the two ends of the wire 12 may be threaded into the first wiring channel 141 and the second wiring channel 151 manually or by a machine. A part of the wire 12 located between the first wiring channel 141 and the second wiring channel 151 may be fixed on the elastic metal wire 11 by the fixing sleeve 13.

In step S104, the protective sleeve 16 may be formed by injection molding on the periphery of the elastic metal wire 11, the wire 12, the fixing sleeve 13, the first plug end 14, and the second plug end 15. In some embodiments, when step S104 is performed, the housing sheath 17 may be integrally formed with the protective sleeve 16 on the periphery of the second plug end 15 via an injection molding manner.

In some embodiments, it should be noted that the wire 12 may not be disposed when the fixing sleeve 13 is installed. The wire 12 may be disposed after the first plug end 14 and the second plug end 15 are injection molded according to the following steps.

In step S201, the fixing sleeve 13 may be sleeved on the elastic metal wire 11. The injection molding positions may be reserved at both ends of the elastic metal wire 11.

In step S202, the first plug end 14 and the second plug end 15 may be injection molded at the injection positions of the two ends of the elastic metal wire 11, respectively. The first wiring channel 141 and the second wiring channel 151 may be disposed on the first plug end 14 and the second plug end 15, respectively.

In step S203, the wire 12 may be threaded inside the fixing sleeve 13, so as to use the fixing sleeve 13 to fix the wire 12 on the elastic metal wire 11. Further, the wire 12 may be disposed to extend along the first wiring channel 141 and the second wiring channel 151.

It should be noted that, in this way, interference of the wire 12 may be avoided during injection molding of the first plug end 14 and the second plug end 15 thereby facilitating the smooth of the molding progress.

In some embodiments, the core housing 20 may be used to accommodate the earphone core 50 and may be plugged and fixed with the first plug end 14. The count (or the number) of the earphone cores 50 and the core housings 20 may be two, which may be corresponding to the left ear and the right ear of the user, respectively. In some embodiments, the core housing 20 and the first plug end 14 may be connected in a plug manner, a clamping manner, etc., so as to fix the core housing 20 and the ear hook 10 together. In some embodiments, the ear hook 10 and the core housing 20 may be formed separately, and the ear hook 10 and the core housing 20 may be assembled instead that the ear hook 10 and the core housing 20 may be integrally formed together. In this way, the ear hook 10 and the core housing 20 may be molded separately with corresponding molds instead of using a relatively large mold to integrally form the two, which may reduce the size of the molds and the difficulty of the manufacture of the molds and the molding process. In addition, since the ear hook 10 and the core housing 20 are processed using different molds, when the shape or structure of the ear hook 10 or the core housing 20 needs to be adjusted in the manufacturing process, it is sufficient to adjust the mold corresponding to the structure instead of adjusting the mold of another one, thereby reducing the production cost. In some embodiments, the ear hook 10 and the core housing 20 may be integrally formed according to different needs.

Figure 5:
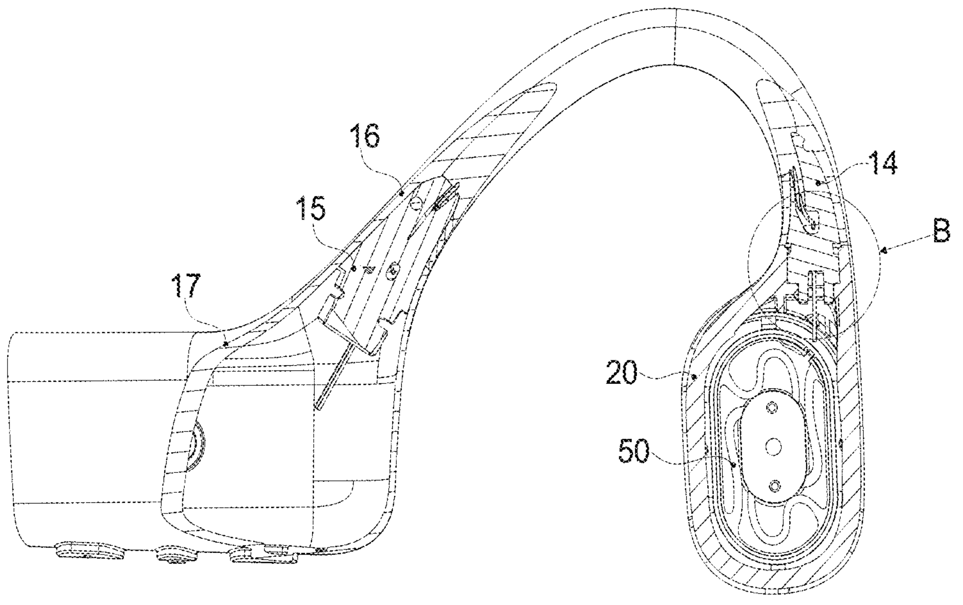
FIG. 5 is a schematic diagram illustrating a partial sectional view of an MP3 player according to some embodiments of the present disclosure.
Figure 6:
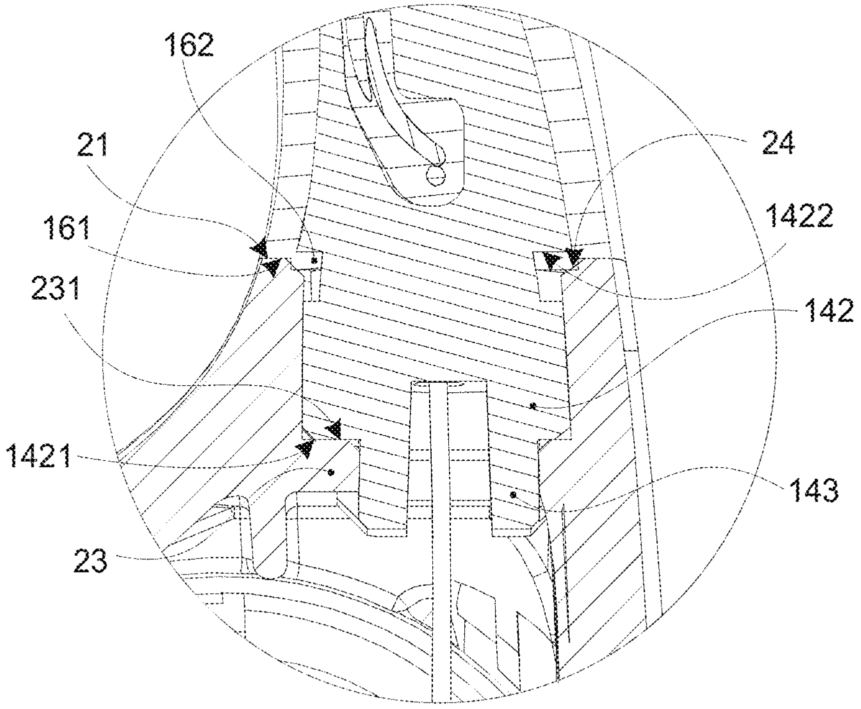
FIG. 6 is a schematic diagram illustrating a partial enlarged view of part B in FIG. 5.

FIG. 4 is a schematic diagram illustrating a partial enlarged view of part A in FIG. 3. FIG. 5 is a schematic diagram illustrating a partial sectional view of an MP3 player according to some embodiments of the present disclosure. FIG. 6 is a schematic diagram illustrating a partial enlarged view of part B in FIG. 5. Referring to FIG. 2 to FIG. 5, and FIG. 6, in some embodiments, the core housing 20 may include a first socket 22 communicating with an outer end surface 21 of the core housing 20, and a stopping block 23 may be disposed on an inner side wall of the first socket 22. The outer end surface 21 of the core housing 20 refers to an end surface of the core housing 20 facing the ear hook 10. The first socket 22 may be configured to provide an accommodating space for the first plug end 14 of the ear hook 10, which may be inserted into the core housing 20, so as to realize the plug and fixation between the first plug end 14 and the core housing 20. In some embodiments, the stopping block 23 may be formed by the inner side wall of the first socket 22 protruding in a direction perpendicular to the inner side wall. Specifically, the stopping block 23 may include a plurality of block-shaped protrusions disposed at intervals. Alternatively, the stopping block 23 may be an annular protrusion extending along the inner side wall of the first socket 22, which is not limited herein.

In some embodiments, the first plug end 14 may include an insertion unit 142 and two elastic hooks 143. Specifically, the insertion unit 142 may be at least partially inserted into the first socket 22 and abut against an outer surface 231 of a stopping block 23. A shape of the outer side wall of the insertion unit 142 may match that of the inner side wall of the first socket 22, so that the outer side wall of the insertion unit 142 may abut against the inner side wall of the first socket 22 when the insertion unit 142 is at least partially inserted into the first socket 22. The outer surface 231 of the stopping block 23 refers to a side of the stopping block 23 facing the ear hook 10. The insertion unit 142 may include an end surface 1421 facing the core housing 20. The end surface 1421 may match the outer surface 231 of the stopping block 23, so that the end surface 1421 of the insertion unit 142 may abut against the outer surface 231 of the stopping block 23 when the insertion unit 142 is at least partially inserted into the first socket 22.

Specifically, a cross-sectional shape of the first socket 22 of the core housing 20 along a direction perpendicular to the insertion direction of the first plug end 14 with respect to the core housing 20 may be an elliptical ring or a substantially elliptical ring. A cross section shape of the portion 142 may be a substantially elliptical shape matching the first socket 22. In some embodiments, the cross section of the insertion unit 142 and the first socket 22 may also have other shapes, which may be determined according to actual requirements.

In some embodiments, the two elastic hooks 143 may be disposed side by side and spaced apart symmetrically on the side of the insertion unit 142 facing an inside of the core housing 20 along the direction of insertion. Each elastic hook 143 may include a beam portion 1431 and a hook portion 1432. The beam portion 1431 may be connected to a side of the insertion unit 142 facing the core housing 20. The hook portion 1432 may be disposed on the beam portion 1431 away from the insertion unit 142 and extend perpendicular to the inserted direction. Each hook portion 1432 may include a side parallel to the inserted direction and a transitional slope 14321 away from the end surface 1421 of the insertion unit 142.

In some embodiments, during the mounting of the ear hook 10 and the core housing 20, the first plug end 14 may gradually enter the core housing 20 from the first socket 22. When the first plug end 14 reaches a position of the stopping block 23, the two elastic hooks 143 may be blocked by the stopping block 23. Under the action of an external force, the stopping block 23 may gradually squeeze the transition slope 14321 of the hook portion 1432 to make the two elastic hooks 143 elastically deform and get close to each other. When the transition slope 14321 passes through the stopping block 23 and reaches the side of the stopping block 23 close to the inside of the core housing 20, the elastic hook 143 may elastically recover without blocking of the stopping block 23, and the elastic hook 143 may be clamped on an inner side of the stopping block 23 facing the core housing 20. The stopping block 23 may be clamped between the insertion unit 142 and the hook portion 1432 of the first plug end 14, thereby realizing plug and fixation of the core housing 20 and the first plug end 14.

In some embodiments, after the core housing 20 and the first plug end 14 are plugged and fixed, the insertion unit 142 may be partially inserted into the first socket 22. The exposed portion of the insertion unit 142 may have a stepped structure, so as to form an annular tables 1422 spaced apart from the outer end surface 21 of the core housing 20. The exposed portion of the insertion unit 142 refers to the portion of the insertion unit 142 exposed to the core housing 20. Specifically, the exposed portion of the insertion unit 142 refers to the portion exposed to the core housing 20 and close to the outer end surface of the core housing 20.

In some embodiments, the annular table 1422 may be disposed opposite to the outer end surface 21 of the core housing 20. A space between the annular table 1422 and the outer end surface 21 may refer to a space along the direction of insertion and a space perpendicular to the direction of insertion. In some embodiments, the protective sleeve 16 may extend to the side of the annular table 1422 facing the outer end surface 21 of the core housing 20. When the first socket 22 and the first plug end 14 of the core housing 20 are plugged and fixed, the protective sleeve 16 may be at least partially filled in the space between the annular table 1422 and the outer end surface 21 of the core housing 20, and elastically abut against the core housing 20. Thus, it is difficult for external liquid to enter the inside of the core housing 20 from a junction between the first plug end 14 and the core housing 20, thereby realizing the sealing between the first plug end 14 and the first socket 22, protecting the earphone core 50, etc. inside the core housing 20, and improving the waterproof effect of the MP3 player.

Figure 7:
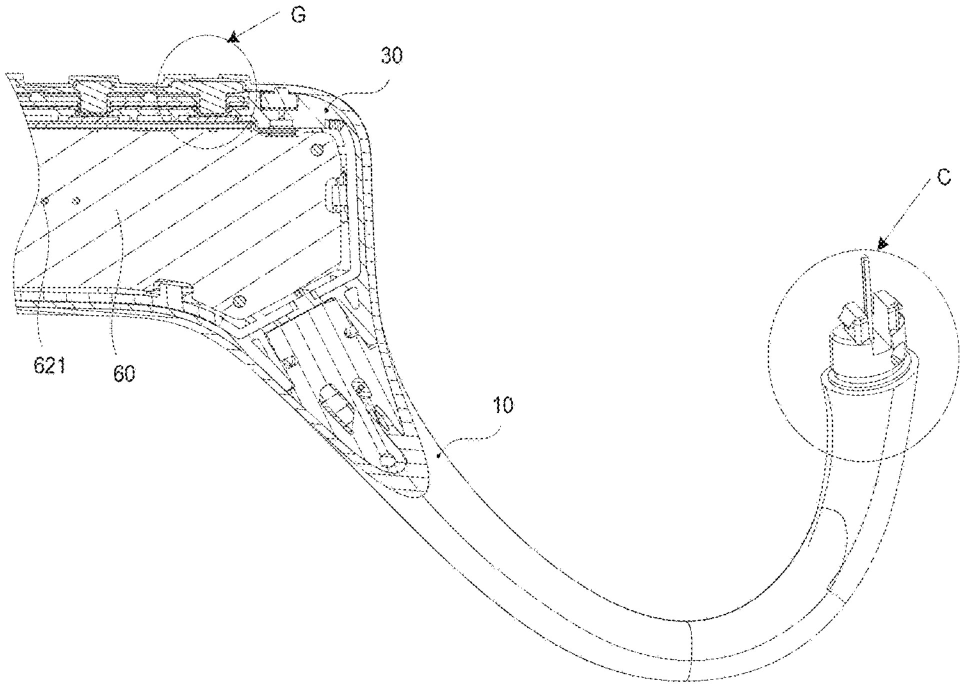
FIG. 7 is a schematic diagram illustrating a cross-sectional view of a partial structure of an MP3 player according to some embodiments of the present disclosure.
Figure 8:
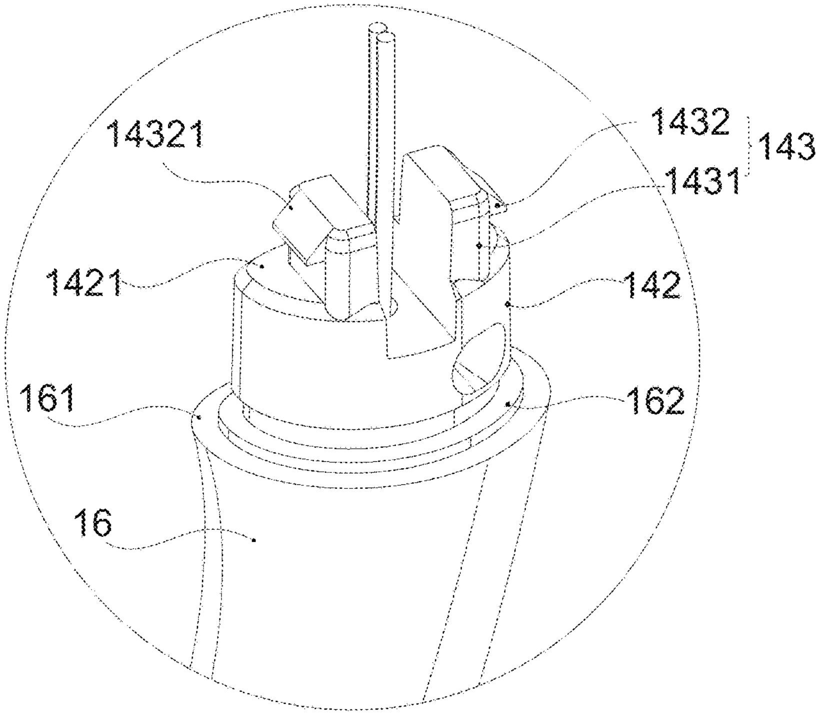
FIG. 8 is a schematic diagram illustrating a partial enlarged view of part C in FIG. 7.

FIG. 7 is a schematic diagram illustrating a cross-sectional view of a partial structure of an MP3 player according to some embodiments of the present disclosure. FIG. 8 is a schematic diagram illustrating a partial enlarged view of part C in FIG. 7. Referring to FIG. 2 to FIG. 8, in some embodiments, the protective sleeve 16 may include an annular abutting surface 161 on the outer end surface 21 of the annular table 1422 facing the outer end surface of the core housing 20. The annular abutting surface 161 may be the end surface of the protective sleeve 16 facing the core housing 20. In some embodiments, the protective sleeve 16 may further include an annular protruding table 162 locating inside the annular abutting surface 161 and protruding from the annular abutting surface 161. Specifically, the annular protruding table 162 may be formed on the side of the annular abutting surface 161 facing the first plug end 14, and may protrude toward the core housing 20 relative to the annular abutting surface 161. Further, the annular protruding table 162 may be directly formed on the periphery of the annular table 1422 and cover the annular table 1422.

In some embodiments, the core housing 20 may include a connecting slope 24 configured to connect the outer end surface 21 of the core housing 20 and the inner side wall of the first socket 22. The connecting slope 24 may be a transitional surface between the outer end surface 21 of the core housing 20 and the inner side wall of the first socket 22. The connecting slope 24 may be not on the same plane as the outer end surface 21 of the core housing 20 and the inner side wall of the first socket 22. In some embodiments, the connecting slope 24 may be a flat surface, a curved surface or other shapes according to actual requirements, which is not limited herein. Specifically, when the core housing 20 and the first plug end 14 are plugged and fixed, the annular abutting surface 161 and the annular protruding table 162 may elastically abut against the outer end surface of the core housing 20 and the connecting slope 24, respectively.

It should be noted that since the outer end surface 21 of the core housing 20 and the connecting slope 24 are not on the same plane, the elastic abutment between the protective sleeve 16 and the core housing 20 may be not on the same plane. Thus, it is difficult for external liquid to enter the core housing 20 from the junction of the protective sleeve 16 and the core housing 20, and further enter the earphone core 50 thereby improving the waterproof effect of the MP3 player, protecting the inner structure of the MP3 player, and extending the service life of the MP3 player.

In some embodiments, the insertion unit 142 may include an annular groove 1423 on the side of the annular table 1422 facing the outer end surface 21 of the core housing 2, and the annular groove 1423 may be adjacent to the annular table 1422. The annular protruding table 162 may be formed in the annular groove 1423. The annular groove 1423 may form a side of the annular table 1422 facing the core housing 20. In an exemplary application scenario, the annular table 1422 may be a side wall surface of the annular groove 1423 facing the core housing 20. In such cases, the annular protruding table 162 may be formed in the annular groove 1423 along the side wall surface.

In some embodiments, an end of the wire 12 of the ear hook 10 disposed outside the core housing 20 may pass through the second wiring channel 151 to connect the circuits outside the core housing 20, such as the control circuit 60, the battery 70, etc. included in the circuit housing 30. Another end of the wire 12 may be exposed to the outer end surface of the first plug end 14 along the first wiring channel 141, and further enter the core housing 20 through the first socket 22 along with the insertion unit 142.

Figure 9:
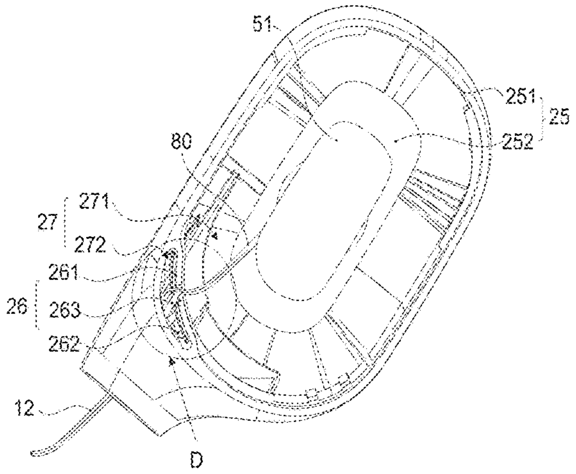
FIG. 9 is a schematic diagram illustrating a partial structure of a core housing according to some embodiments of the present disclosure.
Figure 10:
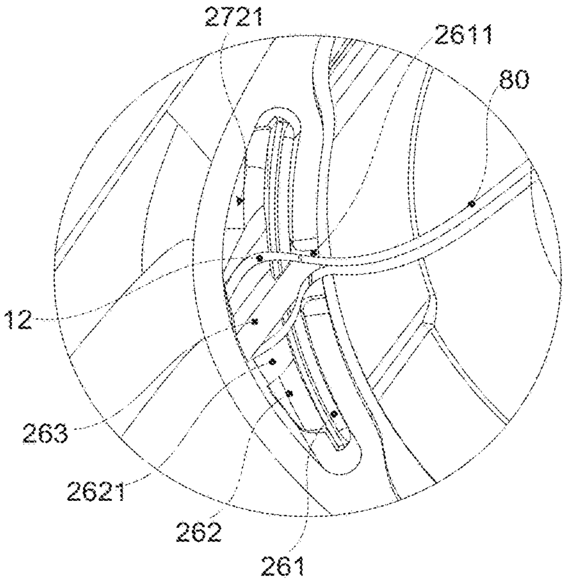
FIG. 10 is a schematic diagram illustrating a partial enlarged view of part D in FIG. 9.
Figure 11:
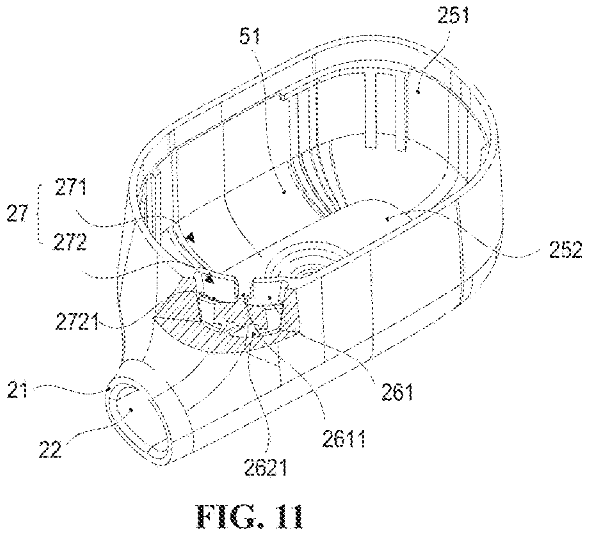
FIG. 11 is a schematic diagram illustrating a cross-sectional view of a core housing according to some embodiments of the present disclosure.

FIG. 9 is a schematic diagram illustrating a partial structure of a core housing according to some embodiments of the present disclosure. FIG. 10 is a schematic diagram illustrating a partial enlarged view of part D in FIG. 9. FIG. 11 is a schematic diagram illustrating a cross-sectional view of a core housing according to some embodiments of the present disclosure. Referring to FIG. 2, FIG. 9, FIG. 10, and FIG. 11, in some embodiments, the core housing 20 may include a main housing 25 and a partition component 26. The partition component 26 may be disposed inside the main housing 25 and connected to the main housing 25, so as to divide the inner space 27 of the main housing 25 into a first accommodating space 271 and a second accommodating space 272 close to the first socket 22. In some embodiments, the main housing 25 may include a peripheral side wall 251 and a bottom wall 252 connected to one end surface of the peripheral sidewall 251. The peripheral sidewall 251 and the bottom wall 252 jointly form the inner space 27 of the main housing 25.

The partition component 26 may be disposed on the side of the main housing 25 close to the first socket 22 and include a side partition 261 and a bottom partition 262. The side partition 261 may be disposed in a direction perpendicular to the bottom wall 252 and both ends of the side partition 261 may be connected to the peripheral sidewall 251, thereby separating the inner space 27 of the main housing 25. The bottom partition 262 and the bottom wall 252 may be parallel or substantially parallel and spaced apart. Further, the bottom partition 262 and the bottom wall 252 may be connected to the peripheral side wall 251 and the side partition 261, respectively. Thus, the inner space 27 formed by the main housing 25 may be divided to form the first accommodating space 271 surrounded by the side partition 261, the bottom partition 262, the peripheral sidewall 251 away from the first socket 22, and the bottom wall 252, and the second accommodating space 272 surrounded by the bottom partition 262, the side partition 261, and the peripheral sidewall 251 close to the first socket 22. The second accommodating space 272 may be smaller than the first accommodating space 271. The partition component 26 may divide the inner space 27 of the main housing 25 by other arrangements, which are not limited herein.

In some embodiments, the earphone core 50 may include a functional component 51 that may be disposed in the first accommodating space 271 and configured to vibrate to generate sound. In some embodiments, the MP3 player may further include a wire 80 connected to the functional component 51. An end of the wire 80 may be extended from the first accommodating space 271 to the second accommodating space 272.

In some embodiments, the side partition 261 may include a wiring groove 2611 at a top edge of the side partition 261 away from the bottom wall 252. The wiring groove 2611 may connect the first accommodation space 271 and the second accommodation space 272. Further, an end of the wire 12 away from the functional component may extend into the second accommodating space 272 through the wire groove 2611. After the end of the wire 12 of the ear hook 10 away from the circuit housing 30 enters the inside of the core housing 20 with the insertion unit 142, the end of the wire 12 of the ear hook 10 away from the circuit housing 30 may extend into the second accommodating space 272, and be electrically connected with a wire 80 in the second accommodating space 272 to form a wire path connecting the first accommodating space 271 to an external circuit through the second accommodating space 272. The functional component 51 may be electrically connected to the external circuit located outside the core housing 20 through the wire path.

In some embodiments, the bottom partition 262 may include a wiring hole 2621 which may be configured to connect the first socket 22 with the second accommodating space 272, so that the wire 12 entering the core housing 20 from the first socket 22 may extend to the second accommodating space 272 through the wiring hole 2621. The wire 12 and the wire 80 may be coiled and disposed in the second accommodating space 272 after being connected in the second accommodating space 272. Specifically, the wire 12 and the wire 80 may be connected in a welding manner. Further, the functional component 51 may be electrically connected to the external circuit to provide power for a normal operation of the functional component 51 through the external circuit or transmit data to the earphone core 50.

It should be noted that when the MP3 player is assembled, a length of the wire may be longer than that required to facilitate assembly. However, if the wires of the earphone core 50 may not be placed reasonably, it is easy to vibrate and make abnormal noises when the functional component 51 is working, thereby reducing the sound quality of the MP3 player and affecting the user's listening experience. In some embodiments, the second accommodating space 272 may be separated from the inner space 27 formed by the main housing 25 of the core housing 20 and used for accommodating the wire 12 and the wire 80, thereby avoiding and/or reducing the effect of the extra wires on the sound generated by the MP3 player and improving the sound quality.

In some embodiments, the partition component 26 may further include an inner partition 263. The inner partition 263 may divide the second accommodating space 272 into two sub-accommodating spaces 2721. Specifically, the inner partition 263 may be disposed perpendicular to the bottom wall 252 of the main housing 25 and connected to the side partition 261 and the peripheral sidewall 251, respectively. The inner partition 263 may extend to the wiring hole 2621 to divide the wiring hole 2621 into two while dividing the second accommodating space 272 into two sub-accommodating spaces 2721. Each of the two wiring holes 2621 may be connected to a corresponding sub-accommodating space 2721, respectively.

In some embodiments, a count (number) of the wire 12 and/or the wire 80 may be two. Each of the two wires 12 may extend into the corresponding sub-accommodating spaces 2721 along a corresponding wiring hole 2621. The two wires 80 may enter the second accommodating space 272 through the wiring groove 2611 together, separated after entering the second accommodating space 272, be welded with corresponding wires 12 in the corresponding sub-accommodating spaces 2721 respectively, and further be coiled and arranged in the corresponding sub-accommodating space 2721.

In some embodiments, the second accommodating space 272 may be further filled with sealant. In this case, the wire 12 and the wire 80 included in the second accommodating space 272 may be further fixed, thereby reducing the effect on the sound quality caused by the vibration of the wire, improving the sound quality of the MP3 player, and protecting the welding point between the wire 12 and the wire 80. In addition, the purpose of waterproof and dustproof may also be achieved by sealing the second accommodating space 272.

Figure 12:
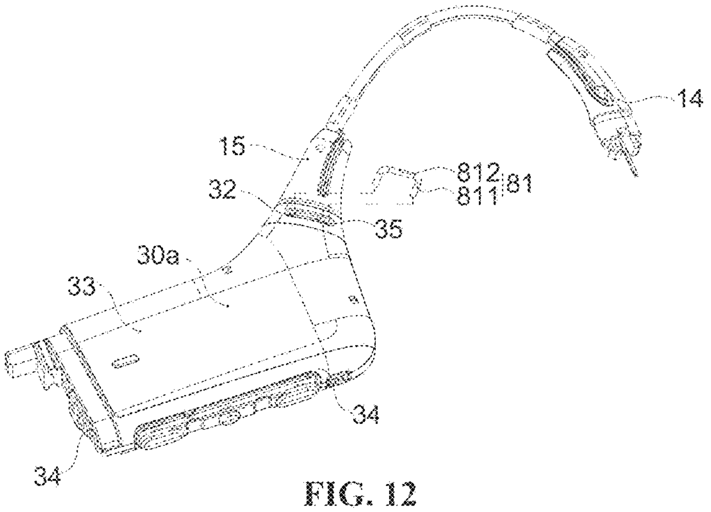
FIG. 12 is a schematic diagram illustrating an exploded view of partial structures of an exemplary circuit housing and an exemplary ear hook according to some embodiments of the present disclosure.
Figure 13:
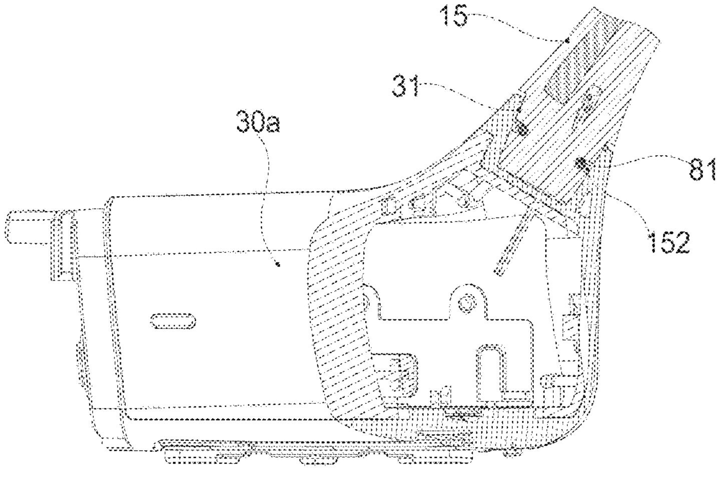
FIG. 13 is a schematic diagram illustrating a cross-sectional view of a partial structure according to some embodiments of the present disclosure.
Figure 14:
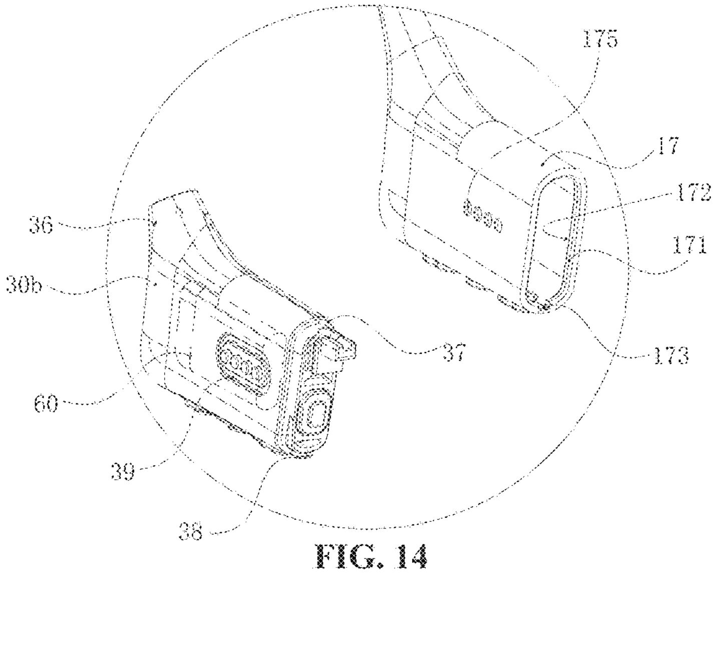
FIG. 14 is a schematic diagram illustrating a partial enlarged view of part E in FIG. 2.
Figure 15:
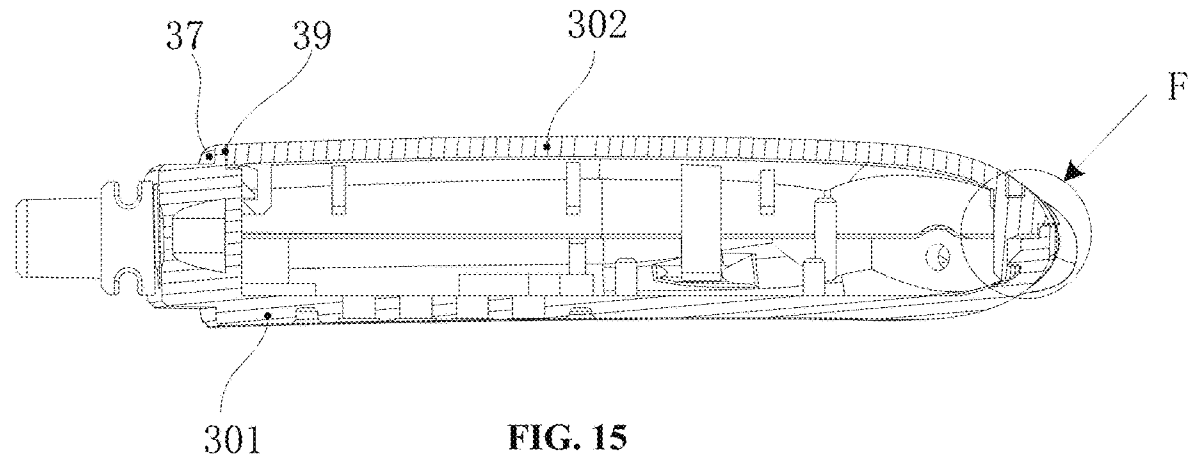
FIG. 15 is a schematic diagram illustrating an exemplary core housing according to some embodiments of the present disclosure.
Figure 16:
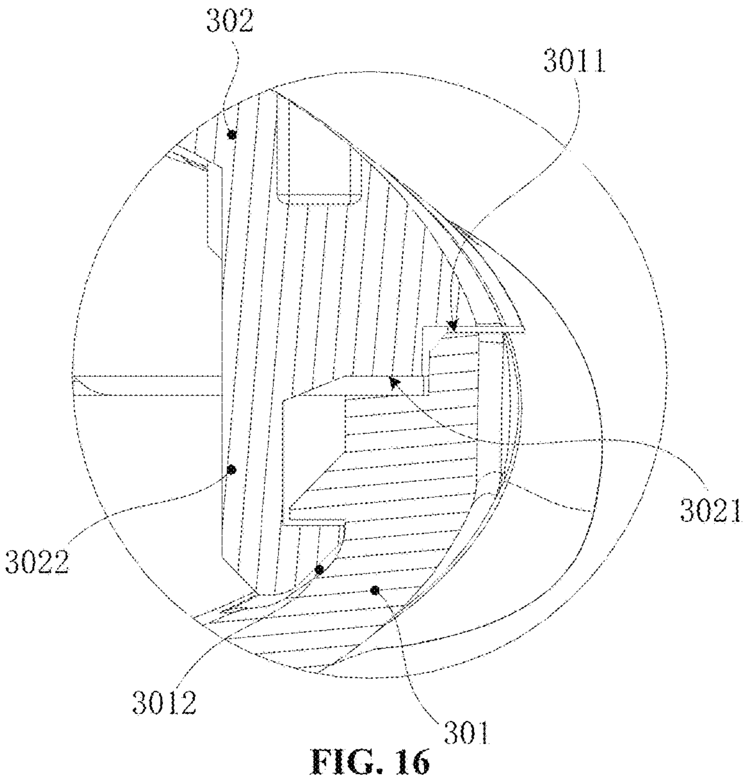
FIG. 16 is a schematic diagram illustrating a partial enlarged view of part F in FIG. 15.

FIG. 12 is a schematic diagram illustrating an exploded view of partial structures of an exemplary circuit housing and an exemplary ear hook according to some embodiments of the present disclosure. FIG. 13 is a schematic diagram illustrating a cross-sectional view of a partial structure according to some embodiments of the present disclosure. FIG. 14 is a schematic diagram illustrating a partial enlarged view of part E in FIG. 2. FIG. 15 is a schematic diagram illustrating an exemplary core housing according to some embodiments of the present disclosure. FIG. 16 is a schematic diagram illustrating a partial enlarged view of part F in FIG. 15. Referring to FIG. 2 and FIG. 12 to FIG. 15, in some embodiments, the circuit housing 30 and the second plug end 15 may be plugged and fixed, and the circuit housing 30 may be fixed on an end of the ear hook 10 away from the core housing 20. When worn by the user, the circuit housing 30 including the battery 70 and the circuit housing 30 including the control circuit 60 may correspond to the left and right ear of the user, respectively. A connection manner between the circuit housing 30 and the corresponding second plug end 15 and that between the control circuit 60 and the corresponding second plug end 15 may be different.

In some embodiments, the circuit housing 30 may be connected to the second plug end 15 in a plug manner, a snapping manner, or the like, or any combination thereof. In this case, the ear hook 10 and the circuit housing 30 may be formed separately, and assembled together, instead of integrally forming the ear hook 10 and the circuit housing 30. In this case, the ear hook 10 and the circuit housing 30 may be molded separately with corresponding molds instead of using a relatively large mold to integrally form the ear hook 10 and the circuit housing 30, which may reduce the size of the mold, the difficulty of the manufacture of the mold, and the molding process. In addition, since the ear hook 10 and the circuit housing 30 are processed using different molds, when the shape or structure of the ear hook 10 or the circuit housing 30 needs to be adjusted in the manufacturing process, the mold corresponding to the structure may be adjusted instead of adjusting the mold of another one thereby reducing the production cost.

In some embodiments, the circuit housing 30 may include a second socket 31. A shape of an inner surface of the second socket 31 may match that of at least part of the outer end surface of the second plug end 15, and the second plug end 15 may be at least partially inserted into the second socket 31. Two slots 152 may be disposed on each of opposite sides of the second plug end 15, and the two slots 152 may be disposed perpendicular to the inserted direction of the second plug end 15 with respect to the second socket 31, respectively. Specifically, the two slots 152 may be symmetric and spaced apart on opposite sides of the second plug end 15, and may be connected to the sidewall of the second plug end 15 in the vertical direction of the inserted direction of the second plug end 15. A first side wall **30*a* of the circuit housing 30 may include two through holes 32 corresponding to the positions of the two slots 152, and the two through holes 32 may penetrate the first side wall 30*a***.

In some embodiments, the circuit housing 30 may be flat. For example, a shape of a cross-section of the circuit housing 30 at the second socket 31 may be elliptical or other shapes that may be flattened. In this embodiment, the two opposite side walls of the circuit housing 30 with a relatively large area may be main side walls 33, and two opposite side walls with a relatively small area connecting the two main side walls 33 may be auxiliary side walls 34. In some embodiments, the first side wall **30*a* of the circuit housing 30 may include one of the main side walls 33 of the circuit housing 30 or the auxiliary side wall 34 of the circuit housing 30**, which may be set according to actual requirements.

In some embodiments, the MP3 player may include a fixing member 81. The fixing member 81 may include two parallel pins 811 and a connecting portion 812 configured to connect the pins 811. Specifically, the connecting portion 812 may be vertically connected to ends of the two pins 811 at the same side, thereby forming the U-shaped fixing member 81. Ends of the two pins 811 away from the connecting portion 812 may be inserted into the slot 152 from the outside of the circuit housing 30 through the through hole 32, and the connecting portion 812 may be blocked from the outside of the circuit housing 30, thereby plugging and fixing the circuit housing 30 and the second plug end 15.

In some embodiments, the first side wall 30*a* of the circuit housing 30 may include a strip groove 35 configured to connect the two through holes 32. When the fixing member 81 is used for plugging and fixing the circuit housing 30 and the second plug end 15, a portion or the entire of the connecting portion 812 may be sunk in the strip groove 35. In such cases, the MP3 player may have a relatively uniform structure, and a groove corresponding to the connecting portion 812 may not disposed on a housing sheath 17 sleeved on the periphery of the circuit casing 30, thereby simplifying the mold of the housing sheath 17. On the other hand, the space occupied by the MP3 player as a whole may be reduced to a certain extent.

In some application scenarios, after a portion or the entire of the connecting portion 812 is sunk in the strip groove 35, a sealant may be applied in the strip groove 35. In such cases, the fixing member 81 may be fixed on the circuit housing 30, thereby improving the stability of the connection between the second plug end 15 and the second socket 31. In addition, after the connecting portion 812 is sunk in the strip groove 35, the strip groove 35 may be filled with the sealant, and a surface of the strip groove 35 may be consistent with the first side wall 30*a* of the circuit housing 30, thereby improving the smooth and consistence of the strip groove 35 and surrounding structures.

In some embodiments, the second side wall 30*b* of the circuit housing 30 opposite to the first side wall 30*a* of the circuit housing 30 may include through hole(s) 36 opposite to the through hole(s) 32, and the pin 811 may pass through the slot 152 and insert into the through hole(s) 36. The first side wall 30*a* of the circuit housing 30 and the second side wall 30*b* of the circuit housing 30 may be the main side walls 33 or the auxiliary side walls 34 of the circuit housing 30. In some embodiments, the first side wall 30*a* and the second side wall 30*b* of the circuit housing 30 may be two opposite main side walls 33 of the circuit housing 30. That is, two through holes 32 and two through holes 36 may be disposed on the side wall of the circuit housing 30 with a relatively larger area, respectively. A relatively large interval may be disposed between two pins 811 of the fixing member 81 to improve the span of the fixing member 81 and improve the stability of the connection between the second plug end 15 and the second socket 31.

In some embodiments, a pin 811 may be inserted into the slot 152 through the through hole 32, and further inserted into the through hole 36 through the slot 152. That is, the pin 811 may penetrate and connect two opposite main side walls 33 of the circuit housing 30 and the second plug end 15, thereby improving the plugging stability between the second plug end 15 and the circuit housing 30.

As described in the foregoing embodiments, when the protective sleeve 16 is formed, the protective sleeve 16 may be integrally formed with a housing sheath 17 disposed close to the second plug end 15. The housing sheath 17 and the circuit housing 30 may be formed separately, and the shape of the inner side wall of the housing sheath 17 may match the outer side wall of the circuit housing 30. After the housing sheath 17 and the circuit housing 30 are separately formed, the housing sheath 17 may wrap around the periphery of the circuit housing 30 in a sleeved manner.

It should be noted out that the environmental temperature during the molding of the housing sheath 17 may be relatively high, and the high temperature may cause damage to the control circuit 60 or the battery 70 contained in the circuit housing 30. The circuit housing 30 and the housing sheath 17 may be molded separately and assembled together to avoid the damage to the control circuit 60 or the battery 70 caused by the high temperature during the molding of the housing sheath 17, thereby reducing the damage to the control circuit 60 or the battery 70 brought by the molding.

In some embodiments, the housing sheath 17 may have a bag-like structure with an open end, and the circuit housing 30 may enter the inside of the housing sheath 17 through the open end of the housing sheath 17.

In some embodiments, after the housing sheath 17 is integrally formed with the protective sleeve 16 to form a whole structure, the whole structure may be removed from the mold by rolling the housing sheath 17 from the open end. When performing a visual inspection, a silk-screening, or other surface treatment for the housing sheath 17, the housing sheath 17 may be put on a preset structure through the opening for operation, and after the operation is completed, the housing sheath 17 may be rolled up and removed from the preset structure. After performing the operation, the housing sheath 17 may be coved on the periphery of the circuit casing 30 through the opening. In the above-mentioned operation, the removal of the housing sheath 17 from the mold is not limited to the above-mentioned rolling up method, and it may include inflated method, or the like, which is not limited herein. The opening of the housing sheath 17 may be disposed on an end of the housing sheath 17 away from the protective sleeve 16, and the circuit housing 30 may enter the inside of the housing sheath 17 from the end of the housing sheath 17 away from the protective sleeve 16 and covered by the housing sheath 17.

In some embodiments, the open end of the housing sheath 17 may include an annular flange 171 protruding inward. The end of the circuit housing 30 away from the ear hook 10 may have a stepped structure, so as to form an annular table 37. The annular flange 171 may abut on the annular table 37 when the housing sheath 17 covers the periphery of the circuit housing 30. The annular flange 171 may be formed by the inner wall surface of the open end of the housing sheath 17 protruding to a certain thickness toward the inside of the housing sheath 17. The annular flange 171 may include a flange surface 172 facing the ear hook 10. The annular table 37 may be opposite to the flange surface 172 and toward a direction of the circuit housing 30 away from the ear hook 10. A height of the flange surface 172 of the annular flange 171 may be not greater than a height of the annular table 37, and the inner wall surface of the housing sheath 17 may abut the side wall of the circuit housing 30 and the housing sheath 17 may tightly cover the periphery of the circuit housing 30 when the flange surface 172 of the annular flange 171 abuts the annular table 37.

In some embodiments, a sealant may be applied to a joint area between the annular flange 171 and the annular table 37. Specifically, when the housing sheath 17 is covered, the sealant may be coated on the annular table 37 to seal the housing sheath 17 and the circuit housing 30.

In some embodiments, the circuit housing 30 may include a positioning block 38. The positioning block 38 may be disposed on the annular table 37 and extend along a direction of the circuit housing 30 away from the ear hook 10. Specifically, the positioning block 38 may be disposed on the auxiliary sidewall 34 of the circuit housing 30, and a thickness of the positioning block 38 protruding on the auxiliary sidewall 34 may be consistent with the height of the annular table 37. The number of positioning blocks 38 may be set according to requirements. Correspondingly, the annular flange 171 of the housing sheath 17 may include a positioning groove 173 corresponding to the positioning block 38, and the positioning groove 173 may cover at least a portion of the positioning block 38 when the housing sheath 17 covers the periphery of the circuit housing 30.

In such cases, when the housing sheath 17 is installed, the housing sheath 17 may be positioned according to positions of the positioning block 38 and the positioning groove 173, thereby improving accuracy and efficiency of the installation of the housing sheath 17. In some embodiments, the positioning block 38 may be omitted according to actual requirements.

In some embodiments, the circuit housing 30 may include a first sub-housing 301 and a second sub-housing 302 that may be fastened to each other. Specifically, the two sub-housings may be symmetrically buckled along a center line of the circuit housing 30, or in other manners according to actual needs. In addition, a fastening manner of the two sub-housings of the circuit housing 30 for accommodating the control circuit 60 and a fastening manner of the two sub-housings of the circuit housing 30 for accommodating the battery 70 may be the same or different.

In an application scenario, the annular table 37 of the circuit housing 30 may be formed on the first sub-housing 301, and the two sub-housings may be joined on the side of the annular table 37 facing the ear hook 10, and the housing sheath 17 may cover a joint seam of the two sub-housings. An internal space of the circuit housing 30 may be sealed to a certain extent, thereby improving the waterproof effect of the MP3 player.

In another application scenario, the annular table 37 of the circuit housing 30 may be formed by the two sub-housings, and at least a portion of each of the two sub-housings may be combined on a side of the annular table 37 away from the ear hook 10. In this case, the housing sheath 17 may not cover the joint seam of the two sub-housings on the side of the annular table 37 away from the ear hook 10. In this application scenario, the joint seam may be further covered in other manners.

In some embodiments, the joint surfaces of the two sub-housings abutting each other may have stepped shapes matching each other. An end surface of the first sub-housing 301 facing the second sub-housing 302 may include a stepped first step surface 3011, and an end surface of the second sub-housing 302 facing the first sub-housing 301 may include a stepped second step surface 3021. The shape and size of the first stepped surface 3011 and the second stepped surface 3021 may be the same, so that they can fit and abut each other.

In this case, the joining surfaces of the two sub-housings of the circuit housing 30 abutting each other are stepped and not on the same plane, thereby preventing the liquid outside the circuit housing 30 from entering the circuit housing from the periphery of the circuit housing 30, improving the waterproof effect of the MP3 player, and protecting the control circuit 60 or the battery 70 inside the circuit housing 30.

In some embodiments, a mounting hook 3022 may be disposed on the second stepped surface 3021 of the second sub-housing 302, and the mounting hook 3022 may face the first sub-housing **30*a*. Correspondingly, the first sub-housing 301 may include a mounting groove 3012 matching the mounting hook 3022. When the first sub-housing 301 and the second sub-housing 302 are installed, the mounting hook 3022 may cross the outer side wall of the mounting groove 3012 under an action of an external force and enter the mounting groove 3012. A hook portion of the mounting hook 3022 may be hooked to the inner side wall of the hook groove 3012, thereby realizing the buckling of the first sub-housing 301 and the second sub-housing 302**.

Figure 17:
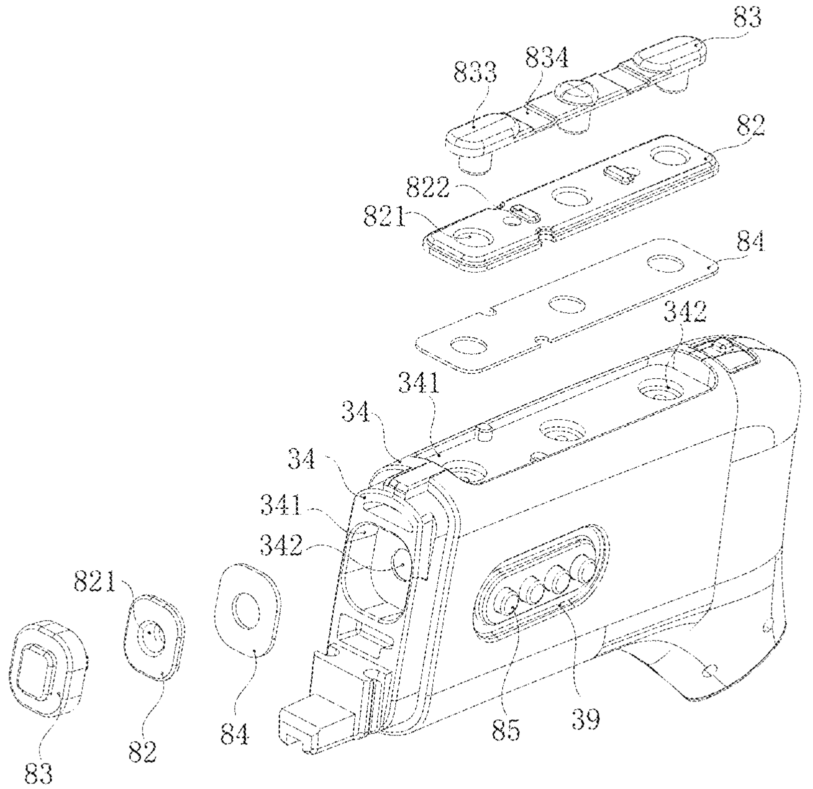
FIG. 17 is a schematic diagram illustrating an exploded view of partial structures of an exemplary circuit housing and an exemplary button mechanism according to some embodiments of the present disclosure.
Figure 18:
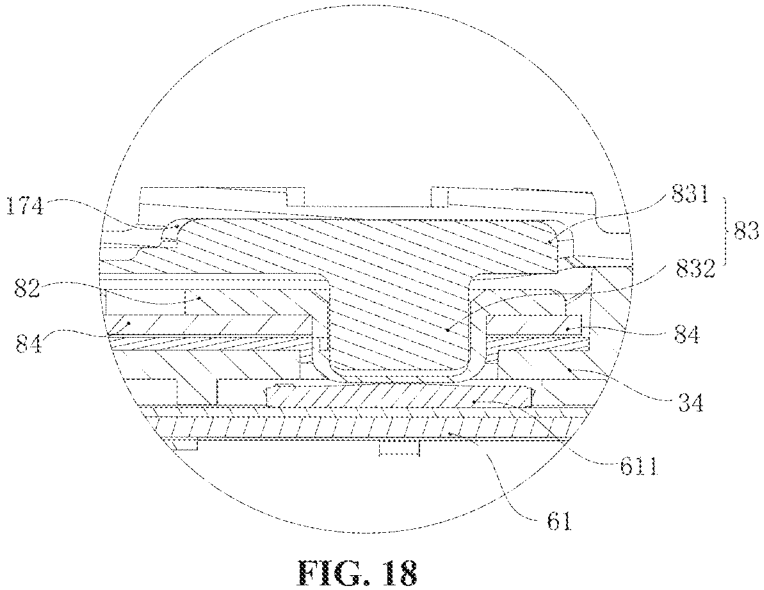
FIG. 18 is a schematic diagram illustrating a partial enlarged view of part G in FIG. 8.

FIG. 17 is a schematic diagram illustrating an exploded view of partial structures of an exemplary circuit housing and an exemplary button mechanism according to some embodiments of the present disclosure. FIG. 18 is a schematic diagram illustrating a partial enlarged view of part G in FIG. 8. Referring to FIG. 2, FIG. 17, and FIG. 18, in some embodiments, an MP3 player may include a button mechanism. A first concave region 341 may be disposed on an outer surface of an auxiliary side wall 34 of a circuit housing 30, and the first concave region 341 may include a button hole 342 connecting the outer surface and an inner surface of the auxiliary side wall 34. The auxiliary side walls 34 of the circuit housing 30 may include an auxiliary side wall 34 facing toward a rear side of a user's head when the user wears the MP3 player, and may also include an auxiliary side wall 34 facing toward a lower side of the user's head when the user wears the MP3 player. There may be one or more first concave regions 341 each of which may include one or more button holes 342. A count of the button holes 342 may be determined according to actual needs, and is not specifically limited here.

In some embodiments, the MP3 player may further include an elastic pad 82 and a button 83, and the control circuit 60 may include a button circuit board 61. The elastic pad 82 may be placed in the first concave region 341, and may be specifically fixed on an outer surface of an auxiliary side wall 34 corresponding to the first concave region 341, so as to cover a periphery of the button hole 342, and prevent external liquid from entering the inside of the circuit housing 30 through the button hole 342, thereby playing a role of sealing and waterproofing. In some embodiments, the elastic pad 82 may include a second concave region 821 corresponding to the button hole 342, and the second concave region 821 may extend to an inside of the button hole 342. In some embodiments, the elastic pad 82 may include a soft material, such as soft silicone or rubber. In addition, the elastic pad 82 may be relatively thin, which makes it difficult to bond the elastic pad 82 firmly to the outer surface of the auxiliary side wall 34 when directly bonding the elastic pad 82 to the outer surface of the auxiliary side wall 34. Since the elastic pad is placed between the button 83 and the button hole 342, when a user presses the button, the elastic pad may generate a force opposite to a pressing direction due to its deformation, which hinders a movement of the button relative to the button hole.

In some embodiments, a rigid pad 84 may be disposed between the elastic pad 82 and the circuit housing 30. The rigid pad 84 and the elastic pad 82 may be fixed against each other, specifically, by means of lamination, bonding, injection molding, etc. Further, the rigid pad 84 may be bonded to the auxiliary side wall 34, specifically, by using a double-sided adhesive, so as to form an adhesive layer between the rigid pad 84 and the auxiliary side wall 34. In this case, the elastic pad 82 may be firmly fixed on the outer surface of the auxiliary side wall 34. In addition, since the elastic pad 82 is soft and thin, it may be difficult for the elastic pad 82 to maintain a flat state when a user presses the button. By fixing the rigid pad 84, the elastic pad 82 may maintain flat.

In some embodiments, the rigid pad 84 may include a through hole 841 that allows the second concave region 821 to pass through, such that the second concave region 821 of the elastic pad 82 may further extend the button hole 342 through the through hole 841. In some embodiments, the rigid pad 84 may include stainless steel, or other steel materials, such as a hard material like plastic. The rigid pad 84 may be integrally formed to abut against the elastic pad 82.

In some embodiments, the button 83 may include a button body 831 and a button contact 832 protruding from one side of the button body 831. The button body 831 may be disposed on a side of the elastic pad 82 away from the circuit housing 30, and the button contact 832 may extend into the second concave region 821 to extend into the button hole 342 along with the second concave region 821. Since the MP3 player in this embodiment is relatively thin and light, a pressing stroke of the button 83 may be short. If a soft button is used, the user's pressing feeling may be affected, thereby resulting in a bad experience. In some embodiments, the button 83 may include hard plastic material, such that the user may have a good feel when pressing the button 83.

The button circuit board 61 may be placed inside the circuit housing 30. The button circuit board 61 may include a button switch 611 corresponding to the button hole 342. Thus, when the user presses the button 83, the button contact 832 may contact and trigger the button switch 611 to further implement a corresponding function.

In some embodiments, the second concave region 821 may be disposed on the elastic pad 82. In this case, on the one hand, the second concave region 821 may cover the button hole 342, which may improve a waterproof effect. On the other hand, in a natural state, the button contact 832 may extend into the button hole 342 through the second concave region 821, which may shorten the pressing stroke of the button to reduce a space occupied by the button mechanism. Thus, the MP3 player may not only have good waterproof performance, but also take up less space.

In some embodiments, the button 83 may include a button unit 833, and a count (or a number) of the button unit may be one or more. In an application scenario, the button 83 may include at least two button units 833 spaced from each other and a connecting part 834 configured to connect the button units 833. A plurality of button units 833 may be integrated with the connecting part 834. Each button unit 833 may correspond to a button contact 832, and further correspond to a button hole 342 and a button switch 611. Each first concave region 341 may include a plurality of button units 833, and the user may trigger different button switches 611 by pressing different button units 833, and realize multiple functions.

In some embodiments, the elastic pad 82 may include an elastic convex 822 for supporting the connecting part 834. Since the button 83 may include the plurality of button units 833 connected to each other, the elastic convex 822 may enable one of the button unit 833 to be pressed separately when the user presses the corresponding button unit 833, thereby avoiding that other button units 833 are pressed due to a linkage between the plurality of button units 833. In this case, the corresponding button switch 611 may be triggered accurately. It should be noted that the elastic convex 822 is not necessary. For example, the elastic convex 822 may be a protruding structure without elasticity, or the protruding structure may be removed. The elastic convex 822 may be set according to actual conditions. In some embodiments, the inner wall of the housing sheath 17 may include a concave 174 corresponding to the button, such that the periphery of the circuit housing 30 and the button may be covered in a sleeve manner.

Figure 19:
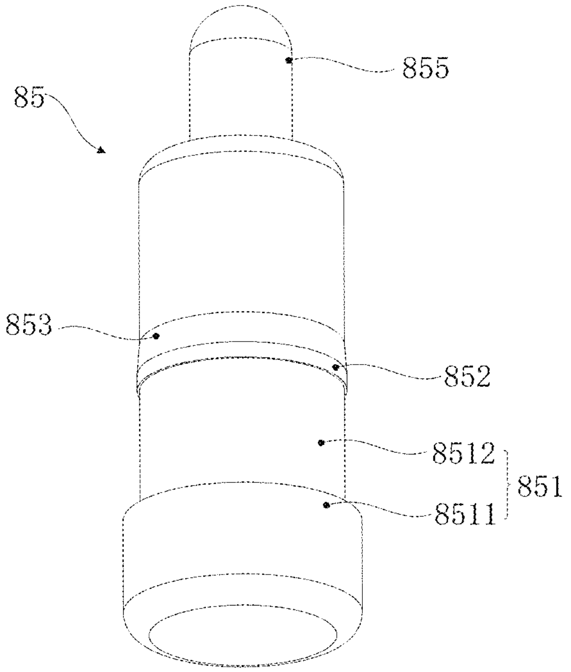
FIG. 19 is a schematic diagram illustrating an exemplary conductive post according to some embodiments of the present disclosure.
Figure 20:
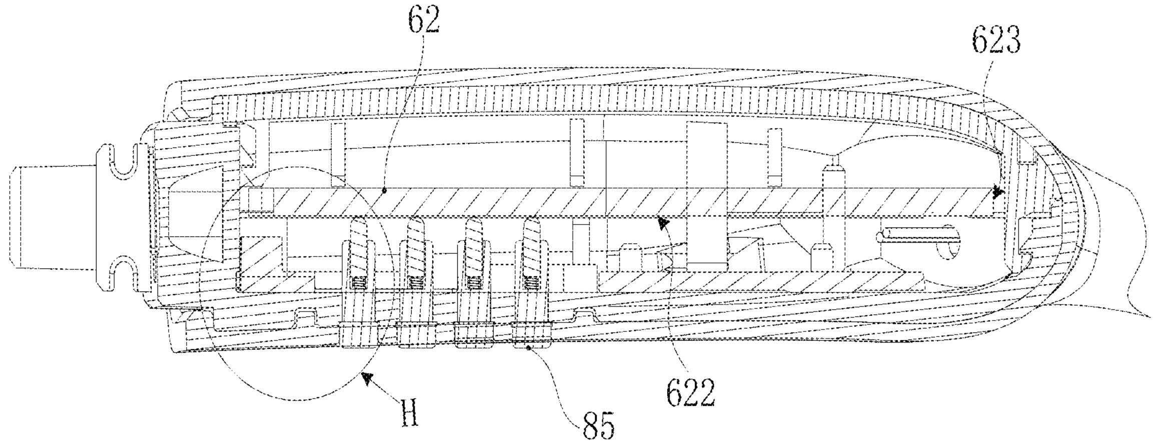
FIG. 20 is a schematic diagram illustrating cross-section views of an exemplary circuit housing, an exemplary conductive post, and an exemplary main control circuit board according to some embodiments of the present disclosure.
Figure 21:
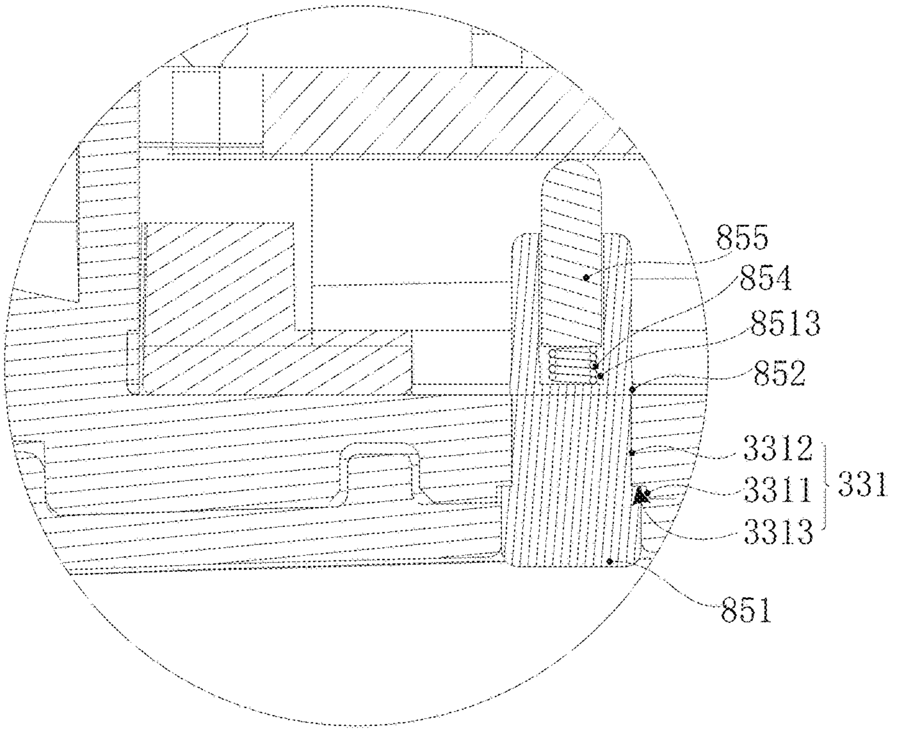
FIG. 21 is a schematic diagram illustrating a partially enlarged view of part H in FIG. 20.

FIG. 19 is a schematic diagram illustrating an exemplary conductive post according to some embodiments of the present disclosure. FIG. 20 is a schematic diagram illustrating cross-section views of an exemplary circuit housing, a conductive post, and a main control circuit board according to some embodiments of the present disclosure. FIG. 21 is a schematic diagram illustrating a partially enlarged view of part H in FIG. 20. Referring to FIG. 2, FIG. 19, FIG. 20, and FIG. 21, in some embodiments, the MP3 player may further include at least one conductive post 85. The control circuit accommodated inside the circuit housing 30 may include a main control circuit board 62. The conductive post 85 may be used to connect the main control circuit board 62 inside the circuit housing 30, a charging circuit and/or a data transmission line outside the circuit housing 30, so as to charge and/or communicate data with the MP3 player. The main side wall 33 of the circuit housing 30 may include at least one mounting hole 331, and the conductive post 85 may be inserted into the corresponding mounting hole 331. The conductive post 85 may correspond to the mounting hole 331 one to one. In this embodiment, there may be four conductive posts 85 and four mounting holes 331. The four conductive posts 85 may be respectively inserted into four corresponding mounting holes 331, and may be arranged side by side in a straight line at even intervals. Two conductive posts 85 located at outer sides may be used as charging interfaces, and two conductive posts 85 located in the middle may be used as data transmission interfaces. It should be noted that the conductive posts 85 and the mounting holes 331 may be disposed in other manner, which are not limited herein.

In some embodiments, the conductive post 85 may include a columnar body 851 inserted into a mounting hole 331. In some embodiments, an outer peripheral surface of the columnar body 851 may include a positioning boss 852. The positioning boss 852 may be clamped to the inner surface of the main side wall 33, thereby fixing the conductive post 85 to the mounting hole 331. Specifically, the positioning boss 852 may be arranged in a circle circumferentially around the columnar body 851. A side of the positioning boss 852 facing toward the inside of the circuit housing 30 may include an extended slope 853 connecting an outer peripheral surface of the columnar body 851 and the positioning boss 852. When installing the conductive post 85, the conductive post 85 may be gradually inserted into the mounting hole 331 from the outside of the circuit housing 30 along the extended slope 853, enter into the interior of the circuit housing 30, and further pass the positioning boss 852. After the positioning boss 852 completely passes through the mounting hole 331, a surface of the positioning boss 852 facing toward the outside of the circuit housing 30 may be clamped to the inner surface of the main side wall 33, such that the conductive post 85 may be fixed in the mounting hole 331.

In the embodiment, in the assembly process, the positioning boss 852 may cause the conductive post 85 to be inserted into the mounting hole 331 from the outer surface of the main side wall 33 of the circuit housing 30, and the positioning boss 852 may be pressed into the mounting hole 331 in a pressing manner. Thus, the positioning boss 852 may be clamped to the inner surface of the main side wall 33 of the circuit housing 30, which eliminates the need to install the conductive post 85 from the inside of the circuit housing 30, thereby making the assembly of the MP3 player more convenient and improving production assembly efficiency. Further, in the assembly process, the extended slope 853 may enable the positioning boss 852 to pass through the mounting hole 331 more smoothly. When the conductive post 85 enters the mounting hole 331, the positioning boss 852 may cause the conductive post 85 to be clamped to the inner surface of the main side wall 33, and may not be easily drawn out from the conductive hole, thereby fixing the conductive post 85 firmly in the mounting hole 331.

In some embodiments, the columnar body 851 may be divided into a first columnar body 8511 and a second columnar body 8512 along an insertion direction of the columnar body 851 with respect to the mounting hole 331. The first column body 8511 and the second column body 8512 may be integrally made of a conductive metal material such as copper, silver, or an alloy. In the insertion direction of the mounting hole 331 perpendicular to the conductive post 85, a cross-section of the first columnar body 8511 may be larger than a cross-section of the second columnar body 8512. The positioning boss 852 may be placed on the second columnar body 8512. In some embodiments, the mounting hole 331 may be divided into a first hole section 3311 and a second hole section 3312 with cross sections correspond to the first columnar body 851 and the second columnar body 851 along the insertion direction. A circular table 3313 may be formed at a junction of the first hole section 3311 and the second hole section 3312. The circular table 3313 may be communicated with the outer surface of the main side wall 33. When the columnar body 851 is inserted into the mounting hole 331, a side of the first columnar body 8511 facing toward the second columnar body 8512 may be supported on the circular table 3313. A side of the 852 on a peripheral surface of the second columnar body 8512 facing toward the first columnar body 8511 may be clamped to the inner surface of the main side wall 33. Further, the conductive post 85 may be simultaneously clamped to the inner side and the outer side of the main side wall 33 around the mounting hole 331, thereby fixing the conductive post 85 in the mounting hole 331.

In some embodiments, the columnar body 851 may include an accommodating chamber 8513 along an axial direction of the columnar body 851, and an open end of the accommodating chamber 8513 may be on an end surface of the second columnar body 8512 facing toward the inside of the circuit housing 30. In some embodiments, the accommodating chamber 8513 may pass through a portion of the second columnar body 8512 located on the inner side of the circuit housing 30 along a direction parallel to the insertion direction, and terminate before reaching the boss 852. In other embodiments, a location of the accommodating chamber 8513 may be determined according to actual needs.

In some embodiments, the conductive post 85 may also include a spring 854 and a conductive contact 855 placed in the accommodating chamber 8513. One end of the conductive contact 855 may be in contact with the spring 854 inside the accommodating chamber 8513, and the other end may be exposed from the open end of the chamber 8513 inside the circuit housing 30. In some embodiments, the material of conductive contact 855 may be the same as that of the columnar body 851. In some embodiments, the spring 854 may be connected to the second columnar body and the conductive contact 855 by means such as bonding, welding, etc. In some embodiments, the spring 854 may be directly placed inside the accommodating chamber 8513, and elastically clamped inside the accommodating chamber 8513, by an engagement between the columnar body 851 and the main side wall 33 of the circuit housing 30, and the abutting of the conductive contact 855 and the main control circuit board 62.

In some embodiments, the main control circuit board 62 inside the circuit housing 30 may include a contact 621 (as shown in FIG. 7) corresponding to a position of the conductive post 85. In some embodiments, the main control circuit board 62 may include a main surface 622 with a relatively larger area and a side surface 623 with a relatively smaller area connecting the main surface 622. The main surface 622 of the main control circuit board 62 may be parallel or substantially parallel to the main side wall 33 of the circuit housing 30, and the contact 621 may correspond to the main surface 622 of the main control circuit board 62. The insertion direction of the conductive post 85 into the mounting hole 331 may be parallel to the axial direction of the conductive post 85, perpendicular to the main side wall 33, and then perpendicular to the main surface 622 of the main control circuit board 62. After mounting the conductive post 85 in the mounting hole 331, the spring 854 may be clamped by the conductive contact 855 and the columnar body 851 to produce elastic deformation, so as to elastically press the conductive contact 855 on the corresponding contact, thereby achieving an electrical connection between the conductive post 85 and the main control circuit board 62.

Figure 22:
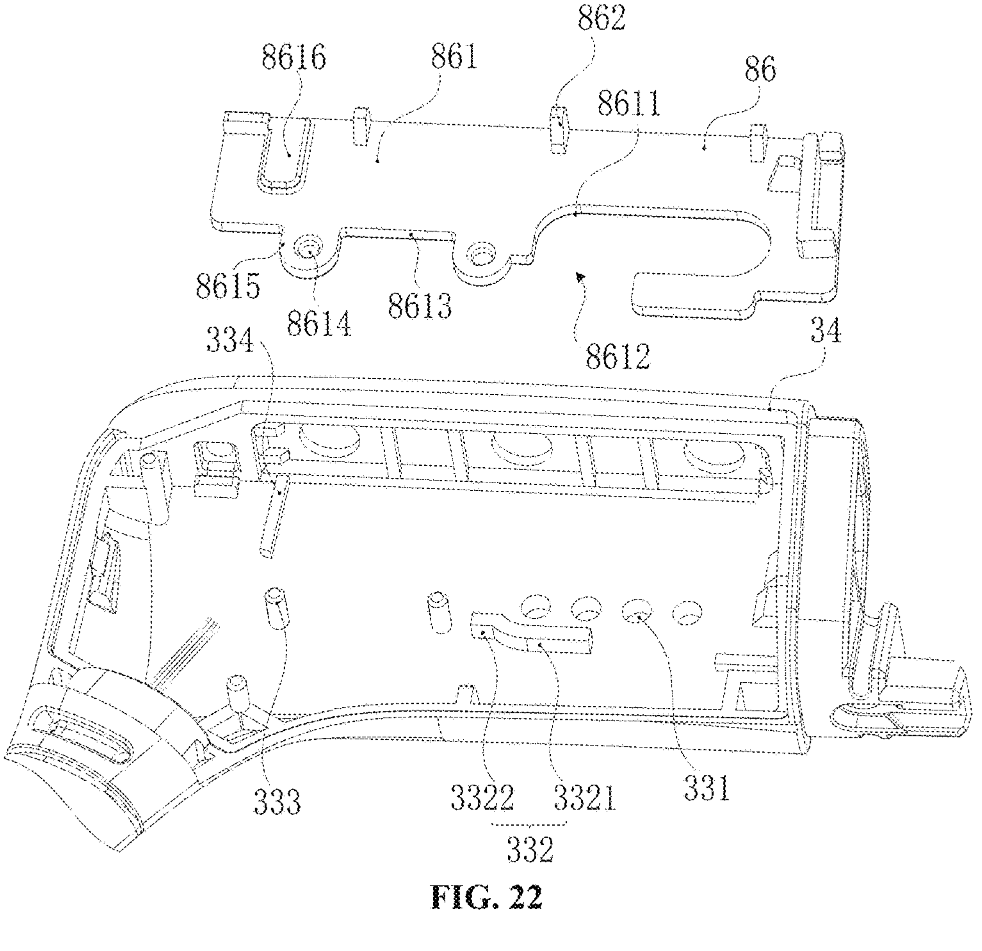
FIG. 22 is a schematic diagram illustrating an exploded view of partial structures of an exemplary circuit housing and an exemplary auxiliary film according to some embodiments of the present disclosure.
Figure 23:
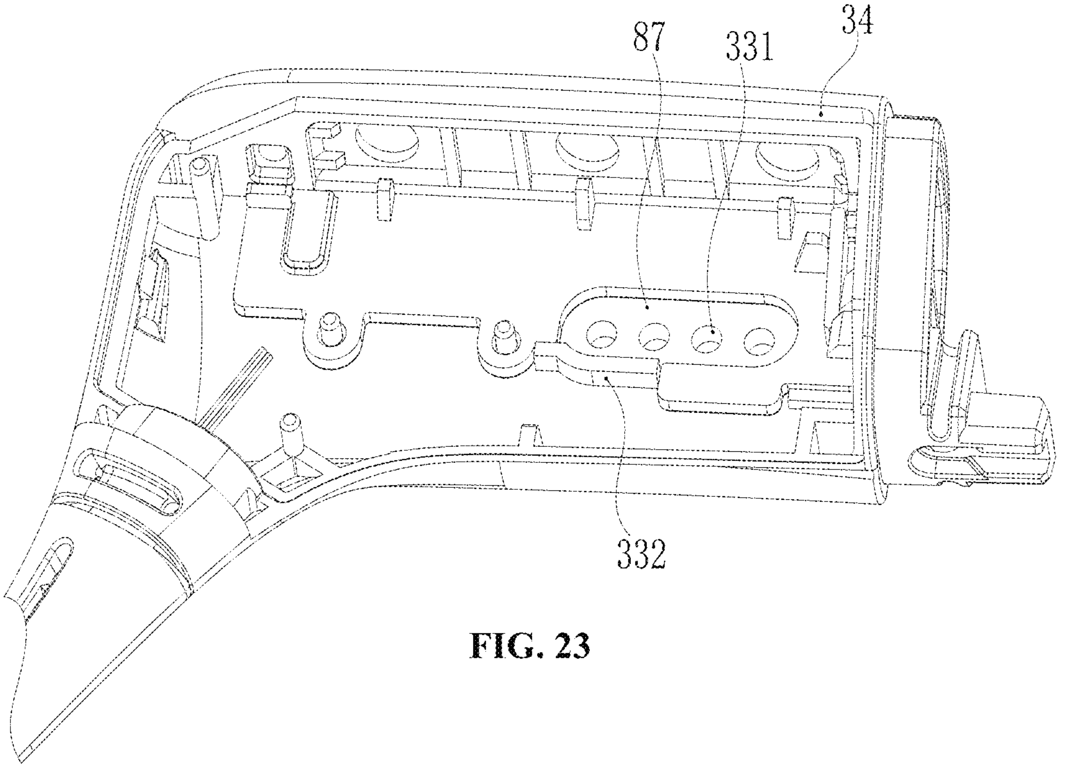
FIG. 23 is a schematic diagram illustrating partial structures of an exemplary circuit housing and an exemplary auxiliary film according to some embodiments of the present disclosure.

FIG. 22 is a schematic diagram illustrating an exploded view of partial structures of an exemplary circuit housing and an exemplary auxiliary film according to some embodiments of the present disclosure. FIG. 23 is a schematic diagram illustrating partial structures of an exemplary circuit housing and an exemplary auxiliary film according to some embodiments of the present disclosure. Referring to FIG. 2, FIG. 22, and FIG. 23, in some embodiments, an MP3 player may include an auxiliary film 86 located inside the circuit housing 30. The auxiliary film 86 may include a board 861. The board 861 may include a hollow region 8611. The board 861 may be disposed on an inner surface of the main side wall 33 by means of hot melting or hot pressing, bonding, etc. The mounting hole 331 on the main side wall 33 may be located inside the hollow region 8611. Specifically, a board surface of the board 861 may abut against the inner surface of the main side wall 33 in parallel. The auxiliary film 86 may have a certain thickness. After the auxiliary film 86 is placed on the inner surface of the main side wall 33, an inner sidewall of the hollow region 8611 of the auxiliary film 86 and the main side wall 33 may form a glue tank 87 located on a periphery of a conductive post 85 inserted in the mounting hole 331.

In some embodiments, a sealant may be applied in the glue tank 87, such that mounting hole 331 may be sealed from the inside of circuit housing 30 to improve the tightness of the circuit housing 30, thereby improving the waterproof performance of the bone conduction MP3 player.

In some embodiments, a material of the auxiliary film 86 may be the same as that of the circuit housing 30, and may be formed separately from the circuit housing 30. It should be noted that, during a molding stage of the circuit housing 30, there may be other structures near the mounting hole 331, such as the button hole 342 to be molded, etc. Molds corresponding to these structures during molding may need to be withdrawn from the inside of the circuit housing 30. At this time, if the glue tank 87 corresponding to the mounting hole 331 is integrated directly inside the circuit housing 30, a convex of the glue tank 87 may hinder a smooth withdrawal of the molds corresponding to these structures, thereby causing inconvenience to production. In this embodiment, the auxiliary film 86 and the circuit housing 30 may be independent structures. After forming the two structures separately, the auxiliary film 86 may be installed inside the circuit housing 30 to form the glue tank 87 together with the main side wall 33 of the circuit housing 30. In this way, during the molding stage of the circuit housing 30, the molds of a portion of the structures may be not hindered from withdrawing from the inside of the circuit housing 30, which may be beneficial to smooth production.

In some embodiments, when molding the circuit housing 30, the withdrawal of the molds may only take up part of the space occupied by the glue tank 87. Without affecting the withdrawal of the molds, a part of the glue tank 87 may be integrated on an inner surface of the main side wall 33, and the other parts of the glue tank 87 may still be formed by the auxiliary film 86.

In some embodiments, the inner surface of the main side wall 33 may be integrated with a first striped convex rib 332. A location of the first striped convex rib 332 may not affect the withdrawal of the mold of the circuit housing 30. The hollow region 8611 of the auxiliary film 86 may include a notch 8612. The first striped convex rib 332 may correspond to the notch 8612. After the circuit housing 30 and the auxiliary film 86 are formed respectively, the auxiliary film 86 may be placed on the inner surface of the main side wall 33, such that the first striped convex rib 332 may be at least partially fitted to the notch 8612. The first striped convex rib 332 and the auxiliary film 86 may be combined to make the glue tank 87 closed.

In this embodiment, since the first striped convex rib 332 does not hinder the withdrawal of the mold, a sidewall of the glue tank 87 may be formed by the first striped convex rib 332 and auxiliary film 86. The first striped convex rib 332 may be integrally formed on the inner surface of the main side wall 33.

In some embodiments, the first striped convex rib 332 may further extend to abut against a side edge 8613 of the board 861, thereby positioning the board 861. The first striped convex rib 332 may include a rib body 3321 and an arm 3322. The rib body 3321 may be configured to match and fit with the notch 8612 of the hollow region 8611, thereby forming a sidewall of the glue tank 87. The arm 3322 may be formed by a further extension of one end of the rib body 3321, and may extend to a side edge 8613 of the board 861 to abut against the side edge 8613, such that the board 861 may be positioned at the side edge 8613.

In some embodiments, a protrusion height of the first striped convex rib 332 on the inner surface of the main side wall 33 may be greater than, smaller than, or equal to a thickness of the auxiliary film 86, as long as the first striped convex rib 332 and the auxiliary film 86 can form the glue tank 87, and position the board 861 of the auxiliary film 86. The protrusion height of the first striped convex rib 332 is not limited herein.

In some embodiments, the board 861 may include a positioning hole 8614, and the positioning hole 8614 may penetrate through a main board surface of the board 861. The inner surface of the main side wall 33 may be integrated with the positioning post 333 corresponding to the positioning hole 8614. After the auxiliary film 86 is placed on the inner surface of the main side wall 33, the positioning post 333 may be inserted into the positioning hole 8614, thereby further positioning the auxiliary film 86. A count of the positioning hole 8614 may be equal to a count of the positioning post 333. In this embodiment, each of the counts of the positioning hole 8614 and the positioning post 333 may be two.

In an application scenario, at least two lugs 8615 may be formed on a side edge 8613 of the board 861, and two holes 8614 may be placed on corresponding lugs 8615, respectively. The inner surface of the main side wall 33 may be integrated with a second striped convex rib 334. The second striped convex rib 334 may extend in a direction toward the auxiliary side wall 34, and may be perpendicular to an extending direction of the 3322 of the first striped convex rib 332. The board 861 may also include a bar-shaped positioning groove 8616 corresponding to the second striped convex rib 334. The positioning groove 8616 may be recessed along a direction away from the main side wall 33, and one end of the positioning groove 8616 may be connected to the side edge 8613 of the board 861 and may be perpendicular to the side edge 8613.

In an application scenario, the positioning groove 8616 may be formed by a recession of a surface of the board 861 that abuts against the main side wall 33. A depth of the positioning groove 8616 may be less than the thickness of the board 861. In this case, a surface of the board 861 opposite to the recessed surface of the board 861 may be not affected by the positioning groove 8616. In another application scenario, the depth of the positioning groove 8616 may be greater than the thickness of the board 861, such that when a surface of the board 861 closed to the main side wall 33 is recessed, the other opposite surface of the board 861 may protrude toward a recessed direction, thereby forming the positioning groove 8616. After the auxiliary film 86 is placed on the inner surface of the main side wall 33, the second striped convex rib 334 may be embedded in the positioning groove 8616 to further position the board 861.

According to FIG. 17, FIG. 19, and FIG. 21, in some embodiments, the button circuit board 61 may be perpendicular to the main control circuit board 62 and disposed parallel to and spaced apart from the auxiliary side wall 34 of the circuit housing 30. The auxiliary side wall 34 corresponding to the button mechanism may include two types. One type of the auxiliary side wall 34 may face the back of the user's head when the user wears the speaker device, and the other type of the auxiliary side wall 34 may face the lower side of the user's head when the user wears the speaker device. In this embodiment, there may be two button circuit boards 61, which may be disposed parallel to and spaced apart from the corresponding two types of auxiliary side walls 34, respectively.

In some embodiments, the button circuit board 61 may be disposed on a side of the board body 861 of the auxiliary film 86, and the side of the board body 861 may face the auxiliary side wall 34. In some embodiments, the auxiliary film 86 may include a pressing foot 862 which may be protruded with respect to the plate body 861. The pressing feet 862 may be protruded and disposed at a side edge of the board 861 facing the auxiliary side wall 34 in a direction perpendicular to the main surface of the board 861. A count (or a number) of the pressing feet 862 may be one or more. In this embodiment, the pressing foot 862 may press the button circuit board 61 on the inner surface of the auxiliary side wall 34 using a side surface of the pressing foot 862 facing the auxiliary side wall 34, thereby fixing the button circuit board 61.

In some embodiments, the main control circuit board 62 and the main side wall 33 may be spaced apart. A main surface of the board body 861 of the auxiliary film 86 may be parallel to the main side wall 33 and spaced apart from the main control circuit board 62. Specifically, the pressing foot 862 may protrude along a direction from a main surface of the board body 861, away from the main side wall 33 of the circuit housing 30 close to the auxiliary film 86, and toward the main control circuit board 62. The pressing foot 862 may extend to a surface of the main control circuit board 62 to press the main control circuit board 62, and the main control circuit board 62 may be supported on at least a part of the pressing feet 862.

Referring to FIG. 2, FIG. 14, FIG. 17, and FIG. 22, in some embodiments, the housing sheath 17 may include an exposed hole 175 corresponding to the conductive post 85. After the housing sheath 17 over the periphery of the circuit housing 30, one end of the conductive post 85 located outside the circuit housing 30 may be exposed through the exposed hole 175, and then connected to an external circuit of the MP3 player, such that the MP3 player may provide power supply or data transmission through the conductive post.

In some embodiments, the outer surface of the circuit housing 30 may be recessed with a glue tank 39 surrounding a plurality of mounting holes 331. Specifically, a shape of the glue tank 39 may include an oval ring. The plurality of mounting holes 331 may be respectively disposed on the circuit housing 30 surrounded by the oval ring glue tank 39. A sealant may be applied to the glue tank 39. After the housing sheath 17 and the circuit housing 30 are assembled, the housing sheath 17 may be connected to the circuit housing 30 on a periphery of the mounting hole 331 via the sealant. In this way, when external liquid enters the inside of the housing sheath 17 through the exposed hole 175, the housing sheath 17 may be protected from sliding around the periphery of the circuit housing 30, and the mounting hole 331 may be further sealed from the outside of the circuit housing 30, which may further improve the tightness of circuit housing 30 and improve the waterproof performance of the MP3 player.

Figure 24:
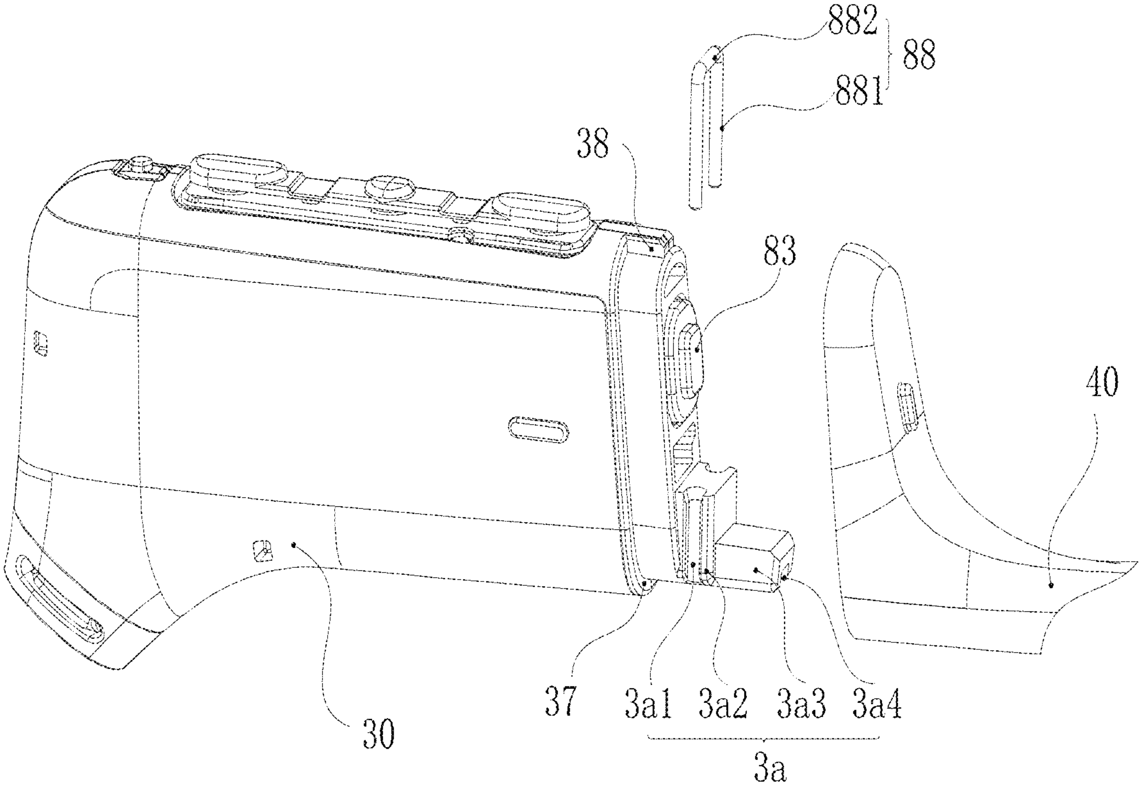
FIG. 24 is a schematic diagram illustrating an exploded view of partial structures of an exemplary circuit housing and an exemplary rear hook according to some embodiments of the present disclosure.
Figure 25:
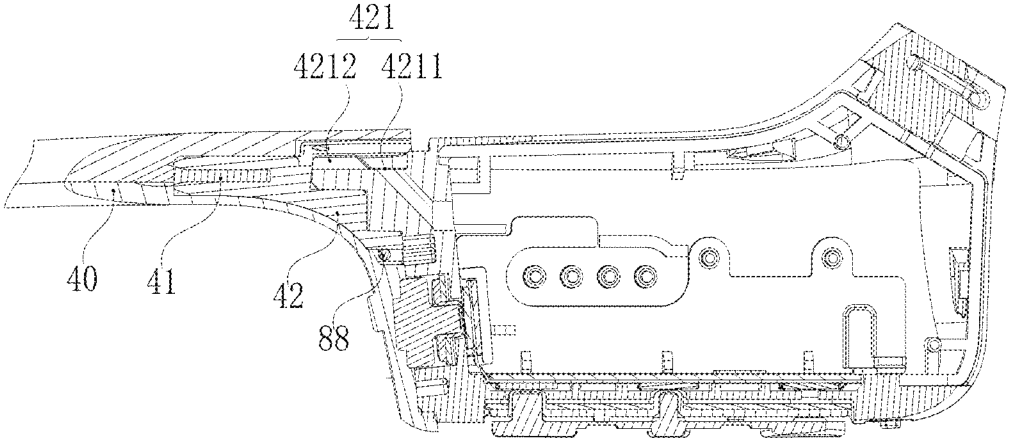
FIG. 25 is a schematic diagram illustrating partial structures of an exemplary circuit housing and an exemplary rear hook according to some embodiments of the present disclosure.
Figure 26:
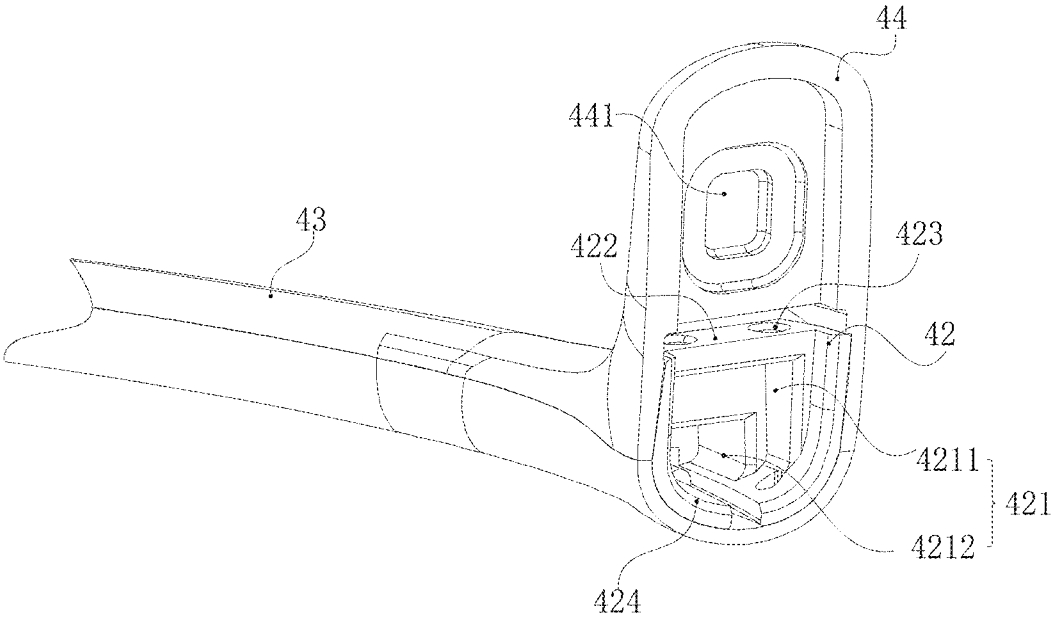
FIG. 26 is a schematic diagram illustrating partial structures of an exemplary rear hook according to some embodiments of the present disclosure.

FIG. 24 is a schematic diagram illustrating an exploded view of partial structures of an exemplary circuit housing and an exemplary rear hook according to some embodiments of the present disclosure. FIG. 25 is a schematic diagram illustrating partial structures of an exemplary circuit housing and an exemplary rear hook according to some embodiments of the present disclosure. FIG. 26 is a schematic diagram illustrating partial structures of an exemplary rear hook according to some embodiments of the present disclosure. Referring to FIG. 2, FIG. 24, FIG. 25, and FIG. 26, in some embodiments, the circuit housing 30 may include a plug end **3*a* at an end of the circuit housing 30 away from the ear hook 10, and the rear hook 40 may include plug ends 42 disposed at two ends of an elastic metal wire 41. The plug end 3*a* and the plug end 42** may be plugged and fixed to each other.

Since the MP3 player includes two earphone cores 50 (i.e., a right earphone core and a left earphone core), the core housing 20 may correspondingly include a right core housing and a right core housing, and the circuit housing 30 may correspondingly include a right circuit housing and a left circuit housing. The rear hook 40 may be connected to the two circuit housings, respectively. The core housing 20, the ear hook 10, and the circuit housing 30 on both sides may be connected in a plug manner, and hung on the back of the user's head when the user wears a speaker device including the MP3 player. The material and performance of the elastic metal wire 41 may be the same as that of the elastic metal wire 11. More descriptions regarding the elastic metal wire 141 may be found elsewhere in the present disclosure, which is not repeated here.

In some embodiments, the plug end 42 may be formed at two ends of the elastic metal wire 41 by injection molding. In some embodiments, the plug end 42 may include plastic or other materials. In some embodiments, the plug end 42 may include a socket 421, and the plug end **3*a* may be at least partially inserted into the socket 421. In this embodiment, the plug end 3*a* may be disposed on a side of the annular table 37 away from the ear hook 10. The connection manner between the plug end 3*a* and the socket 421 and the connection manner between the second plug end 15 and the second socket 31 may be the same or different. Opposite sides of the plug end 3*a* may respectively include slots 3*a*1 perpendicular to the insertion direction of the plug end 3*a* with respect to the socket 421. The two slots 3*a*1 may be spaced and symmetrically disposed on two sides of the plug end 3*a*. Further, each of the two slots 3*a*1 may be communicated with a corresponding side wall of the plug end 3*a*** in a direction perpendicular to the insertion direction.

A first side wall 422 of the plug end 42 may include a through hole 423 corresponding to positions of the two slots **3*al*. In some embodiments, the plug end 42 may include a side wall configured to define a surrounding arrangement of the socket 421, and the first side wall 422 of the plug end 42 may be inserted between the plug end 3*a* and the plug end 42. The first side wall 422 of the plug end 42 may intersect with an extending direction of the slot 3*a*1 when the plug 3*a* is plugged with the plug 42**.

In some embodiments, the MP3 player may include a fixing member 88. The fixing member 88 may include two parallel pins 881 and a connecting portion 882 configured to connect the pins 881. In some embodiments, the connecting portion 812 may be vertically connected to ends of the two pins 881 at a same side, thereby forming a U-shaped fixing member 88, a shape of which may be the same as or similar to that of the fixing member 81. It should be noted that the shape of the fixing member 88 may be similar to that of the fixing member 81, size parameters of the fixing member 88 may be different to that of the fixing member 81 according to the surrounding structure. In this embodiment, a length of the pin 881 may be greater than that of the pin 811, and a length of the connecting portion 812 may be less than that of the connecting portion 882, which is not limited herein.

In some embodiments, the pin 881 may be inserted into the slot **3*a*1 through the through hole 423 from the outside of the plug end 42, and the connecting portion 882 may be blocked from the outside of the plug end 3*a*, thereby realizing the connection between the plug end 42 and the plug end 3*a*. The fixing member 88 may include two pins 881 disposed in parallel and the connecting portion 882 for connecting the pins 881, so that the fixing member 88 may connect and fix the plug end 3*a* and the plug end 42 over a certain span, thereby improving the stability and reliability of the fixing between the circuit housing 30 and the rear hook 40. The fixing member 88 may have a simple structure which may be convenient to insert and remove, so that the connection between the plug end 3*a* and the plug end 42** may be detachable, thereby improving the assembly convenience of the MP3 player.

In some embodiments, the second side wall 424 of the plug end 42 opposite to the first side wall 422 of the plug end 42 may include one or more through holes 425 opposite to the through hole 423, and the pin 881 may pass through the slot **3*a*1 and insert into the through hole 425. That is, the pin 881 may connect the opposite side walls and the plug end of the plug end 42 of the rear hook 40 together, thereby improving the connection stability between the circuit housing 30 and the rear hook 40**.

In some embodiments, the plug end 3*a* may be divided into a first plug section 3*a*2 and a second plug section 3*a*3 along the insertion direction of the plug end 3*a* relative to the socket 421. The plug end 3*a* may be disposed on the side of the end of the circuit housing 30 near the auxiliary side wall 34. The auxiliary side wall 34 may be another auxiliary sidewall 34 opposite to the auxiliary side wall 34 where the positioning block 38 is located.

In some embodiments, the first plug section 3*a*2 and the second plug section 3*a*3 may have a stepped shape along the insertion direction of the plug end 3*a* relative to the socket 421 on the side close to the positioning block 38. In a cross-sectional direction perpendicular to the insertion direction, the cross-section of the first plug section 3*a*2 may be larger than the cross-section of the second plug section 3*a*3. Correspondingly, the socket 421 may be further divided into a first hole section 4211 and a second hole section 4212 whose shapes match the first plug section 3*a*2 and the second plug section 3*a*3 along the insertion direction of the socket end 3*a* relative to the socket 421. The plug end 3*a* may be inserted into the socket 421. The first plug section 3*a*2 and the second plug section 3*a*3 may be inserted into the first hole section 4211 and the second hole section 4212, respectively.

In some embodiments, the slot 3*a*1 may be disposed on the first plug section 3*a*2. In some embodiments, the slot 3*a*1 may be extended along the direction from the plug end 3*a* to the positioning block 38. The direction in which the two auxiliary side walls 34 of the circuit housing 30 may be opposite to each other. The two side walls of the first plug section 3*a*2 perpendicular to the main side wall 33 of the circuit housing 30 may be penetrated. The two side walls of the first plug section 3*a*2 parallel to the main side wall 33 of the circuit housing 30 may be further penetrated in the vertical insertion direction. The through hole 423 disposed on the plug end 42 may correspond to the side of the slot 3*a*1 facing the positioning block 38. The through hole 425 may correspond to the side of the slot 3*a*1 away from the positioning block 38.

In some embodiments, top sides of the first plug section 3*a*2 and the second plug section 3*a*3 may be coplanar with each other. The top side of the first plug section 3*a*2 and the second plug section 3*a*3 may refer to the side of the first plug section 3*a*2 and the second plug section 3*a*3 facing the top side of the head when the user normally wears the MP3 player. The top side may be a side opposite to the step formed by the first plug section 3*a*2 and the second plug section 3*a*3. In some embodiments, the top sides of the first plug section 3*a*2 and the second plug section 3*a*3 may be coplanar and formed a wiring slot 3*a*4 configured to accommodate a wire. The wiring slot 3*a*4 may extend along the insertion direction of the plug end 3*a* and the socket hole 421. The wiring slot 3*a*4 may be configured to accommodate the wires connecting the control circuit 60 and the battery 70 through the rear hook 40.

In some embodiments, the plug end 3*a* may be inserted into the socket 421. The slot 3*a*1 may be inserted from the side of the first plug section 3*a*2 facing the positioning block 38. In some embodiments, the plug end 3*a* may be disposed on a side of the circuit housing 30 facing the rear hook 40 away from the positioning block 38. Therefore, there may be a certain space on the side of the plug end 3*a* facing the positioning block 38. When the circuit housing 30 and the rear hook 40 are plugged in, the fixing component 88 may be removed from the bottom side of the first plug section 3*a*2. The side of the first plug section 3*a*2 facing the positioning block 38 may be inserted into the slot 3*a*1 through the through-hole 423 and then into the through hole 425, thereby achieving the fixing of the circuit housing 30 and the rear hook 40. In this way, the fixing component 88 may be completely hidden in the internal space formed by the circuit housing 30 and the rear hook 40 without being exposed, thereby eliminating the need to occupy additional space.

In some embodiments, the rear hook 40 may further include a second protective sleeve 43 injection-molded on the periphery of the elastic metal wire 41 and the plug end 42 and an end protection cover 44 integrally formed with the second protective sleeve 43. The material of the second protective sleeve 43 and the end protective cover 44 may be the same as the material of the protective sleeve 16 and the housing sheath 17. The material of the protective sleeve 16 and the housing sheath 17 may include soft material with a certain elasticity, such as the soft silicone, the rubber, or the like, or any combination thereof. The end protection cover 44 may be formed at two ends of the elastic metal wire 41. The end protection cover 44 may be integrally formed with the plug end 42 located at both ends of the elastic metal wire 41 on the periphery of the plug end 42.

It should be noted that the housing sheath 17 is only wrapped by the end of the circuit housing 30 facing the ear hook 10 to the annular table 37 of the circuit housing 30. Therefore, the portion of the annular countertop 37 of the circuit housing 30 facing the rear hook 40 may be exposed from the periphery of the housing sheath 17. In some embodiments, the shape of the inner sidewall formed by the end protection cover 44 and the plug end 42 may match the shape of the exposed end of the circuit housing 30 to cover the periphery of the end of the exposed the circuit housing 30. The end surface of the end protection cover 44 facing the circuit housing 30 and the end face of the housing sheath 17 facing the rear hook 40 may elastically abut, thereby providing the sealing.

In some embodiments, the end of the circuit housing 30 exposed from the housing sheath 17 may include one or more button holes 342. Correspondingly, the button hole(s) 342 may include one or more button(s) 83, and the end protective cover 44 may cover the button(s) 83. The end protective cover 44 may include a button accommodating groove 441 configured to accommodate the button(s) 83. The button hole(s) 342 may be spaced apart on the side of the plug end 3*a* facing the positioning block 38. The count of the button hole(s) 342 may be one or more, which may be determined based on a specific structure of the control circuit 60 inside the circuit housing 30 and a structure of the circuit housing 30, and not limited herein.

Based on the MP3 player described above, as shown in FIG. 2, in some embodiments, the position of the core housing 20 of the earphone core 50 in the MP3 player may not be fixed. The core housing 20 of the earphone core 50 may fit different parts of the user's cheek (e.g., in front of the ear, behind the ear, etc.). The user can experience different sound quality. Users may adjust the MP3 player according to their own preferences. It is convenient for users with different head sizes. For example, the MP3 player shown in FIG. 2 may be fixed to the human ear by the ear hook 10, and the core housing 20 of the earphone core 50 may be located in front of the ear. In some embodiments, the ear hook 10 may be elastically deformable. The ear hook 10 may be bent to change the fitting position of the core housing 20 of the earphone core 50 on the human body. In some embodiments, the ear hook 10 may be configured to connect to the core housing 20 of the earphone core 50, and may be set according to the position of the user. For example, the user may be accustomed to placing the core housing 20 of the earphone core 50 behind the ear. The connection end of the ear hook 10 may be set behind the ear while maintaining the fixed function of the ear hook 10. Details for the connection way between the ear hook 10 and the core housing 20 of the earphone core 50 may be found elsewhere in the present disclosure. It should be noted that the connection way between ear hook 10 and core housing 20 of the earphone core 50 may be not limited to the clamping connection. For example, the ear hook 10 and the core housing 20 of the earphone core 50 may also be connected by means of a hinge joint. Details for the hinge may be found elsewhere in the present disclosure.

In some embodiments, the core housing 20 of the earphone core 50 may fit on any position of the user's head, for example, the top of the head, forehead, cheeks, horns, auricle, back of auricle, or the like. In some embodiments, the bonding way of the bone conduction headset and the head may be a face fit or a point fit. The bonding surface may be disposed with a gradient structure, which refers to a region where the surface of the contact surface has a high change. The gradient structure may be a convex/concave or stepped structure on the outside of the contact surface (e.g., the side that is in contact with the user), a convex/concave or stepped structure on the inside of the contact surface (e.g., the side facing away from the user), etc.

Figure 27:
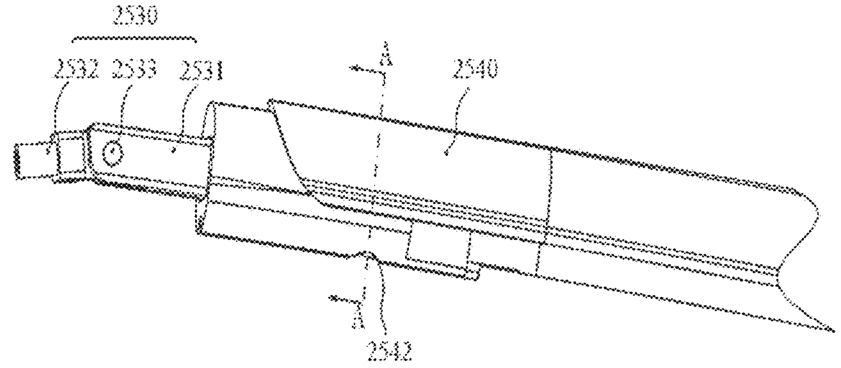
FIG. 27 is a schematic structural diagram illustrating an exemplary hinge component according to some embodiments of the present disclosure.
Figure 28:
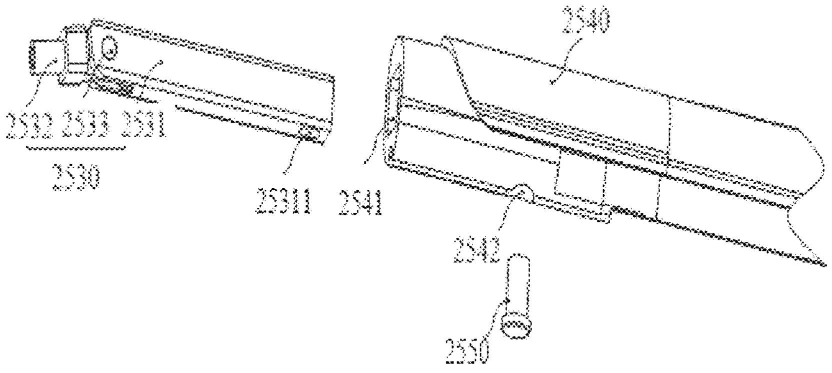
FIG. 28 is a schematic diagram illustrating an exploded view of an exemplary hinge component according to some embodiments of the present disclosure.

FIG. 27 is a schematic structural diagram illustrating an exemplary hinge component according to some embodiments of the present disclosure. FIG. 28 is a schematic diagram illustrating an exploded view of an exemplary hinge component according to some embodiments of the present disclosure. As shown in FIG. 27 and FIG. 28, the hinge component may include a hinge 2530, which is a structure used to connect two solid bodies and allow relative rotation between them. In some embodiments, the connection between the ear hook 10 and the core housing 20 may also be performed by means of the hinge joint.

Referring to FIG. 2, FIG. 27 and FIG. 28, the hinge component may be disposed at an end of the ear hook 10 away from the circuit housing 30. The hinge component may connect with the core housing 20 to the end of the ear hook 10 away from the circuit housing 30 through the hinge 2530. In some embodiments, the hinge component may include a rod-like component 2540 and a fixing component 2550. In some embodiments, the hinge 2530 may include a hinge base 2531 and a hinge arm 2532. The hinge arm 2532 may be rotatably connected to the hinge base 2531 through a rotation shaft 2533. The hinge base 2531 and the hinge arm 2532 may be respectively connected to two components that need to be rotationally connected. The two components may be rotationally connected together through the rotation shaft 2533 of the hinge 2530.

In some embodiments, the hinge base 2531 of the hinge 2530 may be connected to the rod-like component 2540. In some embodiments, the rod-like component 2540 may be a partial structure or an overall structure of one of the two members rotationally connected through the hinge 2530. In some embodiments, the rod-like component 2540 may be a connection structure in which one of the two members requiring rotational connection is connected to the hinge 2530. When the hinge component is used in an MP3 player, the rod-like component 2540 may be at least a part of the ear hook 10 of the MP3 player. For example, the rod-like component 2540 may be all of the ear hook 10. As another example, the rod-like component 2540 may be part of the end of the ear hook 10 away from the circuit housing 30. In some embodiments, the hinge 2530 may be set at the end of the ear hook away from the circuit housing 30 through the part of the ear hook 10.

In some embodiments, the rod-like component 2540 may be disposed along the length direction with a hinge cavity 2541 communicating with the end surface of the rod-like component 2540. A sidewall of the rod-like component 2540 may be disposed with a first insertion hole 2542 communicating with the hinge cavity 2541. The end of the hinge base 2531 away from the hinge arm 2532 may be inserted into the hinge cavity 2541 from the end surface of the rod-like component 2540, and may be fixed in the hinge cavity 2541 by the fixing component 2550 inserted in the first insertion hole 2542. In some embodiments, the hinge cavity 2541 may communicate with the ear hook 10 away from the end face of the end of the circuit housing 30. The hinge base 2531 may be inserted into the hinge cavity 2541. The hinge 2530 may be connected to the ear hook 10.

In some embodiments, the first insertion hole 2542 may be formed by the rod-like component 2540 during the molding process, or may be formed on the side wall of the rod-shaped member by a mean such as drilling after the molding. In some embodiments, the shape of the first insertion hole 2542 may be circular. In some embodiments, the shape of the first insertion hole 2542 may be other shapes (e.g., a square, a triangle, etc.). The shape of the fixing component 2550 may match the shape of the first insertion hole 2542. The fixing component 2550 may be inserted into the first insertion hole 2542 from the outside of the rod-like component 2540. The hinge base 2531 may be fixed in the hinge cavity 2541 by abutting the side wall of the hinge base 2531. In some embodiments, the hinge base 2531 may be fixed in the hinge cavity 2541 by penetrating and inserting into the outer wall of the hinge base 2531. In some embodiments, a matching thread may be disposed on the inner wall of the first insertion hole 2542 and the outer wall of the fixing component 2550. The fixing component 2550 may be connected to the first insertion hole 2542 by screwing to further fix the hinge base 2531 in the hinge cavity 2541. In some embodiments, the first insertion hole 2542 and the fixing component 2550 may be connected by an interference fit.

In some embodiments, the hinge arm 2532 may be connected with other components. After connecting with the hinge arm 2532, the component may be further able to rotate around the rotation shaft 2533 by being mounted in the hinge cavity 2541 of the rod-like component 2540 with the hinge base 2531 or other components connected with the rod-like component 2540. For example, when the hinge component is used in the MP3 player, the core housing 20 may be connected to the end of the hinge arm 2532 away from the hinge base 2531. The core housing 20 of the earphone core 50 may be connected to the end of the ear hook 10 away from the circuit housing 30 through the hinge 2530.

In some embodiments, the rod-like component 2540 may be disposed with the hinge cavity 2541 connected to an end surface of the rod-like component 2540. The hinge 2530 may accommodate the hinge seat 252531 in the hinge cavity 41, and further penetrate the fixing component 2550 through the sidewall of the rod-like component 2540 through the first insertion hole 2542, thereby fixing the hinge base 2531 accommodated in the hinge cavity 2541 in the hinge cavity 2541. The hinge 2530 may be detached from the rod-like component 2540 to facilitate replacement of the hinge 2530 or the rod-like component 2540. In some embodiments, the hinge 2530 and the core housing 20 of the MP3 player may be detachable relative to the ear hook 10, thereby facilitating replacement when the core housing 20 of the earphone core 50 or the ear hook 10 is damaged.

In some embodiments, the hinge base 2531 may be disposed with a second insertion hole 25311 corresponding to the first insertion hole 2542. The fixing component 2550 may be further inserted into the second insertion hole 25311. In some embodiments, the shape of the second insertion hole 25311 may match the shape of the fixing component 2550. The fixing component 2550 may be inserted into the second insertion hole 25311 to fix the hinge seat 2531 after passing through the first insertion hole 2542. The shaking of the hinge base 2531 in the hinge cavity 2541 may be reduced, and the hinge 2530 may be fixed more firmly. In some embodiments, the inner wall of the second insertion hole 25311 may be disposed with matching threads on the outer wall corresponding to the fixing component 2550. The fixing component 2550 and the hinge base 2531 may be screwed together. In some embodiments, the inner wall of the second insertion hole 25311 and the outer side wall at the corresponding contact positions of the fixing component 2550 may be smooth surfaces. The fixing component 2550 and the second insertion hole 25311 may be in interference fit. In some embodiments, the second insertion hole 25311 may be disposed through both sides of the hinge base 2531. The fixing component 2550 may further penetrate the entire hinge base 2531. The hinge base 2531 may be firmly fixed in the hinge cavity 2541.

In some embodiments, the cross-sectional shape of the hinge base 2531 may match the cross-sectional shape of the hinge cavity 2541 in a cross section perpendicular to the length direction of the rod-like component 2540. A seal may be formed between the hinge base 2531 and the rod-like component 2540 after insertion. In some embodiments, the cross-sectional shape of the hinge base 2531 and the cross-sectional shape of the hinge cavity 2541 may be any shapes, as long as the hinge base 2531 may be inserted into the hinge cavity 2541 from the end of the rod-like component 2540 away from the hinge arm 2532. In some embodiments, the first insertion hole 2542 may be disposed on the sidewall of the hinge cavity 2541, penetrate the side wall of the hinge cavity 2541 and communicate with the hinge cavity 2541.

In some embodiments, the cross-sectional shape of the hinge base 2531 and the cross-sectional shape of the hinge cavity 2541 may be both rectangular. The first insertion hole 2542 may be perpendicular to one side of the rectangle. In some embodiments, the corners of the outer wall of the hinge base 2531 or the corners of the inner wall of the hinge cavity 2541 may be rounded. The contact between the hinge base 2531 and the hinge cavity 2541 may be smooth. The hinge base 2531 may be smoothly inserted into the hinge cavity 2541.

In some embodiments, the hinge component may include a connection line provided outside the hinge 2530. In some embodiments, the connection line may be a connection line having an electrical connection function and/or a mechanical connection function. The hinge component may be configured to connect the end of core housing 20 and the ear hook 10 away from the circuit housing 30. The control circuit or the like related to the core housing 20 may be disposed in the ear hook 10 or the circuit housing 30. The connecting wire 2560 may electrically connect a core housing 20 with a control circuit in the ear hook 10 or the circuit housing 30. In some embodiments, the connecting wire 2560 may be located at one side of the hinge base 2531 and the hinge arm 2532. The hinge 2530 may be disposed in the same accommodation space.

In some embodiments, the hinge base 2531 may include a first end surface. The hinge arm 2532 may have a second end surface opposite to the first end surface. It is easily understood that there is a certain gap between the first end surface and the second end surface, so that the hinge base 2531 and the hinge arm 2532 may be relatively rotated around the rotation shaft 2533. In some embodiments, during the relative rotation of the hinge arm 2532 and the hinge base 2531, the relative position between the first end surface and the second end surface changes accordingly, so that the gap between the two becomes larger or smaller.

In some embodiments, the gap between the first end surface and the second end surface may be always larger than or less than the diameter of the connecting wire 2560. The connecting wire 2560 located outside the hinge 2530 may not be caught in the gap between the first end surface and the second end surface during the relative rotation of the hinge base 2531 and the hinge arm 2532, thereby reducing the damage of the connecting wire 2560 by the hinge. In some embodiments, the ratio of the gap between the first end surface and the second end surface to the diameter of the connection line during the relative rotation of the hinge arm 2532 and the hinge base 2531 may always be greater than 1.5 (e.g., greater than 1.5, 1.7, 1.9, 2.0, etc.) or less than 0.8 (e.g., less than 0.8, 0.6, 0.4, 0.2, etc.).

Figure 29:
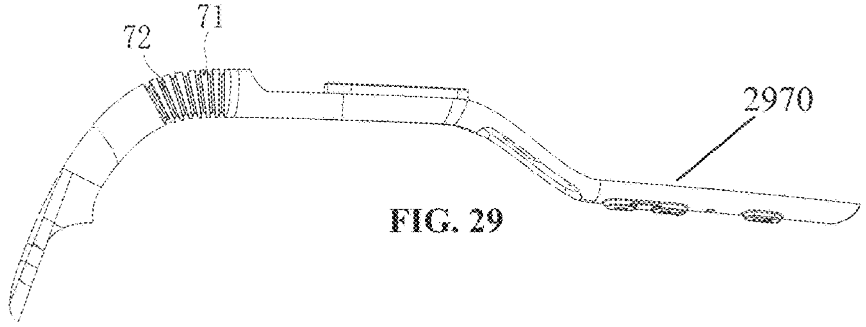
FIG. 29 is a schematic structural diagram illustrating an exemplary hinge component according to some embodiments of the present disclosure.
Figure 30:
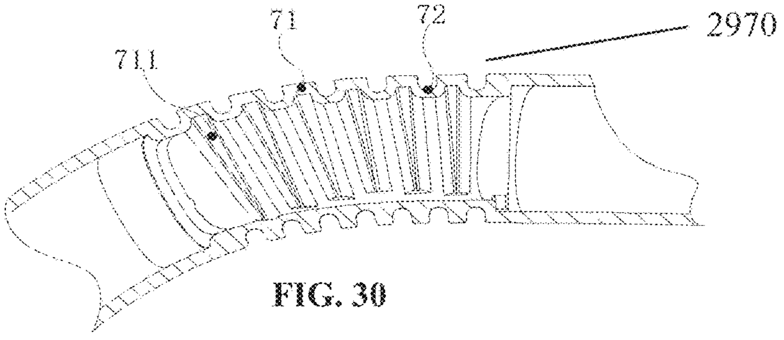
FIG. 30 is a schematic diagram illustrating a partial cross-sectional view of an exemplary hinge component according to some embodiments of the present disclosure.

FIG. 29 is a schematic structural diagram illustrating an exemplary hinge component according to some embodiments of the present disclosure. FIG. 30 is a schematic diagram illustrating a partial cross-sectional view of an exemplary hinge component according to some embodiments of the present disclosure. As shown in FIG. 29 and FIG. 30, in some embodiments, the hinge component may further include a protective sleeve 2970. The protective sleeve 2970 may be sleeved on the periphery of the hinge 2530 and may be bent along with the hinge 2530. In some embodiments, the protective sleeve 2970 may include a plurality of annular ridge portions 71 spaced apart along the length direction of the protective sleeve 2970 and an annular connection portion 72 provided between the annular ridge portions 71. The protective sleeve 2970 may be used to connect two adjacent annular ridge portions. In some embodiments, the tube wall thickness of the annular ridge portion 71 may be greater than the tube wall thickness of the annular connection portion 72. The length direction of the protective sleeve 2970 may be consistent with the length direction of the hinge 2530. The protection sleeve 70 may be specifically disposed along the length direction of the hinge base 2531 and the hinge arm 2532. The protective sleeve 2970 may include the soft material, such as the soft silicone, the rubber, or the like, or any combination thereof.

In some embodiments, the annular ridge portion 71 may be formed by protruding outwardly from the outer side wall of the protective sleeve 2970. The shape of the inner side wall of the protective sleeve 2970 corresponding to the annular ridge portion 71 may be not limited herein. For example, the surface of inner wall may be smooth. As another example, a recess on the inner wall may be disposed at a position corresponding to the annular ridge portion 71. The annular connection portion 72 may be configured to connect adjacent annular ridge portions 71, specifically connected to the edge region of the annular ridge portion 71 near the inside of the protective sleeve 2970. A side of the outer wall of the protective sleeve 2970 may be disposed in a recess with respect to the annular ridge portion 71.

When the hinge base 2531 and the hinge arm 2532 of the hinge 2530 are relatively rotated around the rotation shaft 2533, the angle between the hinge base 2531 and the hinge arm 2532 may change. The protective sleeve 2970 may be bent. In some embodiments, when the protective sleeve 2970 is bent with the hinge 2530, the annular ridge 71 and the annular connection portion 72 located in the outer region of the bent shape formed by the protective sleeve 2970 may be in a stretched state. The annular ridge 71 and annular connection portion 72 located in the inner region of the bent shape may be in a squeezed state.

The tube wall thicknesses of the annular ridge portion 71 and the annular connection portion 72 may refer to the thickness between the inner and outer walls of the protective sleeve 2970 corresponding to the annular ridge portion 71 and the annular connection portion 72, respectively. In some embodiments, the thickness of the pipe wall of the annular ridge portion 71 may be greater than the thickness of the pipe wall of the annular connection portion 72. The annular ridge portion 71 may be harder than the annular connection portion 72. Therefore, when the protective sleeve 2970 is in a bent state, the protective sleeve 2970 on the outer side of the bent shape may be in a stretched state. The annular ridge portion 71 may provide a certain strength support for the protective sleeve 2970. When the protective sleeve 2970 region on the inner side in the bent state is squeezed, the annular ridge portion 71 may withstand a certain pressing force, thereby protecting the protective sleeve 2970 and improving the stability of the protective sleeve 2970. The service life of the protective sleeve 2970 may be extended.

In some embodiments, the shape of the protective sleeve 2970 may be consistent with the state of the hinge 2530. In some embodiments, two sides of the protective sleeve 2970 along the length direction and rotated around the rotation axis may be stretched or squeezed. In some embodiments, the hinge base 2531 and the hinge arm 2532 of the hinge 2530 may only rotate around the rotation shaft 2533 within a range of less than or equal to 180°. The protective sleeve 2970 may only be bent toward one side, then one side of the two sides of the protective sleeve 2970 in the length direction may be squeezed. The other side may be stretched. At this time, according to the different forces on both sides of the protective sleeve 2970, the two sides of the protective sleeve 2970 under different forces may have different structures.

In some embodiments, the width of the annular ridge portion 71 along the length direction of the protective sleeve 2970 when the protective sleeve 2970 is in a bent state toward the outside of the bent shape formed by the protective sleeve 2970 may be greater than the width in the longitudinal direction of the protective sleeve 2970 toward the inside of the bent shape. Increasing the width of the annular ridge 71 in the length direction of the protective sleeve 2970 may further increase the strength of the protective sleeve. In some embodiments, the angle of the initial angle between the hinge base 2531 and the hinge arm 2532 may be less than 180°. If the annular ridges 71 of the protective sleeve 2970 are evenly arranged, the protective sleeve 2970 will be squeezed in the original state. In some embodiments, the width of the annular ridge 71 corresponding to the outer region side of the bent shape in the bent state is larger, thereby enlarging the length of the side protective sleeve 2970. The strength of the protective sleeve 2970 may be improved. The extent of the stretching side may be reduced when the protective sleeve 2970 is bent. At the same time, the width of the annular ridge portion 71 along the longitudinal direction of the protective sleeve 2970 may be smaller when the protective sleeve 2970 is in a bent state toward the inner region side of the bent shape, which can increase the space of the extruded annular connection portion 72 in the length direction of the protective sleeve 2970 and alleviate the extrusion of the extrusion side.

In some embodiments, the width of the annular ridge portion 71 may gradually decrease from the side of the outer region toward the bent shape to the side of the inner region toward the bent shape. When the protective sleeve 2970 is in the bent state, the width toward the outer region side of the bent shape formed by the protective sleeve 2970 may be greater than the width toward the inner region side of the bent shape. The annular ridge portion 71 may be disposed around the periphery of the protective sleeve 2970. In the length direction of the protective sleeve 2970, one side corresponds to the stretched side, and the other side corresponds to the squeezed side. In some embodiments, the width of the annular ridge portion 71 may gradually decrease from the side of the outer region facing the bent shape to the side of the inner region facing the bent shape, thereby making the width more uniform. The stability of the protective sleeve 2970 may be improved.

In some embodiments, when the protective sleeve 2970 is in a bent state, the annular ridge portion 71 may be disposed with a groove 711 on an inner circumferential surface of the protective sleeve 2970 inside the protective sleeve 2970 on the outer region side of the bent shape formed by the protective sleeve 2970. The groove 711 may be disposed along a length direction perpendicular to the protective sleeve 2970. The corresponding annular ridge portion 71 may be appropriately extended when the protective sleeve 2970 is stretched in the length direction. When the protective sleeve 2970 is in a bent state, the protective sleeve 2970 on the outer side of the bent shape formed by the protective sleeve 2970 may be in a stretched state. A groove 711 may be disposed on the inner ring surface inside the protective sleeve 2970 corresponding to the corresponding annular ridge portion 71, so that when the side protective sleeve is stretched, the annular ridge portion 71 corresponding to the groove 711 may be appropriately extended to bear a partial stretch, thus reducing the tensile force experienced by the side protective sleeve, thereby protecting the protective sleeve 2970.

It should be noted that when the protective sleeve 2970 is in a bent state, the annular ridge portion 71 on the side facing the inner region of the bent shape may not be disposed with a groove 711 on the inner side wall of the corresponding protective sleeve 2970. In some embodiments, the width of the groove 711 along the length of the protective sleeve 2970 gradually decreases from the side of the outer region facing the bent shape to the side of the inner region facing the bent shape, so that no groove 711 is disposed on the inner sidewall of the protective sleeve 2970 corresponding to the annular ridge portion 71 facing the inner region side of the bent shape.

In some embodiments, when the hinge component is applied to an MP3 player of a speaker device of the present disclosure, the protective sleeve 2970 may be connected to the ear hook 10 and the core housing 20 which are respectively disposed on both sides in the longitudinal direction of the protective sleeve 2970. In some embodiments, the protective sleeve 2970 may also be other structures in the MP3 player. For example, the protective cover of some components may be integrally formed, so that the MP3 player may be more closed and integrated.

It should be noted that the hinge component in the present disclosure embodiment may not only be used in the MP3 player of the speaker device, but may also be used in other apparatuses, such as glasses, the headphone, and the hearing aid. In some embodiments, the hinge component may also include the rod-like component 2540, the fixing component 2550, the connecting wire 2560, the protective sleeve 2970, etc., or other components related to the hinge 2530. The hinge component may realize the corresponding functions of the other components.

Figure 31:
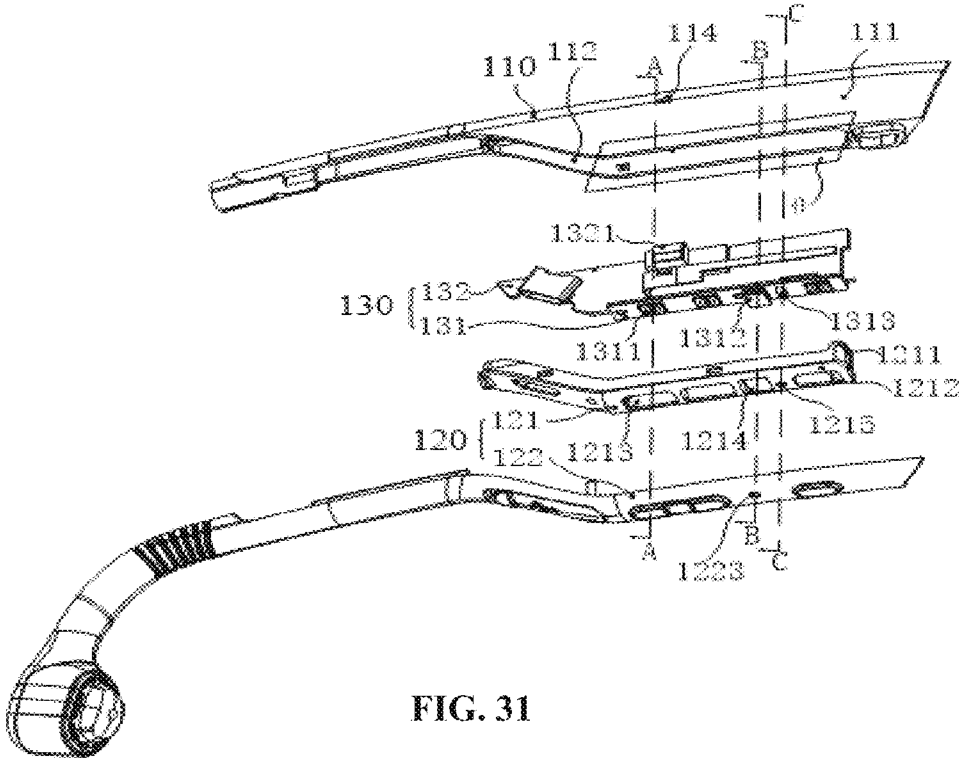
FIG. 31 is a schematic diagram illustrating an exploded structural view of an exemplary electronic component according to some embodiments of the present disclosure.
Figure 32:
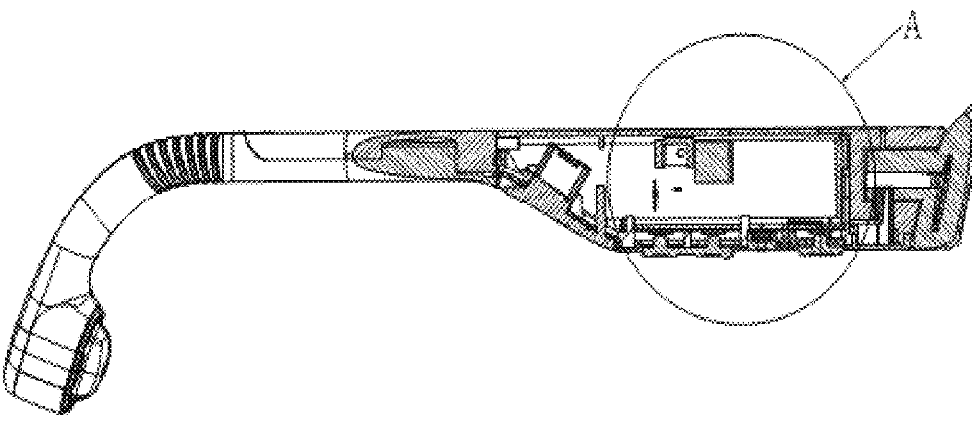
FIG. 32 is a schematic diagram illustrating a partial cross-sectional view of an exemplary electronic component according to some embodiments of the present disclosure.
Figure 33:
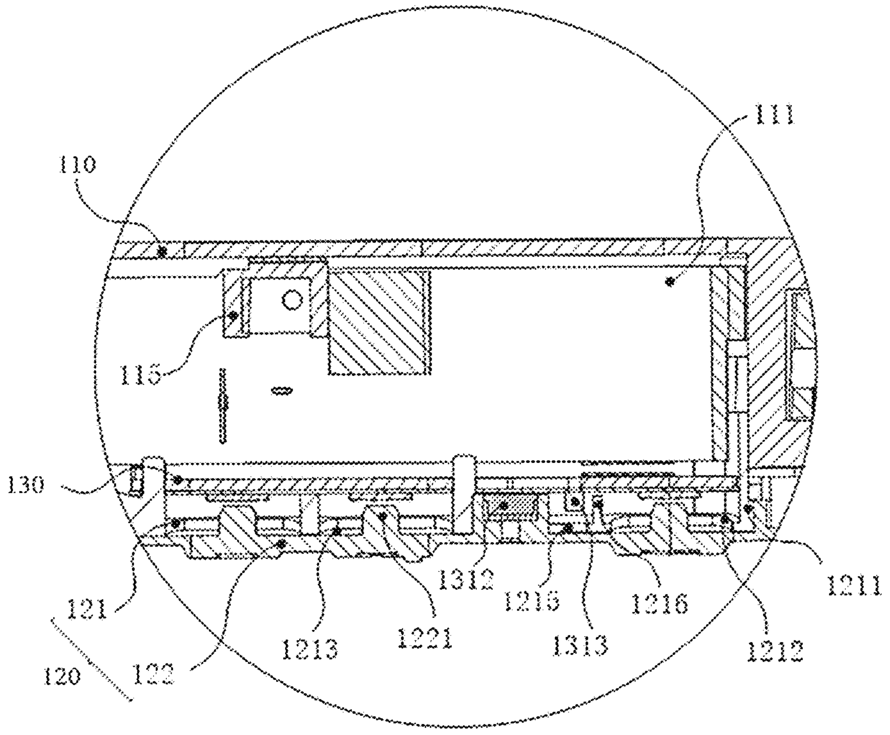
FIG. 33 is a schematic diagram illustrating an enlarged view of part A in FIG. 32 according to some embodiments of the present disclosure.

FIG. 31 is a schematic diagram illustrating an exploded structural view of an exemplary electronic component according to some embodiments of the present disclosure. FIG. 32 is a schematic diagram illustrating a partial cross-sectional view of an exemplary electronic component according to some embodiments of the present disclosure. FIG. 33 is a schematic diagram illustrating an enlarged view of part A in FIG. 32 according to some embodiments of the present disclosure. The electronic components in the present disclosure may be applied to an electronic device. The electronic device may be any electronic device that needs to seal the internal structure, such as the earphone, the MP3 player, the hearing aid, a mobile phone, a tablet computer, or glasses with a circuit component and an electronic device, or the like, or any combination thereof. In some embodiments, the electronic component may include the circuit housing 30 in FIG. 2 and its internal circuits. The electronic component may be also referred to as the circuit housing (e.g., the circuit housing 30).

Referring to FIG. 31, FIG. 32, and FIG. 33, in some embodiments, the electronic component (e.g., the circuit housing 30) may include an accommodation body 110 and a cover body 120. The accommodation body 110 may be disposed with a cavity 111 having at least one opening 112. The cover body 120 may be covered on the opening 112 of the cavity 111, and may be used to seal the cavity 111.

In some embodiments, the accommodation body 110 may be at least part of the electronic device. The accommodation body 110 may be a structure for holding other components such as a circuit board, a battery, and electronic components in an electronic device. For example, the accommodation body 110 may be the whole of the ear hook of the MP3 player or a part of the ear hook of the MP3 player. In some embodiments, the accommodation body 110 may be disposed with the cavity 111 having the opening 112 for containing the circuit board, battery, and electronic components.

The shape of the cover body 120 may at least partially match the shape of the opening 112. The cover body 120 may be placed on the opening 112 to seal the cavity 111. The material of the cover body 120 may be different from or partially the same as the material of the accommodation body 110. In some embodiments, the cover body 120 may include a hard support 121 and a soft cover layer 122. The support 121 may be used for physical connection with the accommodation body 110. The soft cover layer 122 may be integrally injection-molded on the surface of the support 121 to provide a seal for the cavity 111 after the support 121 is connected to the accommodation body 110.

In some embodiments, the material of the support 121 may be a hard plastic. The material of the soft cover layer 122 may be the soft silicone or the rubber. The shape of the side of the support 121 facing the accommodation body 110 may match the shape of the opening 112. The support 121 may be fixed to the opening 112 of the cavity 111 by means of inserting, buckling, etc. The support 121 may be physically connected with the accommodation body 110. The hard support 121 may be easily to form a gap at the physical connection of the accommodation body 11 and reduce the sealing of the cavity 111. In some embodiments, the soft cover layer 122 may be integrally injection-molded and formed on the outer surface of the support 121 away from the accommodation body 110. The soft cover layer 122 may further cover the connection between the support 121 and the accommodation body 11, thereby achieving the seal of the cavity 111.

In some embodiments, the cover body 120 may include the hard support 121 and the soft cover layer 122 integrally injection-molded on the surface of the hard support 121. The support 121 may be physically connected to the accommodation body 110. The soft cover layer 122 may further provide a seal for the cavity 111 after the support 121 is connected to the accommodation body 11. The soft cover layer 122 may be more conducive to fit the gap between the support 121 and the accommodation body 110. The sealing performance of the electronic component and the waterproof effect of the electronic component may be improved. At the same time, the support 121 and the soft cover layer 122 may be integrally injection-molded. The assembly process of electronic components may be simplified.

In some embodiments, the support 121 may include an insertion unit 1211 and a covering portion 1212. The covering portion 1212 may be covered on the opening 112. The insertion unit 1211 may be disposed on one side of the covering portion 1212 and may extend into the cavity 111 along the inner wall of the cavity 111 to fix the covering portion 1212 on the opening 112.

In some embodiments, the insertion unit 1211 may not be inserted through the inner wall of the cavity 111. For example, the inside of the cavity 111 may further be disposed with a plug portion that matches the shape of the insertion unit 1211 of the support 121. The insertion unit 1211 may be engaged with the plug portion, and the plug portion may be fixed inside the cavity 111. For example, the shape of the insertion unit 1211 may be a cylinder. The plug portion may be a cylindrical ring that can surround the cylindrical plug portion. The inner diameter of the plug portion of the cylindrical ring may be appropriately less than the outer diameter of the plug portion of the cylindrical body. When the insertion unit 1211 is inserted into the plug portion, the interference fit with the plug portion may cause the support 121 to be stably connected to the cavity 111. In some embodiments, other insertion ways may also be used, as long as the insertion unit 1211 may be inserted into the cavity 111 and fixed to the cavity 111.

The covering portion 1212 may be disposed on a side of the insertion unit 1211 facing away from the cavity 111, and may cover the opening 112 after the insertion unit 1211 is inserted into the cavity 111. The covering portion 1212 may be a complete structure, or may be further disposed with some holes according to needs, so as to achieve a certain function.

Figure 34:
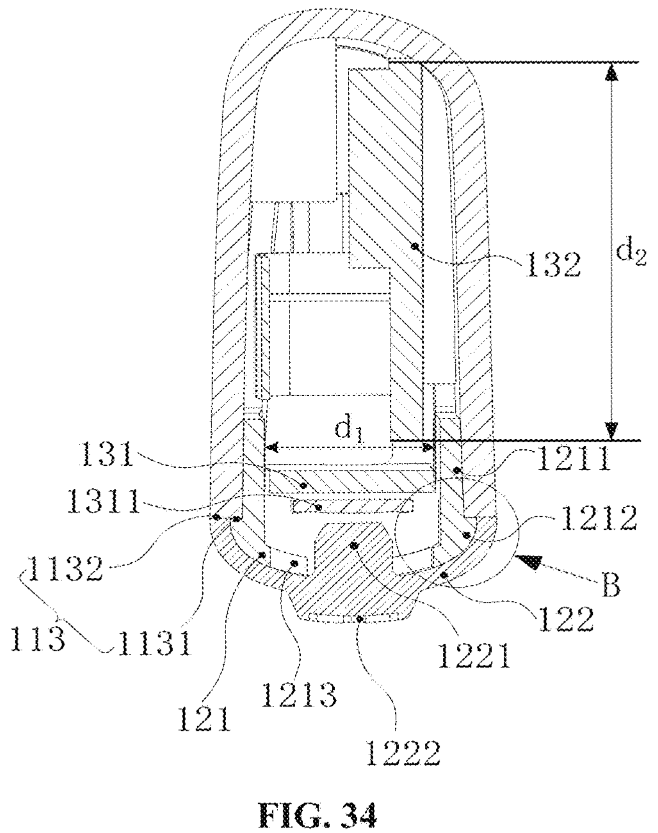
FIG. 34 is a schematic diagram illustrating a cross-sectional view of an electronic component under an assembled state along A-A axis in FIG. 31 according to some embodiments of the present disclosure.

FIG. 34 is a schematic diagram illustrating a cross-sectional view of an electronic component under an assembled state along A-A axis illustrated in FIG. 31 according to some embodiments of the present disclosure. As shown in FIG. 34, in some embodiments, the accommodation body 110 may include an opening edge 113 for defining the opening 112. The covering portion 1212 may be pressed against the inner region 1131 of the opening edge 113 near the opening 112. The soft cover layer 122 may cover the outer surface of the covering portion 1212 away from the accommodation body 110 and may be pressed on the outer region 1132 where is the periphery of the inner region 1131 of the opening edge 113, thereby achieving a seal between the soft cover layer 122 and opening edge 113.

The inner region 1131 and the outer region 1132 of the opening edge 113 may belong to the opening edge 113, rather than other regions except the opening edge 113. The inner region 1131 of the opening edge 113 may be a region of the opening edge 113 close to the opening 112. The outer region 1132 of the opening edge 113 may be a region of the opening edge 113 away from the opening 112.

In some embodiments, the covering portion 1212 of the support 121 may be pressed against the inner region 1131 of the opening edge 113 near the opening 112. The covering portion 1212 may initially seal the opening edge 113. Since the accommodation body 110 and the support 121 are both hard materials, the connection between the accommodation body 110 and the support 121 and the further covering of the covering portion 1212 cannot achieve a good sealing effect. The covering portion 1212 may be pressed against the opening edge 113. The end away from the opening 112 may be easy to generate a gap between the opening edge 113 and the gap and further penetrate through the cavity 111, thereby reducing the seal.

In some embodiments, the soft cover layer 122 may cover the outer surface of the covering portion 1212 away from the accommodation body 110, and may be further pressed on the outer region 1132 on the periphery of the inner region 1131 of the opening edge 113. The gap generated between the covering portion 1212 and the opening edge 113 of the support 121 may be further covered. Because the soft cover layer 122 is made of a soft material, the sealing effect of the electronic component may be improved and the electronic component may be waterproof.

Figure 35:
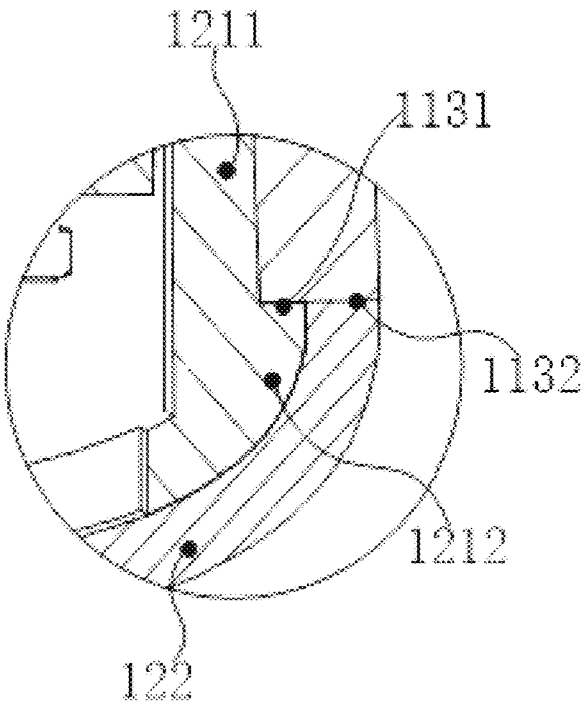
FIG. 35 is a schematic diagram illustrating an enlarged view of part B in FIG. 34 according to some embodiments of the present disclosure.

FIG. 35 is a schematic diagram illustrating an enlarged view of part B in FIG. 34 according to some embodiments of the present disclosure. As shown in FIG. 35, in some embodiments, when the cover body 120 is fastened, the periphery of the covering portion 1212 may cover the inner region 1131 of the opening edge 113 and may be in contact with the inner region 1131 of the opening edge 113. The soft cover layer 122 may be disposed on a side of the covering portion 1212 away from the accommodation body 110. The covering portion 1212 of the inner region 1131 located inside the opening edge 113 may be sandwiched between the inner region 1131 of the opening edge 113 and the soft cover layer 122. The soft cover layer 122 may further extend along a direction in which the covering portion 1212 is away from the opening 112 and in a direction toward the opening edge 113 until it contacts the outer region 1132 of the opening edge 113. The contact end surface of the covering portion 1212 and the opening edge 113 and the contact end surface of the soft cover layer 122 and the opening edge 113 may be arranged flush with each other. An "opening edge 113-covering portion 1212-soft coverer layer 122" structure may be formed on the inner region 1131 of the opening edge 113.

Figure 36:
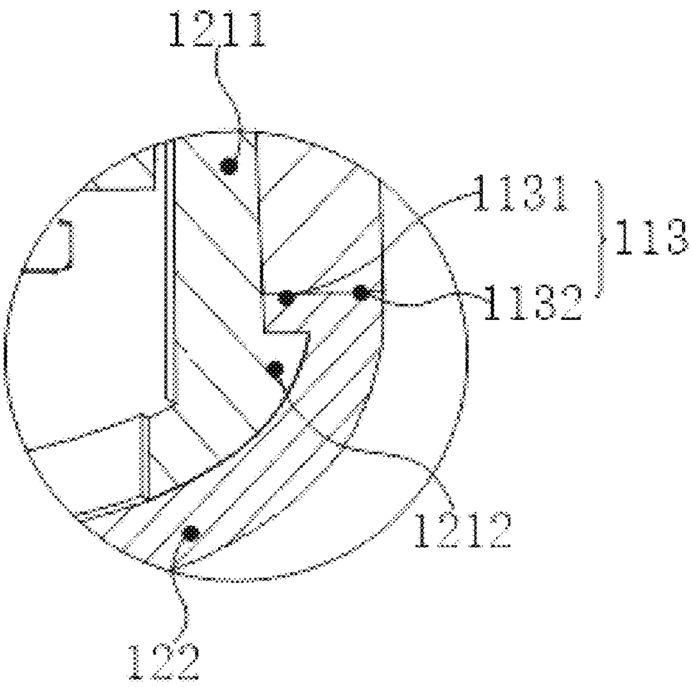
FIG. 36 is a schematic diagram illustrating a partial cross-sectional view of an exemplary electronic component according to some embodiments of the present disclosure.

FIG. 36 is a schematic diagram illustrating a partial cross-sectional view of an exemplary electronic component according to some embodiments of the present disclosure. As shown in FIG. 36, in some embodiments, after the soft cover layer 122 extends to the outer region 1132 of the opening edge 113 and contact with the outer region 1132, the region between the covering portion 1212 and the opening edge 113 may further be extended to the inner region 1131 of the opening edge 113. The inner region 1131 of the opening edge 113 may be between the covering portion 1212 and the covering portion 1212 and may be pressed on the inner region 1131 of the opening edge 113 to form a structure of "opening edge 113-soft cover layer 122-covering portion 1212-soft cover layer 122". In some embodiments, the soft cover layer 122 may further extend between the support 121 and the opening edge 113 on the basis of the covering portion 1212 of the rigid support 121, thereby further improving the seal between the cavity 111 and the cover body 120, and further improving the waterproof effect of the electronic component.

Referring to FIG. 31 to FIG. 34, the electronic component may further include a circuit component 130 disposed in the cavity 111. The circuit component 130 may be disposed with a switch 1311. In some embodiments, the circuit component 130 may include a first circuit board 131 disposed on an outer side of the first circuit board 131 facing the opening 112 of the cavity 111. In some embodiments, the circuit components may correspond to the control circuit in FIG. 2.

Correspondingly, the support 121 may be disposed with a switch hole 1213 corresponding to the switch 1311. The soft cover layer 122 may further cover the switch hole 1213. A pressing portion 1221 may be disposed at a position corresponding to the switch hole 1213. The pressing portion 1221 may extend toward the inside of the cavity 111 through the switch hole 1213. When the corresponding position of the soft cover layer 122 is pressed, the pressing portion 1221 may press the switch 1311 on the circuit component 130, thereby triggering the circuit component 13 to execute a preset function.

The pressing portion 1221 disposed on the soft cover layer 122 may be formed by protruding the side of the soft cover layer 122 toward the support 121 toward the switch hole 1213 and the switch 1311. The shape of the pressing portion 1221 may match the shape of the switch hole 1213. When the corresponding position of the soft cover layer 122 is pressed, the pressing portion 1221 may pass through the switch hole 1213 to reach the corresponding switch 1311 on the first circuit board 131. At the same time, the length of the pressing portion 1221 in the direction toward the switch 1311 may be determined so that the switch 1311 is not pressed when the position corresponding to the soft cover layer 122 is not pressed, and the corresponding switch 1311 may be pressed when the position corresponding to the soft cover layer 122 is pressed.

In some embodiments, a position on the soft cover layer 122 corresponding to the pressing portion 1221 may further be protruded toward a side facing away from the support 121 to form a convex pressing portion 1222. The user can clear the position of the switch 1311 may be clear for the user. By pressing the corresponding pressing portion 1222, the starting circuit component 130 may be triggered to implement the corresponding functions.

Figure 37:
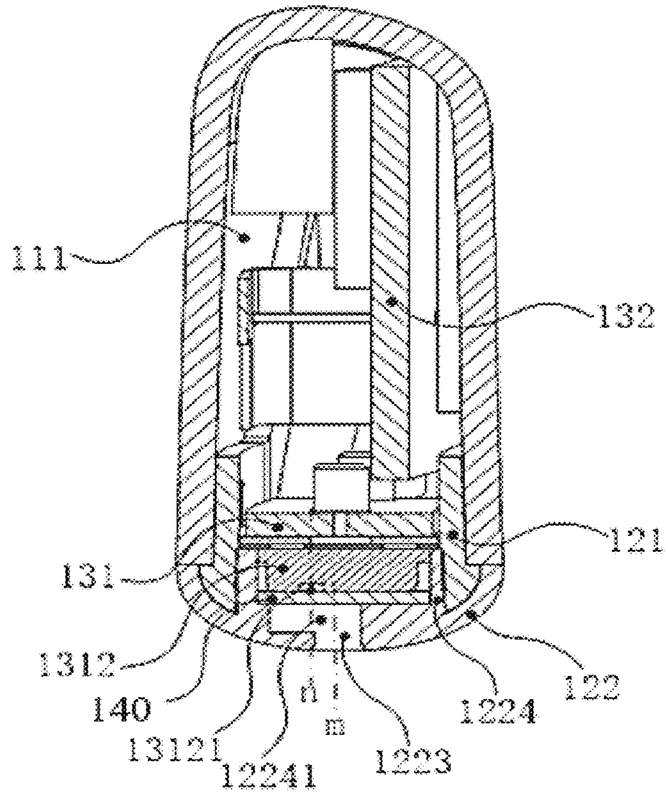
FIG. 37 is a schematic diagram illustrating a cross-sectional view of an exemplary electronic component under an assembled state along B-B axis in FIG. 31 according to some embodiments of the present disclosure.

FIG. 37 is a schematic diagram illustrating a cross-sectional view of an exemplary electronic component under an assembled state along B-B axis in FIG. 31 according to some embodiments of the present disclosure. As shown in FIG. 37, the electronic component may include a first microphone element 1312. In some embodiments, the first microphone element 1312 may be disposed on a first circuit board 131 of a circuit assembly 13, and may be accommodated in the cavity 111. For example, the first microphone element 1312 may be disposed on the first circuit board 131 at a distance from the switch 1311. The first microphone element 1312 may be configured to receive a sound signal from the outside of the electronic component, and convert the sound signal into an electrical signal for analyzing and processing.

In some embodiments, a microphone hole 1214 corresponding to the first microphone element 1312 may be disposed on the support 121. A first sounding hole 1223 corresponding to the microphone hole 1214 may be disposed on the soft cover layer 122. A first sound blocking component 1224 may be disposed at a position corresponding to the microphone hole 1214. The first sound blocking component 1224 may extend toward the inside of the cavity 111 through the microphone hole 1214 and define a sounding channel 12241. One end of the sounding channel 12241 may connect with the first sounding hole 1223 on the soft cover layer 122, and the first microphone element 1312 may be inserted into the sounding channel 12241 from the other end of the sounding channel 12241.

In some embodiments, when the electronic component includes the switch 1311, the switch hole 1213 and the microphone hole 1214 may be disposed on the support 121 at intervals.

In some embodiments, the first sounding hole 1223 may be disposed through the soft cover layer 122 and may correspond to the position of the first microphone element 1312. The first sounding hole 1223 may correspond to the microphone hole 1214 on the support 121, and may further connect the first microphone element 1312 with the outside of the electronic component. The sound outside the electronic component may be received by the first microphone element 1312 through the first sounding hole 1223 and the microphone hole 1214.

The shape of the first sounding hole 1223 may be various, as long as it can input sound from the outside of the electronic component. In some embodiments, the first sounding hole 1223 may be a circular hole with a relatively small size, and may be disposed in a region of the soft cover layer 122 corresponding to the microphone hole 1214. The first sounding hole 1223 with a relatively small size may reduce the connection between the first microphone element 1312 in the electronic component and the outside of the electronic component, thereby improving the sealing of the electronic component.

In some embodiments, the first sound blocking component 1224 may extend from the periphery of the first sounding hole 1223 through the microphone 12212 through the soft cover layer 122 to the inside of the cavity 111 to the periphery of the first microphone element 1312. A sounding channel 12241 from the first sounding hole 1223 to the first microphone element 1312 may be formed. The sound signal of the electronic component entering into the sound guide hole may directly reach the first microphone element 1312 through the sounding channel 12241.

In some embodiments, the shape of the sounding channel 12241 in a cross section perpendicular to the length direction may be the same as or different from the shape of the microphone hole 1214 or the first microphone element 1312. In some embodiments, the cross-sectional shapes of the microphone hole 1214 and the first microphone element 1312 in a direction perpendicular to the support 121 toward the cavity 111 may be square. The size of the microphone hole 1214 may be slightly larger than the periphery size of the sounding channel 12241. The internal size of the sounding channel 12241 may be not less than the periphery size of the first microphone element 1312. The sounding channel 12241 may pass through the first sounding hole 1223 to reach the first microphone element 1312 and wrap around the periphery of the first microphone element 1312.

In this case, the soft cover layer 122 of the electronic component may be disposed with a first sounding hole 1223 and a sounding channel 12241 surrounded by the periphery of the first sounding hole 1223 through the microphone hole 1214 to reach the first microphone element 1312 and wrapping around the periphery of the first microphone element 1312. The sounding channel 12241 may be disposed so that the sound signal entering through the first sounding hole 1223 can reach the first microphone element 1312 through the first sounding hole 1223 and be received by the first microphone element 1312. The leakage of sound signals in the propagation process may be reduced, thereby improving the efficiency of receiving electronic signals by electronic components.

In some embodiments, the electronic component may also include a waterproof mesh cloth 140 disposed in the sounding channel 12241. The waterproof mesh cloth 140 may be held against the side of the soft cover layer 122 facing the microphone element by the first microphone element 1312 and cover the first sounding hole 1223.

In some embodiments, the support 121 in a position close to the first microphone element 1312 in the sounding channel 12241 may be convex to form a convex surface opposite to the first microphone element 1312. The waterproof mesh cloth 140 may be sandwiched between the first microphone element 1312 and the convex surface, or may be directly bonded to the periphery of the first microphone element 1312, and the specific setting manner is not limited herein.

In addition to the waterproof effect of the first microphone element 1312, the waterproof mesh cloth 140 may also entrant sound to avoid adversely affecting to the sound receiving effect of a sound receiving area 13121 of the first microphone element 1312.

In some embodiments, the cover body 120 may be arranged in a strip shape. A main axis of the first sounding hole 1223 and a main axis of the sound receiving area 13121 of the first microphone element 1312 may be spaced from each other in a width direction of the cover body 120. The main axis of the sound receiving area 13121 of the first microphone element 1312 may refer to the main axis of the sound receiving area 13121 of the first microphone element 1312 in the width direction of the cover body 120, such as the axis n illustrated in FIG. 37. The main axis of the first sounding hole 1223 may be the axis m illustrated in FIG. 37.

It should be noted that the first microphone element 1312 may be disposed at a first position of the first circuit board 131. When the first sounding hole 1223 is disposed, the first sounding hole 1223 may be disposed at the second position of the cover body 120 due to the requirements of beauty and convenience. In some embodiments, the first position and the second position may not correspond in the width direction of the cover body 120, so that the main axis of the first sounding hole 1223 and the main axis of the sound receiving area 13121 of the first microphone element 1312 are spaced from each other in the width direction of the cover body 120. The sound input through the first sounding hole 1223 may not reach the sound receiving area 13121 of the first microphone element 1312 along a straight line.

In some embodiments, in order to guide the sound signal entered by the first sounding hole 1223 to the first microphone element 1312, the sounding channel 12241 may be curved.

In some embodiments, the main axis of the first sounding hole 1223 may be disposed in the middle of the cover body 120 in the width direction of the cover body 120.

In some embodiments, the cover body 120 may be a part of the outer housing of the electronic device. In order to meet the overall aesthetic requirements of the electronic device, the first sounding hole 1223 may be disposed in the middle of the width direction of the cover body 120. The first sounding hole 1223 may be symmetrical and meets people's visual needs.

In some embodiments, the corresponding sounding channel 12241 may have a stepped shape along the cross section along B-B axis illustrated in FIG. 31. The sound signal introduced by the first sounding hole 1223 may be transmitted to the first microphone element 1312 through the stepped sounding channel 12241 and may be received by the first microphone element 1312.

Figure 38:
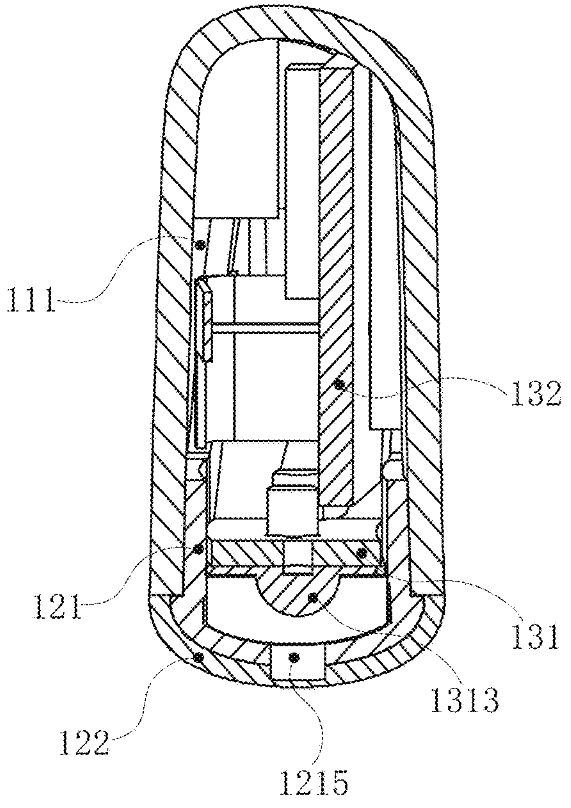
FIG. 38 is a schematic diagram illustrating a cross-sectional view of an exemplary electronic component under a combined state along C-C axis in FIG. 26 according to some embodiments of the present disclosure.

FIG. 38 is a schematic diagram illustrating a cross-sectional view of an exemplary electronic component under a combined state along C-C axis in FIG. 26 according to some embodiments of the present disclosure. In some embodiments, the electronic component may include a light emitting element 1313. The light emitting element 1313 may be disposed on the first circuit board 131 of the circuit component 130 and may be accommodated in the cavity 111. For example, the light emitting element 1313, the switch 1311, and the first microphone element 1312 may be disposed on the first circuit board 131 in a certain arrangement.

In some embodiments, the support 121 may be disposed with a light emitting hole 1215 corresponding to the light emitting element 1313, and the soft cover layer 122 may cover the light emitting hole 1215. A thickness of a region of the soft cover layer 122 corresponding to the light emitting hole 1215 may allow light generated by the light emitting element 1313 to be transmitted through the soft cover layer 122.

In some embodiments, the soft cover layer 122 may transmit the light emitted from the light emitting element 1313 to the outside of the electronic component under a condition that the soft cover layer 122 covers the light emitting hole 1215 in a certain manner.

In some embodiments, a thickness of the entire region or a portion of the region of the soft cover layer 122 corresponding to the light emitting hole 1215 may be less than a thickness of a region corresponding to the periphery of the light emitting hole 1215. The light emitted by the light emitting element 1313 may pass through the light emitting hole 1215 and be transmitted through the soft cover layer 122. The region of the light emitting hole 1215 covered by the soft cover layer 122 may transmit light in other manners, which is not limited herein.

In some embodiments, the soft cover layer 122 may be configured to cover the light emitting hole 1215 corresponding to the light emitting element 1313. The light emitted by the light emitting element 1313 may be transmitted from the soft cover layer 122 to the outside of the electronic component. Thus, the light emitting element 1313 may be sealed by the soft cover layer 122 without affecting the light-emitting function of the electronic component., thereby improving the sealing and waterproof performance of the electronic component.

In some embodiments, the button mechanism described in the foregoing embodiments may include a power switch button, a function shortcut button, and a menu shortcut button according to function classification. In some embodiments, the function shortcut button may include a volume up button and a volume down button for adjusting the volume of the sound, a fast forward button and a fast backward button for adjusting the progress of the sound file, and a button (e.g., a BLUETOOTH connection button) configured to control the connection of the MP3 player to an external device. In some embodiments, a type of the button mechanism may include a physical button, a virtual button, or the like, or any combination thereof. For example, when the button mechanism exists in the form of the physical button, the button may be disposed at each side wall of the circuit housing, which may be not in contact with the human body. More descriptions regarding the specific structure and arrangement of the button may be found elsewhere in the present disclosure. When the user wears the MP3 player in this embodiment, the button may be exposed on the outside to facilitate the user's wearing and operation. In some embodiments, an end surface of each button in the button mechanism may be provided with an identification corresponding to a function thereof. In some embodiments, the identification may include a text (e.g., in Chinese, in English, etc.), a symbol (e.g., "+" indicating the volume up button, "−" indicating the volume down button, etc.). In some embodiments, the mark may be set at the button by means of laser printing, screen printing, pad printing, laser filling, thermal sublimation, hollow text, and the like. In some embodiments, the mark may be disposed on the surface of the circuit housing on the peripheral side of the button, which may be served as a logo. In some embodiments, the MP3 player may include a touch screen, and the control program installed in the MP3 player may generate one or more virtual buttons on the touch screen with interactive functions, and the virtual button(s) may be used to select a function, the volume, and a file of the MP3 player. In addition, the MP3 player may include a physical button, a physical screen, or the like, or any combination thereof.

In some embodiments, the MP3 player may include at least one button mechanism. The button mechanism may be used for human-computer interaction, for example, realizing an operation such as pause/start, recording, answering calls, or the like. It should be understood that the button mechanism shown in FIG. 17 is only for illustrative purposes. Those skilled in the art may adjust parameters such as the position, quantity, and shape of the button mechanism on the basis of fully understanding the function of the button mechanism. For example, the button mechanism may also be disposed at other positions of the circuit housing or the speaker device.

In some embodiments, the button in the button mechanism may implement different interactive functions based on the user's operation instructions. For example, clicking the button once may realize the pausing/starting (such as music, recording, etc.) function, clicking the button twice quickly may realize the answering the call function, clicking regularly (e.g., once every second and click twice in total) may realize the recording function. In some embodiments, the user's operation instructions may be operations such as clicking, sliding, scrolling, or the like, or a combination of operations. For example, sliding up and down on the surface of the button may realize the function of increasing/lowering the volume.

In other embodiments, there may be at least two button mechanisms each of which may correspond to one of the two core housings on the left and right sides, respectively. The user may use the left and right hands to operate the at least two button mechanisms respectively to improve the user experience.

In an application scenario, in order to further improve the user's human-computer interaction experience, the functions of human-computer interaction may be assigned to the button mechanisms on the left and right sides. The user may operate the buttons in the corresponding button mechanism according to different functions. For example, the recording function may be turned on by clicking once the corresponding button on the left, while the recording function may be turned off by clicking again the corresponding button, and the pause/play function may be realized by clicking twice quickly. The function of answering the call may be realized by clicking twice quickly on the button on the right side. When the button on the right side is clicked twice quickly, and a song is playing and there is no phone call access at this time, the next/previous music switching function may be realized.

In some embodiments, the functions corresponding to the buttons in the left and right button mechanisms described above may be user-defined. For example, the user may assign the pause/play function performed by the button on the left side to the button on the right side by an application software, or assign the answering call function performed by the button on the right side to the button on the left side. In addition, the user may also set the operation instructions (such as the number of clicks, sliding gestures) implementing the corresponding functions by the application software. For example, the operation instruction corresponding to the answering call function is set from one click to two clicks, and the operation instruction corresponding to the switching to the next/previous music function is set from two clicks to three clicks. User customization may be determined based on user-operating habits, which avoids operating errors to a certain extent and improves user experience.

In some embodiments, the human-computer interaction function described above may not be unique but is set according to the functions commonly used by the user. For example, the buttons in the button mechanism may also implement functions such as rejecting calls and reading text messages by voice, or the like. Users may customize the functions and the corresponding operation instructions to meet different needs.

In some embodiments, the MP3 player may be connected to an external device by at least one button. For example, the MP3 player may be connected to a mobile phone via a button (e.g., a button for controlling BLUETOOTH connection) in the button mechanism for controlling wireless connection. Optionally, after the connection is established, the user may directly operate the MP3 player on the external device (e.g., a mobile phone) to implement one or more of the functions described above.

In some embodiments, the MP3 player may include an indicator light (not shown in the figure) to display the state of the MP3 player. Specifically, the indicator light may send out a light signal, and the state of the MP3 player may be known by observing the light signal. In some embodiments, the indicator light may illustrate the power status of the MP3 player. For illustration purposes, for example, when the indicator light is red, it may indicate that the MP3 player has insufficient power (for example, the MP3 player has less than 10% power). As another example, when the MP3 player is charged, the indicator light is yellow, and when the MP3 player is fully charged, the indicator light is green. In some alternative embodiments, for example, when the MP3 player is in a state of communicating with an external device, the indicator light may keep blinking or may be illustrated in other colors (e.g., blue). In some alternative embodiments, the indicator light may illustrate the status of data transmission between the MP3 player and the external device. For example, when a user uses a mobile terminal to transmit data to the MP3 player, the indicator light may switch colors based on a specific frequency. As another example, the indicator light may illustrate a fault state of the MP3 player. When the MP3 player is in the fault state, the indicator light is red and keeps blinking. In some embodiments, the indicator light may further include one indicator light or a plurality of indicator lights. In some embodiments, when there is a plurality of indicator lights, the colors of the plurality of indicator lights may be the same or different.

Figure 39:
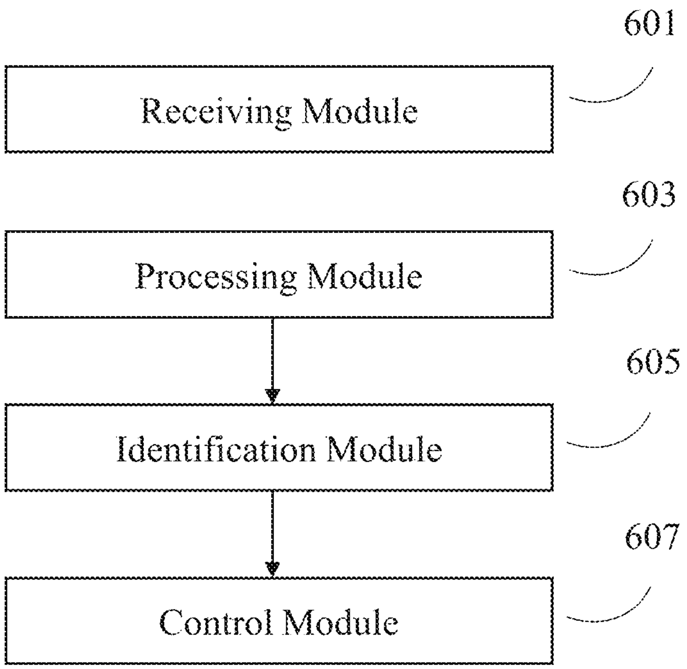
FIG. 39 is a block diagram illustrating an exemplary voice control system according to some embodiments of the present disclosure.

FIG. 39 is a block diagram illustrating an exemplary voice control system according to some embodiments of the present disclosure. The voice control system may be used as a part of an auxiliary button mechanism or may be integrated into a speaker device as a separate module. As shown in FIG. 39, in some embodiments, the voice control system may include a receiving module 601, a processing module 603, an identification module 605, and a control module 607.

In some embodiments, the receiving module 601 may be configured to receive a voice control instruction and send the voice control instruction to the processing module 603. In some embodiments, the receiving module 601 may include one or more microphones. In some embodiments, when the receiving module 601 receives the voice control instruction inputted by a user, (e.g., the receiving module 601 receives a voice control instruction of "start playing"), the receiving module 601 may then send the voice control instruction to the processing module 603.

In some embodiments, the processing module 603 may be in communication with the receiving module 601. The processing module 603 may generate an instruction signal according to the voice control instruction, and send the instruction signal to the identification module 605.

In some embodiments, when the processing module 603 receives the voice control instruction inputted by the user from the receiving module 601 through the communication connection, the processing module 603 may generate an instruction signal according to the voice control instruction.

In some embodiments, the identification module 605 may be in communication with the processing module 603 and the control module 607. The identification module 605 may identify whether the instruction signal matches a predetermined signal, and send a matching result to the control module 607.

In some embodiments, when the identification module 605 determines that the instruction signal matches the predetermined signal, the identification module 605 may send the matching result to the control module 607. The control module 607 may control the operations of the speaker device according to the instruction signal. For example, when the receiving module 601 receives a voice control instruction of "start playing", and the identification module 605 determines that the instruction signal corresponding to the voice control instruction matches the predetermined signal, the control module 607 may automatically perform the voice control instruction. The control module 607 may immediately automatically perform starting playing audio data. When the instruction signal does not match the predetermined signal, the control module 607 may not perform the control instruction.

In some embodiments, the voice control system may further include a storage module, which may be in communication with the receiving module 601, the processing module 603, and/or the identification module 605. The receiving module 601 may receive and send a predetermined voice control instruction to the processing module 603. The processing module 603 may generate a predetermined signal according to the predetermined voice control instruction, and send the predetermined signal to the storage module. When the identification module 605 needs to match the instruction signal received from the processing module 603 with the predetermined signal, the storage module may send the predetermined signal to the identification module 605 through the communication connection.

In some embodiments, the processing module 603 may further include removing environmental sound contained in the voice control instruction.

In some embodiments, the processing module 603 in the voice control system may further include performing denoising processing on the voice control instruction. The denoising processing may refer to removing the environmental sound contained in the voice control instruction. In some embodiments, when in a complex environment, the receiving module 601 may receive and send the voice control instruction to the processing module 603. Before the processing module 603 generates the corresponding instruction signal according to the voice control instruction, in order to prevent the environmental sound from interfering with the recognition process of the identification module 605, the voice control instruction may be denoised. For example, when the receiving module 601 receives a voice control instruction inputted by the user when the user is in an outdoor environment, the voice control instruction may include environmental sound such as vehicle driving on the road, whistle, etc. The processing module 602 may perform the denoising processing to reduce the influence of the environmental sound on the voice control instruction.

Under normal circumstances, the sound quality of the MP3 player may be affected by various factors, such as the physical properties of the components of the speaker device, the vibration transmission relationship among the components, the vibration transmission relationship between the speaker device and the outside world, and the efficiency of the vibration transmission system in transmitting vibration, or the like. The components of the speaker device may include components (such as but not limited to earphone cores) that generate vibrations, components (such as but not limited to ear hooks) that fix the speaker device, and components (such as but not limited to panels on the core housing, vibration transmission layer, etc.) that transmit vibrations. The vibration transmission relationship among the components and the vibration transmission relationship between the loudspeaker and the outside world are determined by the contact mode (such as but not limited to clamping force, contact area, contact shape, etc.) between the speaker device and the user.

Figure 40:
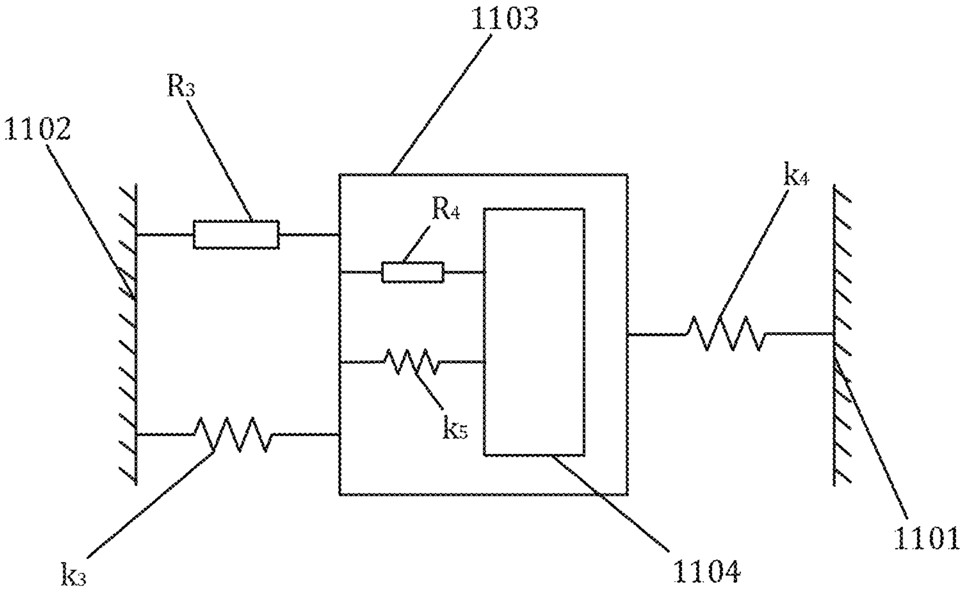
FIG. 40 is a schematic diagram illustrating an equivalent model of a vibration generation and transmission system of an exemplary MP3 player according to some embodiments of the present disclosure.

For illustration purposes, the following description may further illustrate the relationship between sound quality and each component of the speaker device based on a bone conductive MP3 player. It should be understood that without breaking the principle, the embodiments illustrated below may also be applied to an air conductive speaker device. FIG. 40 is a schematic diagram illustrating an equivalent model of a vibration generation and transmission system of an exemplary MP3 player according to some embodiments of the present disclosure. As shown in FIG. 40, the vibration generation and transmission system may include a fixed end 1101, a sensing terminal 1102, a vibration unit 1103, and an earphone core 1104. The fixed end 1101 may be connected to the vibration unit 1103 through the transfer relationship K1 ($k_4$ in FIG. 40). The sensing terminal 1102 may be connected to the vibration unit 1103 through the transfer relationship K2 ($k_3$ in FIG. 40). The vibration unit 1103 may be connected to the earphone core 1104 through the transfer relationship K3 ($k_4$ and $k_5$ In FIG. 40).

The vibration unit mentioned herein is the core housing, and the transfer relations K1, K2, and K3 are the illustrations of the functional relations among the corresponding components in the MP3 player equivalent system (more detailed descriptions may be illustrated below). The vibration equation of the equivalent system may be represented by:

$$m_3x_3'' + R_3x_3' - R_4x_4' + (k_3 + k_4)x_3 + k_5(x_3 - x_4) = f_3 \quad (1)$$

$$m_3x_3'' + R_3x_3' - R_4x_4' + (k_3 + k_4)x_3 + k_5(x_3 - x_4) = f_3 \quad (2)$$

where $m_3$ represents the equivalent mass of the vibration unit 1103; $m_4$ represents the equivalent mass of the earphone core 1104; $x_3$ represents the equivalent displacement of the vibration unit 1103; $x_4$ represents the equivalent displacement of the earphone core 1104; $k_3$ represents the equivalent elastic coefficient between the sensing terminal 1102 and the vibration unit 1103; $k_4$ represents the equivalent elastic coefficient between the fixed end 1101 and the vibration unit 1103; $k_5$ represents the equivalent elastic coefficient between the earphone core 1104 and the vibration unit 1103; $R_3$ represents the equivalent damping between the sensing terminal 1102 and the vibration unit 1103; $R_4$ represents the equivalent damping between the earphone core 1104 and the vibration unit 1103; and $f_3$ and $f_4$ represent the interaction forces between the vibration unit 1103 and the earphone core 1104, respectively. The equivalent amplitude $A_3$ of the vibration unit 1103 in the system may be represented by:

$$A_3 = -\frac{m_4\omega^2}{(m_3\omega^2 + j\omega R_3 - (k_3 + k_4 + k_5))(m_4\omega^2 + j\omega R_4 - k_5) - k_5(k_5 - j\omega R_4)} \cdot f_0 \quad (3)$$

where $f_0$ represents a unit driving force; and ω denotes the vibration frequency. Therefore, the factors that may affect the frequency response of the bone conductive MP3 player may include the vibration generation portions (e.g., the vibration unit, the earphone core, the housing, and the interconnection ways thereof, such as $m_3$, $m_4$, $k_5$, $R_4$, etc., in the Equation (3)), and vibration transmission portions (e.g., the way of contacting the skin, the property of the ear hook, such as $k_3$, $k_4$, $R_3$, etc., in the Equation (3)). The frequency response and the sound quality of the bone conductive MP3 player may be changed by changing the structure of the various components of the bone conductive MP3 player and the parameters of the connections between the various components. For example, changing the magnitude of the clamping force is equivalent to changing the $k_4$, changing the bonding way of glue is equivalent to changing the $R_4$ and $k_5$, and changing the hardness, elasticity, and damping of the materials is equivalent to changing the $k_3$ and $R_3$.

In a specific embodiment, the fixed end 1101 may be a relatively fixed point or a relatively fixed area of the bone conductive MP3 player during the vibration process. The point or area may be regarded as the fixed end of the bone conductive MP3 player during the vibration process. The fixed end may be composed of specific components, or may be a position determined according to the structure of the bone conductive MP3 player. For example, the bone conductive MP3 player may be hung, glued, or adsorbed near the human ear by a specific device, and the structure and shape of the bone conductive MP3 player may also be designed to make the bone conductive component stick to the human skin.

The sensing terminal 1102 may include an auditory system for the human body to receive sound signals. The vibration unit 1103 may be a part of the bone conductive MP3 player used to protect, support, and connect the earphone core. The vibration unit 1103 may include a part directly or indirectly touched by the user, such as a vibration transmission layer or panel that transmits vibration to the user, as well as the housing that protects and supports other vibration generating components, or the like. The earphone core 1104 may include a component for generating sound vibration, which may be one or more combinations of the transducers discussed above.

The transmission relationship K1 may connect the fixed end 1101 and the vibration unit 1103, which indicates the vibration transmission relationship between the vibration generation components of the bone conductive MP3 player and the fixed end. K1 may be determined based on the shape and structure of the bone conductive MP3 player. For example, the bone conductive MP3 player may be fixed to the head of the human in the form of a U-shaped earphone rack/earphone strap, and may also be installed on devices such as a helmet, a fire mask, or other special-purpose masks, glasses, etc. The different shapes and structures of the bone conductive MP3 player may affect the vibration transmission relationship K1. Further, the structure of the loudspeaker may also include physical properties such as the material and quantity of different components of the bone conductive MP3 player. The transmission relationship K2 may connect the sensing terminal 402 and the vibration unit 1103.

K2 may be determined based on the composition of the transmission system. The transmission system may include transmitting sound vibration to the auditory system through the user's tissue (also referred to as human tissue). For example, when the sound is transmitted to the auditory system through the skin, the subcutaneous tissue, bones, etc., the physical properties of different human tissues and their interconnections may affect K2. Further, the vibration unit 1103 may be in contact with the human tissue. In different embodiments, the contact area on the vibration unit may be a side of the vibration transmission layer or the panel. The surface shape, size of the contact area, and the interaction force of the contact area with the human tissue may affect the transmission relationship K2.

The transmission relationship K3 between the vibration unit 1103 and the earphone core 1104 may be determined by internal connection properties of the vibration generation components of the bone conductive MP3 player. The connection mode (e.g., rigid or elastic connection mode) of the earphone core and the vibration unit, or the relative position of the connector between the earphone core and the vibration unit may change the transmission efficiency of the earphone core to transmit vibration to the vibration unit, especially the transmission efficiency of the panel, which affects the transmission relationship K3.

During the use of the bone conductive MP3 player, the generation and transmission process of the sound may affect the sound quality felt by the human (or the user). For example, the fixed end 1101, the sensing terminal 1102, the vibration unit 1103, the earphone core, and the transmission relationships K1, K2, and K3, etc., may affect the sound quality of the bone conductive MP3 player. It should be noted that K1, K2, and K3 are only a representation of the connection ways of different components or systems during the vibration transmission process, which may include but not limited to physical connection ways, force transmission ways, sound transmission efficiency, etc.

The above illustration of the equivalent system of the bone conductive MP3 player is only a specific example and should not be regarded as the only feasible implementation. Obviously, for those skilled in the art, after understanding the basic principles of the bone conductive MP3 player, various amendments and changes in forms and details of the specific methods and steps that affect the vibration transmission of the bone conductive MP3 player may be made without departing from this principle, but these amendments and changes are still within the scope of the above description. For example, K1, K2, and K3 described above may be a simple vibration or mechanical transmission way, or may include a complex non-linear transmission system. The transmission relationship may include transmission through direct connection of various components (or parts), or may include transmission through a non-contact way.

Figure 41:
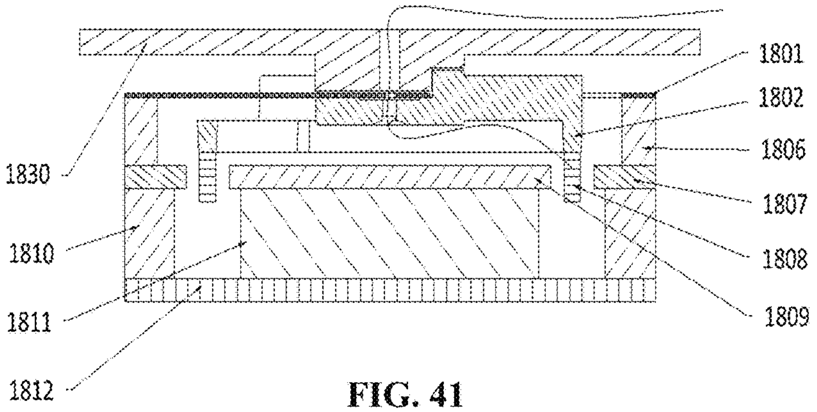
FIG. 41 is a structure diagram illustrating a composite vibration component of an exemplary MP3 player according to some embodiments of the present disclosure.
Figure 42:
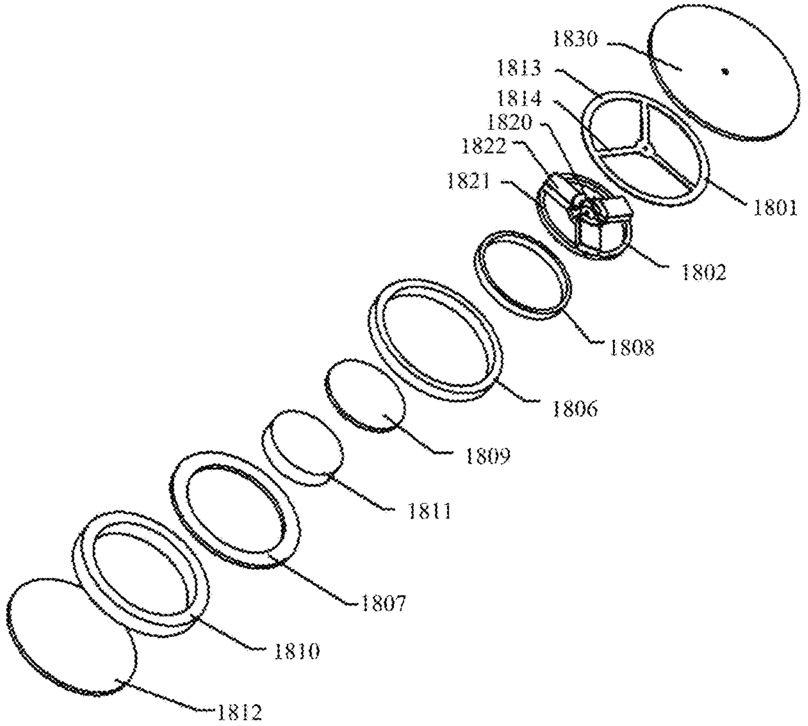
FIG. 42 is a structure diagram illustrating an exemplary MP3 player and a composite vibration component thereof according to some embodiments of the present disclosure.

FIG. 41 is a structure diagram illustrating a composite vibration component of an exemplary MP3 player according to some embodiments of the present disclosure. FIG. 42 is a structure diagram illustrating an exemplary MP3 player and a composite vibration component thereof according to some embodiments of the present disclosure.

In some embodiments, the MP3 player may include the composite vibration component. In some embodiments, the composite vibration component may be part of an earphone core. In some embodiments, the composite vibration component in FIG. 41 may be the vibration component that provides sound inside the core housing 20 illustrated in FIG. 2. Specifically, the composite vibration component in the embodiment of the present disclosure may be equivalent to a specific embodiment of the transfer relationship K3 between the vibration unit 1103 and the earphone core 1104 in FIG. 40. Embodiments of the composite vibration component on the MP3 player are shown in FIG. 41 and FIG. 42, the composite vibration component may be composed of a vibration conductive plate 1801 and a vibration plate 1802. The vibration conductive plate 1801 may be disposed as a first annular body 1813. Three first support rods 1814 that are converged toward a center may be disposed in the first annular body 1813. The position of the converged center may be fixed to a center of the vibration plate 1802. The center of the vibration plate 1802 may be a groove 1820 that matches the converged center and the first support rods. The vibration plate 1802 may be disposed with a second annular body 1821 having a radius different from that of the vibration conductive plate 1801, and three second support rods 1822 having different thicknesses from the first support rods 1814. The first support rods 1814 and the second support rods 1822 may be staggered, and may have a 600 angle.

Figure 43:
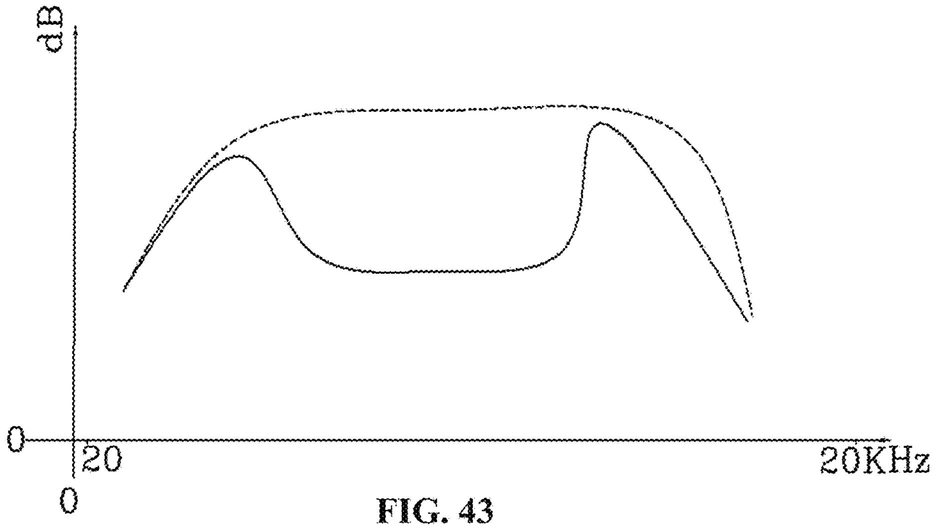
FIG. 43 is a structure diagram illustrating an exemplary frequency response curve according to some embodiments of the present disclosure.

The first and second support rods may be straight rods or other shapes that meet specific requirements. The count of the support rods may be more than two, and symmetrical or asymmetrical arrangement may be applied to meet the requirements of economic and practical effects. The vibration conductive plate 1801 may have a thin thickness and can increase elastic force. The vibration conductive plate 1801 may be stuck in the center of the groove 1820 of the vibration plate 1802. A voice coil 1808 may be attached to a lower side of the second annular body 1821 of the vibration plate 1802. The composite vibration component may include a bottom plate 1812 on which an annular magnet 1810 is disposed. An inner magnet 1811 may concentrically be disposed in the annular magnet 1810. An inner magnetic plate 1809 may be disposed on the top of the inner magnet 1811, and an annular magnetic plate 1807 may be disposed on the annular magnet 1810. A washer 1806 may be fixedly disposed above the annular magnetic plate 1807. The first annular body 1813 of the vibration conductive plate 1801 may be fixedly connected to the washer 1806. The composite vibration component may be connected to outside component(s) through a panel 1830. The panel 1830 may be fixedly connected to the position of the converged center of the vibration transmission plate 1801, and may be fixed to the center of the vibration transmission plate 1801 and the vibration plate 1802. Using the composite vibration component composed of the vibration plate and the vibration conductive plate, a frequency response curve as shown in FIG. 43 can be obtained, and two resonance peaks may be generated. By adjusting parameters such as the size and material of the two components (e.g., the vibration conductive plate and the vibration plate) may make the resonance peaks appear in different positions. For example, a low-frequency resonance peak appears at a position at a lower frequency, and/or a high-frequency resonance peak appears at a position at a higher frequency. In some embodiments, the stiffness coefficient of the vibration plate may be greater than the stiffness coefficient of the vibration conductive plate. The vibration plate may generate the high-frequency resonance peak of the two resonance peaks, and the vibration conductive plate may generate the low-frequency resonance peak of the two resonance peaks. The resonance peaks may be or may not be within the frequency range of sound perceivable by human ear. In some embodiments, the resonance peaks may be not within the frequency range of sound perceivable by the human ear. In some embodiments, one resonance peak may be within the frequency range of sound perceivable by the human ear, and another resonance peak may be not within the frequency range of sound perceivable by the human ear. In some embodiments, both the resonance peaks may be within the frequency range of sound perceivable by the human ear. In some embodiments, both the resonance peaks may be within the frequency range of sound perceivable by the human ear, and their frequencies may be 80 Hz-18000 Hz. In some embodiments, both the resonance peaks may be within the frequency range of sound perceivable by the human ear, and their frequencies may be 200 Hz-15000 Hz. In some embodiments, both the resonance peaks may be within the frequency range of sound perceivable by the human ears, and their frequencies may be 500 Hz-12000 Hz. In some embodiments, both the resonance peaks may be within the frequency range of sound perceivable by the human ears, and their frequencies may be 800 Hz-11000 Hz. The frequencies of the resonance peaks may have a certain gap. For example, the frequency difference between the two resonance peaks may be at least 500 Hz. In some embodiments, the frequency difference between the two resonance peaks may be at least 1000 Hz. In some embodiments, the frequency difference between the two resonance peaks may be at least 2000 Hz. In some embodiments, the frequency difference between the two resonance peaks may be at least 5000 Hz. In order to achieve better results, the both resonance peaks may be within the frequency range of sound perceivable by the human ear, and the frequency difference between the two resonance peaks may be at least 500 Hz. In some embodiments, the both resonance peaks may be within the frequency range of sound perceivable by the human ear, and the frequency difference between the two resonance peaks may be at least 1000 Hz. In some embodiments, the both resonance peaks may be within the frequency range of sound perceivable by the human ears, and the frequency difference between the two resonance peaks may be at least 2000 Hz. In some embodiments, the two resonance peaks may both be within the frequency range of sound perceivable by the human ear, and the frequency difference between the two resonance peaks may be at least 3000 Hz. In some embodiments, the resonance peaks may both be within the frequency range of sound perceivable by the human ear, and the frequency difference between the two resonance peaks may be at least 4000 Hz. One of the two resonance peaks may be within the frequency range of sound perceivable by the human ear and the other may not be within the frequency range of sound perceivable by the human ear, and the frequency difference between the two resonance peaks may be at least 500 Hz. In some embodiments, one resonance peak may be within the frequency range of sound perceivable by the human ear and the other may not be within the frequency range of sound perceivable by the human ear, and the frequency difference between the two resonance peaks may be at least 1000 Hz. In some embodiments, one resonance peak may be within the frequency range of sound perceivable by the human ear and the other may not be within the frequency range of sound perceivable by the human ear, and the frequency difference between the two resonance peaks may be at least 2000 Hz. In some embodiments, one resonance peak may be within the frequency range of sound perceivable by the human ear and the other may not be within the frequency range of sound perceivable by the human ear, and the frequency difference between the two resonance peaks may be at least 3000 Hz. In some embodiments, one resonance peak may be within the frequency range of sound perceivable by the human ear and the other may not be within the frequency range of sound perceivable by the human ear, and the frequency difference between the two resonance peaks may be at least 4000 Hz. The two resonance peaks may both be 5 Hz-30000 Hz, and the frequency difference between the two resonance peaks may be at least 400 Hz. In some embodiments, the two resonance peaks may both be 5 Hz-30000 Hz, and the frequency difference between the two resonance peaks may be at least 1000 Hz. In some embodiments, the two resonance peaks may both be 5 Hz-30000 Hz, and the frequency difference between the two resonance peaks may be at least 2000 Hz. In some embodiments, the two resonance peaks may both be 5 Hz-30000 Hz and the frequency difference between the two resonance peaks may be at least 3000 Hz. In some embodiments, the two resonance peaks may be 5 Hz and 30000 Hz, and the frequency difference between the two resonance peaks may be at least 4000 Hz. The two resonance peaks may both be 20 Hz-20000 Hz, and the frequency difference between the two resonance peaks may be at least 400 Hz. In some embodiments, the two resonance peaks may both be 20 Hz-20000 Hz, and the frequency difference between the two resonance peaks may be at least 1000 Hz. In some embodiments, the two resonance peaks may be 20 Hz-20000 Hz, and the frequency difference between the two resonance peaks may be at least 2000 Hz. In some embodiments, the two resonance peaks may both be 20 Hz-20000 Hz, and the frequency difference between the two resonance peaks may be at least 3000 Hz. In some embodiments, the two resonance peaks may both be 20 Hz and 20,000 Hz, and the frequency difference between the two resonance peaks may be at least 4000 Hz. The two resonance peaks may be 100 Hz-18000 Hz, and the frequency difference between the two resonance peaks may be at least 400 Hz. In some embodiments, the two resonance peaks may be 100 Hz and 18000 Hz, and the frequency difference between the two resonance peaks may be at least 1000 Hz. In some embodiments, the two resonance peaks may be 100 Hz and 18000 Hz, and the frequency difference between the two resonance peaks may be at least 2000 Hz. In some embodiments, the two resonance peaks may be 100 Hz and 18000 Hz, and the frequency difference between the two resonance peaks may be at least 3000 Hz. In some embodiments, the two resonance peaks may be 100 Hz and 18000 Hz, and the frequency difference between the two resonance peaks may be at least 4000 Hz. The two resonance peaks may be 200 Hz-12000 Hz, and the frequency difference between the two resonance peaks may be at least 400 Hz. In some embodiments, the two resonance peaks may be between 200 Hz and 12000 Hz, and the frequency difference between the two resonance peaks may be at least 1000 Hz. In some embodiments, the two resonance peaks may be 200 Hz and 12000 Hz, and the frequency difference between the two resonance peaks may be at least 2000 Hz. In some embodiments, the two resonance peaks may be 200 Hz and 12000 Hz, and the frequency difference between the two resonance peaks may be at least 3000 Hz. In some embodiments, the two resonance peaks may be 200 Hz and 12000 Hz, and the frequency difference between the two resonance peaks may be at least 4000 Hz. The two resonance peaks may be 500 Hz-10000 Hz, and the frequency difference between the two resonance peaks may be at least 400 Hz. In some embodiments, the two resonance peaks may be 500 Hz and 10000 Hz, and the frequency difference between the two resonance peaks may be at least 1000 Hz. In some embodiments, resonance peaks may be 500 Hz and 10000 Hz, and the frequency difference between the two resonance peaks may be at least 2000 Hz. In some embodiments, resonance peaks may be between 500 Hz and 10000 Hz, and the frequency difference between the two resonance peaks may be at least 3000 Hz. In some embodiments, the two resonance peaks may be between 500 Hz and 10000 Hz, and the frequency difference between the two resonance peaks may be at least 4000 Hz. In this way, the resonance response ranges of the speaker device may be widened, and the sound quality satisfying certain conditions may be obtained. It should be noted that, in actual use, a plurality of vibration conductive plates and vibration plates may be provided to form a multilayer vibration structure that corresponds to different frequency response ranges, which may realize high-quality vibration in the full range and frequency, or make the frequency response curve meet the requirements in some specific frequency ranges. For example, in a bone conduction hearing aid, in order to meet normal hearing requirements, an earphone core composed of one or more vibration plates and vibration conductive plates with resonance frequencies in the range of 100 Hz-10000 Hz may be selected. The description of the composite vibration component composed of the vibration plate and the vibration conductive plate may be found in, e.g., Chinese Patent Application No. 201110438083.9 entitled “Bone conduction speaker and compound vibrating device thereof” filed on Dec. 23, 2011, the contents of which are hereby incorporated by reference.

Figure 44:
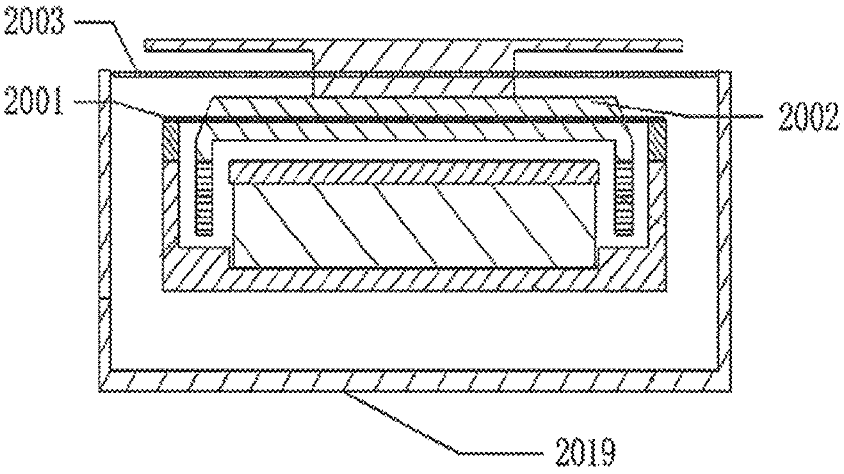
FIG. 44 is a structure diagram illustrating an exemplary MP3 player and a composite vibration component of the MP3 player according to some embodiments of the present disclosure.

FIG. 44 is a structure diagram illustrating an exemplary MP3 player and a composite vibration component of the MP3 player according to some embodiments of the present disclosure. As shown in FIG. 44, in some embodiments, the composite vibration component may include a vibration plate 2002, a first vibration conductive plate 2003, and a second vibration conductive plate 2001. The first vibration conductive plate 2003 may fix the vibration plate 2002 and the second vibration conductive plate 2001 on a core housing 2019. The composite vibration component composed of the vibration plate 2002, the first vibration conductive plate 2003, and the second vibration conductive plate 2001 may produce at least two resonance peaks. A flatter frequency response curve may be generated within an audible range of the auditory system, thereby improving the sound quality of a speaker device.

Figure 45:
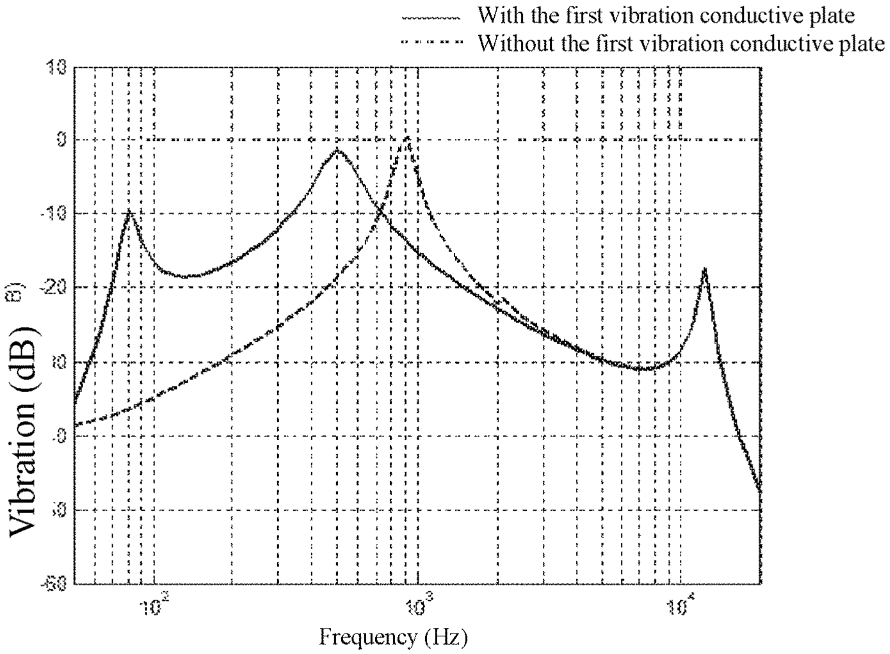
FIG. 45 is a structure diagram illustrating exemplary vibration response curves according to some embodiments of the present disclosure.

The count of resonance peaks generated by the triple composite vibration system of the first vibration conductive plate 2003 may be more than the count of resonance peaks generated by the composite vibration system without the first vibration conductive plate 2003. In some embodiments, the triple composite vibration system may produce at least three resonance peaks. In some embodiments, at least one resonance peak may not be within the frequency range of sound perceivable by the human ear. In some embodiments, all the resonance peaks may be within the frequency range of sound perceivable by the human ears. In some embodiments, all the resonance peaks may be within the frequency range of sound perceivable by the human ears, and their frequencies may not be greater than 18000 Hz. In some embodiments, all the resonance peaks may be within the frequency range of sound perceivable by the human ear, and their frequencies may be 100 Hz-15000 Hz, 200 Hz-12000 Hz, 500 Hz and 11000 Hz. The frequencies of the resonance peaks may have a certain gap. For example, the frequency difference between at least two resonance peaks may be at least 200 Hz, 500 Hz, 1000 Hz, 2000 Hz, or 5000 Hz. In order to achieve better results, all the resonance peaks may be within the frequency range of sound perceivable by the human ears, and the frequency difference between at least two resonance peaks may be at least 500 Hz. In some embodiments, all the resonance peaks may be within the frequency range of sound perceivable by the human ears, and the frequency difference between at least two resonance peaks may be at least 1000 Hz. In some embodiments, all the resonance peaks may be within the frequency range of sound perceivable by the human ears, and the frequency difference between at least two resonance peaks may be at least 1000 Hz, 2000 Hz, 3000 Hz, 4000 Hz. Two of the resonance peaks may be within the frequency range of sound perceivable by the human ears, and the other may not be within the frequency range of sound perceivable by the human ears, and the frequency difference between at least two resonance peaks may be at least 500 Hz, 1000 Hz, 2000 Hz, 3000 Hz, or 4000 Hz. One of the resonance peaks may be within the frequency range of sound perceivable by the human ears, the other two resonance peaks may not be within the frequency range of sound perceivable by the human ears, and the frequency difference between at least two resonance peaks may be at least 500 Hz, 1000 Hz, 2000 Hz, 3000 Hz, or 4000 Hz. In one embodiment, by using a triple composite vibration system composed of a vibration plate, a first vibration conductive plate and a second vibration conductive plate, a vibration response curve as shown in FIG. 45 may be obtained, which generates three distinct resonance peaks, and further greatly improves the sensitivity of the speaker device in the low frequency range (about 600 Hz) and improves the sound quality.

By changing parameters such as the size and material of the first vibration conductive plate, the position of the resonance peak may be moved to obtain a more ideal frequency response. In some embodiments, the first vibration conductive plate may include an elastic plate. The elasticity may be determined by various aspects such as the material, thickness, and structure of the first vibration conductive plate. The material of the first vibration conductive plate may include but is not limited to, steel (such as but not limited to stainless steel, carbon steel, etc.), light alloy (such as but not limited to aluminum alloy, beryllium copper, magnesium alloy, titanium alloy, etc.), and plastic (such as but not limited to high molecular polyethylene, blown nylon, engineering plastics, etc.), or other single or composite materials capable of achieving the same performance. The composite materials may include, but are not limited to, reinforcement materials such as glass fiber, carbon fiber, boron fiber, graphite fiber, graphene fiber, silicon carbide fiber, or aramid fiber; compounds of organic and/or inorganic materials such as glass fiber reinforced unsaturated polyester, various types of glass steel composed of epoxy resin or phenolic resin. The thickness of the first vibration conductive plate may be not less than 0.005 mm. In some embodiments, the thickness may be 0.005 mm-3 mm. In some embodiments, the thickness may be 0.01 mm-2 mm. In some embodiments, the thickness may be 0.01 mm-1 mm. In some embodiments, the thickness may be 0.02 mm-0.5 mm. The structure of the first vibration conductive plate may be disposed as a ring shape. In some embodiments, the first vibration conductive plate may include at least one ring. In some embodiments, the first vibration conductive plate may include at least two rings, such as a concentric ring, a non-concentric ring. The rings may be connected by at least two support rods that radiate from the outer ring to the center of the inner ring. In some embodiments, the first vibration conductive plate may include at least one elliptical ring. In some embodiments, the first vibration conductive plate may include at least two elliptical rings. Different elliptical rings may have different radii of curvature. In some embodiments, the first vibration conductive plate may include at least one square ring. The structure of the first vibration conductive plate may be disposed as a sheet shape. In some embodiments, a hollow pattern may be disposed on the first vibration conduction plate, and the area of the hollow pattern may not be less than the area without the hollow pattern. The materials, thickness, and structure described above may be combined into different vibration conductive plates. For example, a ring-shaped vibration conductive plate may have different thickness distributions. In some embodiments, the thickness of the support rod(s) may be equal to the thickness of the ring(s). In some embodiments, the thickness of the support rod(s) may be greater than the thickness of the ring(s). In some embodiments, the thickness of the inner ring may be greater than the thickness of the outer ring.

Figure 46:
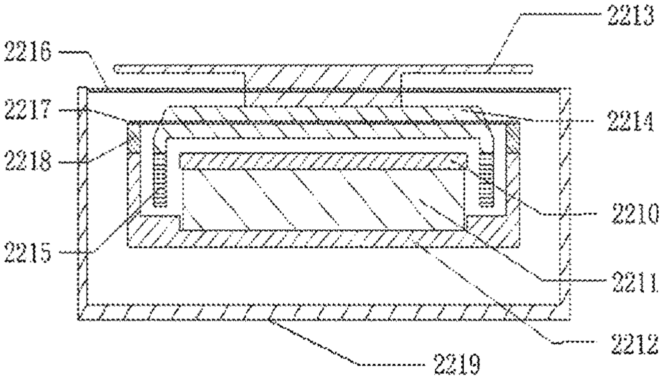
FIG. 46 is a structure diagram illustrating a vibration generating component of an exemplary MP3 player according to some embodiments of the present disclosure.

The contents disclosed in the present disclosure also discloses specific embodiments about the vibration plate, the first vibration conductive plate, and the second vibration conductive plate for the content set forth above. FIG. 46 is a structure diagram illustrating a vibration generating component of an exemplary MP3 player according to some embodiments of the present disclosure. As shown in FIG. 46, an earphone core may include a magnetic circuit system composed of a magnetic conduction plate 2210, a magnet 2211, and a magnetic conductive material 2212, a vibration plate 2214, a coil 2215, a first vibration conductive plate 2216, and a second vibration conductive plate 2217. The panel 2213 (i.e., a side of the core housing close to a user) may protrude from the housing 2219 and be bonded with the vibrating board 2214 by glue. The first vibration conductive plate 2216 may connect and fix the earphone core to the housing 2219 to form a suspension structure.

Figure 47:
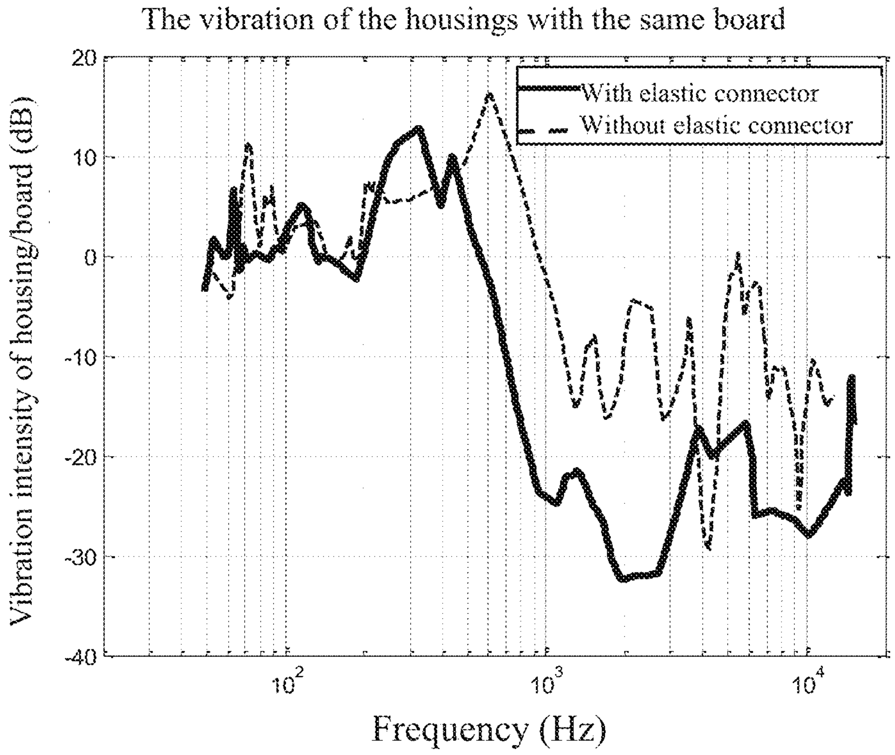
FIG. 47 is a schematic diagram illustrating vibration response curves of a vibration generating component of an exemplary MP3 player according to some embodiments of the present disclosure.
Figure 48:
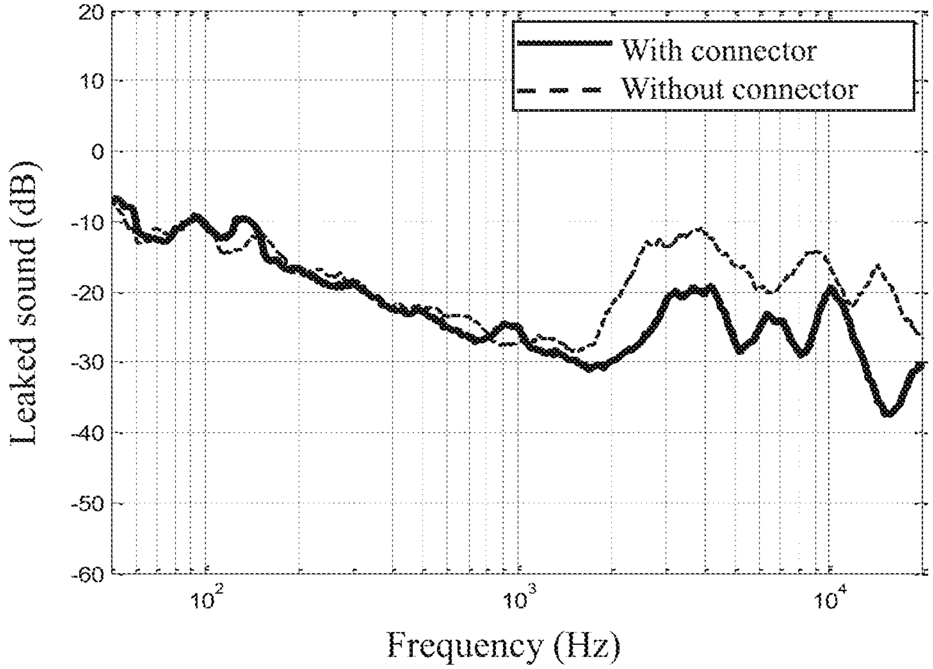
FIG. 48 is schematic diagram illustrating a comparison of a leaked sound in a case of including the first vibration conductive plate and in a case of excluding the first vibration conductive plate according to some embodiments of the present disclosure.

During the working of a bone conductive MP3 player, a triple vibration system composed of the vibration plate 2214, the first vibration conductive plate 2216, and the second vibration conductive plate 2217 may produce a flatter frequency response curve, thereby improving the sound quality of the bone conductive MP3 player. The first vibration conductive plate 2216 may elastically connect the earphone core to the housing 2219, which may reduce the vibration transmitted by the earphone core to the housing, thereby effectively reducing a leaked sound caused by the vibration of the housing, and reducing the influence of the vibration of the housing on the sound quality of the bone conductive MP3 player. FIG. 47 is a schematic diagram illustrating vibration response curves of a vibration generating component of an exemplary MP3 player according to some embodiments of the present disclosure. As used herein, a thick line shows the frequency response of the vibration generating component when the first vibration conductive plate 2216 is used, and a thin line shows the frequency response of the vibration generating component when the first vibration conductive plate 2216 is not used. It may be seen that the vibration of the housing of the bone conductive MP3 player without the first vibration conductive plate 2216 is significantly greater than the vibration of the housing of the bone conductive MP3 player with the first vibration conductive plate 2216 in a frequency range above 500 Hz. FIG. 48 is schematic diagram illustrating a comparison of a leaked sound in a case of including the first vibration conductive plate 2216 and in a case of excluding the first vibration conductive plate 2216 according to some embodiments of the present disclosure. The leaked sound of the speaker device having the first vibration conductive plate 2216 in the intermediate frequency (e.g., about 1000 Hz) is less than the leaked sound of the speaker device without the first vibration conductive plate 2216 in the corresponding frequency range. In some embodiments, when the first vibration conductive plate is used between the panel and the housing, the vibration of the housing may be effectively reduced, thereby reducing the leaked sound. In some embodiments, the first vibration conductive plate may be a material including stainless steel, beryllium copper, plastic, polycarbonate materials, etc. The thickness of the first vibration conductive plate may be in the range of 0.01 mm-1 mm.

Referring to FIG. 40, the transfer relationship K2 between the sensing terminal 1102 and the vibration unit 1103 may also affect the frequency response of the bone conductive MP3 player. The sound heard by the human ear depends on the energy received by the cochlea. The energy is affected by different physical quantities during the transmission process, and may be represented by the following equation (4):

$$P = \iint_S \alpha \cdot f(a, R) \cdot L \cdot ds \tag{4}$$

where, P may be proportional to the energy received by the cochlea, S represents the contact area between the contact surface and the face, a represents a coefficient of dimensional conversion, f (a, R) represents the impact of the acceleration a at a point on the contact area and the closeness R between the contact area and the skin on the energy transmission, and L represents the transmission impedance of mechanical wave at any contact point, that is, L represents the transmission impedance per unit area.

It may be seen from Equation (4) that the sound transmission may be affected by the transmission impedance L, and the vibration transmission efficiency of the bone conductive MP3 player may be related to L. The frequency response curve of the bone conductive MP3 player may be the superposition of the frequency response curve of each point on the contact area. The factors that change the impedance may include the size, shape, roughness, force size, force distribution, etc. of the energy transmission area. For example, the sound transmission effect may be changed by changing the structure and shape of the vibration unit, and the sound quality of the bone conductive MP3 player may be changed. Merely by way of example, changing the corresponding physical characteristics of the contact area of the vibrating unit may achieve the effect of changing the sound transmission.

Figure 49:
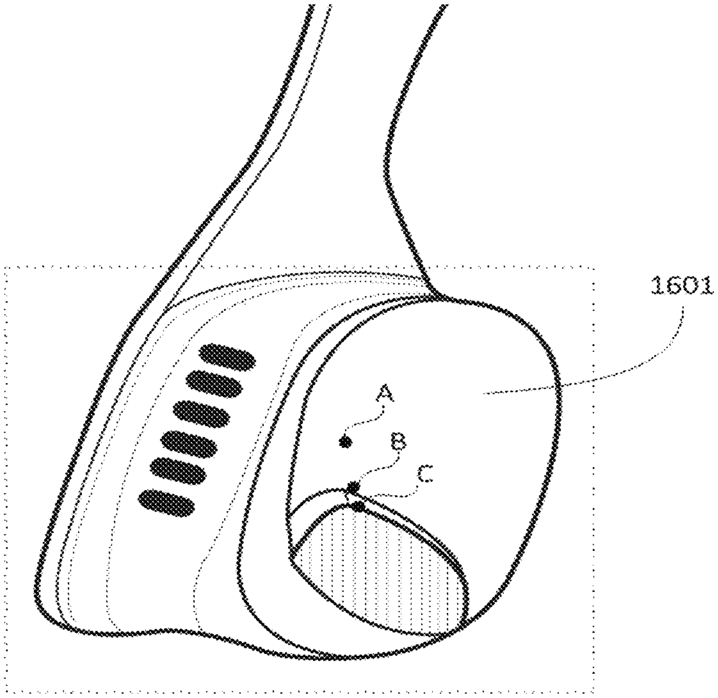
FIG. 49 is a schematic diagram illustrating a contact area of a vibration unit of an exemplary MP3 player according to some embodiments of the present disclosure.

FIG. 49 is a schematic diagram illustrating a contact area of a vibration unit of an exemplary MP3 player according to some embodiments of the present disclosure. In some embodiments, the contact area of the vibration unit in FIG. 49 may be equivalent to the outer wall of the core housing 20 in FIG. 2 that is in contact with the human body. The embodiment may be a concrete embodiment of the transfer relationship K2 between the sensing terminal 1102 and the vibration unit 1103. As shown in FIG. 49, a surface of the contact area may be disposed with a gradient structure. The gradient structure may refer to a region with a high variable surface. The gradient structure may include a convex/concave or stepped structure located outside the contact area (i.e., a side that contacts to the user) or a convex/concave or stepped structure located inside the contact area (i.e., a side facing away from the user). In some embodiment, the contact area of the vibration unit may contact any position of the head (e.g., the top of the head, forehead, a cheek, a horn, an auricle, a back of auricle, etc.) of the user. As shown in FIG. 49, the contact area 1601 (outside the contact area) may have a convex or concave part (not shown in FIG. 49). During the work of the bone conductive MP3 player, the convex or concave part may be in contact with the user, and change the pressure when different positions on the contact area 1601 contact the face. The convex part may be in closer contact with the face of the human. The skin and subcutaneous tissue in contact with the convex part may be subjected to more pressure than that in contact with other parts. Accordingly, the skin and subcutaneous tissue in contact with the concave part may be subjected to less pressure than that in contact with other parts. For example, there are three points A, B, and C on the contact area 1601 in FIG. 49, which are respectively located on the non-convex part, the edge of the convex part, and the convex part of the contact area 1601. During in contact with the skin, the clamping force on the skin at the three points A, B, and C is $F_C > F_A > F_B$. In some embodiments, the clamping force of point B may be 0, that is, point B may not be in contact with the skin. The skin and subcutaneous tissue may show different impedances and responses to sound under different pressures. The impedance ratio may be small at the part with a high pressure, which has a high-pass filtering characteristic for sound waves. The impedance ratio may be large at the part with a low pressure, which has a low-pass filtering characteristic. The impedances L of each part of the contact area 1601 may be different. According to Equation (4), different parts may have different responses to the frequency of sound transmission. The effect of sound transmission through the entire contact area may be equivalent to the sum of sound transmission at each part of the contact area. When the sound is transmitted to the brain, a smooth frequency response curve may be formed, which avoids the occurrence of excessively high resonance peaks at low frequency or high frequency, thereby obtaining an ideal frequency response within the entire sound frequency bandwidth. Similarly, the material and thickness of the contact area 1601 may affect sound transmission, which further affects the sound quality. For example, when the material of the contact area is soft, the effect of sound transmission in the low frequency range may be better than that in the high frequency range. When the material of the contact area is hard, the effect of sound transmission effect in the high frequency range may be better than that in the low frequency range.

Figure 50:
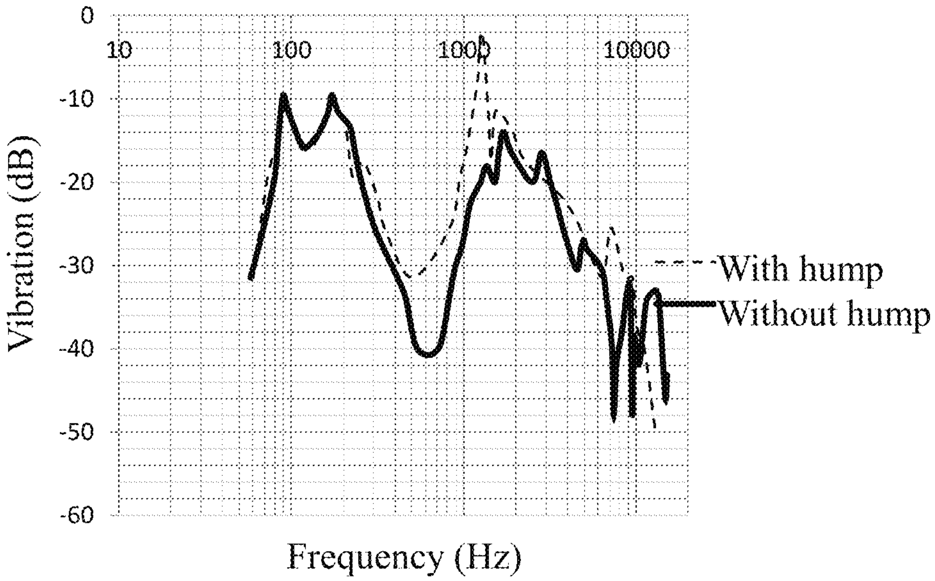
FIG. 50 is a schematic diagram illustrating frequency response curves of an exemplary MP3 player with different contact areas.

FIG. 50 is a schematic diagram illustrating frequency response curves of an exemplary MP3 player with different contact areas. The dashed line corresponds to the frequency response curve of a loudspeaker with a convex structure on the contact area, and the solid line corresponds to the frequency response curve of a loudspeaker with no convex structure on the contact area. In the mid-low frequency range (e.g., in the frequency range of 300 Hz-1000 Hz), the vibration of speaker device without the convex structure may be significantly weakened compared with the vibration of speaker device having the convex structure, forming a "deep pit" on the frequency response curve, which appears to be a non-ideal frequency response, so as to affect the sound quality of the MP3 player.

The illustration of FIG. 50 described above is only an explanation of specific examples. For those skilled in the field, after understanding the basic principles that affect the frequency response of the MP3 player, various amendments and changes may be made to the structure and components of the MP3 player, so as to obtain different effects of frequency response.

It should be noted that, for those having ordinary skills in the art, the shape and structure of the contact area 1601 is not limited to the above description, and may meet other specific requirements. For example, the convex or concave part on the contact area may be distributed on the edge of the contact area, or be distributed in the middle of the contact area. The contact area may include one or more convex or concave parts. The convex and concave parts may be distributed on the contact area at the same time. The material of the convex or concave parts on the contact area may be other materials different from the material of the contact area. The material of the convex or concave parts may be flexible material, rigid material, or more suitable material for generating a specific pressure gradient; or may be memory or non-memory material; or may be a single material or a composite material. The structural graphics of the convex or concave part of the contact area may include axisymmetric graphics, center-symmetric graphics, rotational symmetric graphics, asymmetric graphics, or the like. The structural graphics of the convex or concave part of the contact area may be one kind of graphics, or a combination of two or more kinds of graphics. The surface of the contact area may have a degree of smoothness, roughness, and waviness. The position distribution of the convex or concave part of the contact area may include, but is not limited to, axial symmetry distribution, center symmetry distribution, rotational symmetry distribution, asymmetric distribution, etc. The convex or concave part of the contact area may be on the edge of the contact area, or be distributed inside the contact area.

Figure 51:
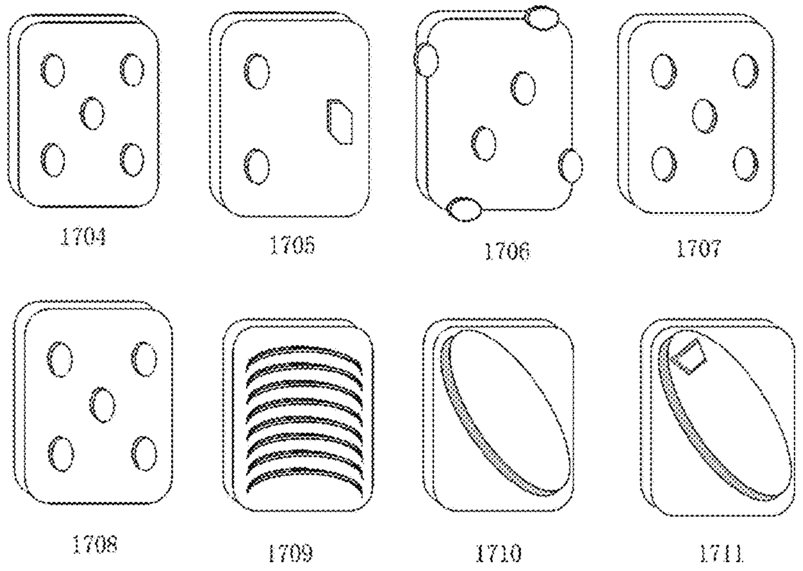
FIG. 51 is a schematic diagram illustrating contact areas of a vibration unit of an exemplary MP3 player according to some embodiments of the present disclosure.

FIG. 51 is a schematic diagram illustrating contact areas of a vibration unit of an exemplary MP3 player according to some embodiments of the present disclosure. As shown in FIG. 51, the figure shows various exemplary structures of the contact area. Schematic diagram 1704 shown in FIG. 51 is an example illustrating a plurality of convexes (also referred to as convex parts) with similar shapes and structures on the contact area. The convexes may include the same or similar materials as the other parts of the panel, or include different materials from the other parts of the panel. In particular, the convexes may be composed of a memory material and a vibration transmission layer material, and the proportion of the memory material may not be less than 10%. In some embodiments, the proportion of the memory material in the convexes may not be less than 50%. The area of a single convex may account for 1%-80% of the total area of the contact area. In some embodiments, the area of the single convex may account for 5%-70% of the total area of the contact area. More In some embodiments, the area of the single convex may account for 8%-40% of the total area of the contact area. The area of all convexes may account for 5%-80% of the total area of the contact area. In some embodiments, the area of all convexes may account for 10%-60% of the total area of the contact area. There may be at least one convex. In some embodiments, there may be one convex. In some embodiments, there may be two convexes. In some embodiments, there may be at least five convexes.

The shape of the convex(es) may be a circle, an oval, a triangle, a rectangle, a trapezoid, an irregular polygon, or other similar graphics. The structure of the convexes (or the convex parts) may be symmetrical or asymmetrical. The position distribution of the convexes (or the convex parts) may be symmetrical or asymmetrical. The count of convexes (or the convex parts) may be one or more. The heights of the convexes (or the convex parts) may be or may not be the same. The heights and distribution of the convexes (or the convex parts) may constitute a certain gradient.

Schematic diagram 1705 shown in FIG. 51 is an example illustrating a structure of convexes (or convex parts) on the contact area that includes two or more graphics. The count of convexes with different graphics may be one or more. Two or more shapes (or graphics) of the convexes may be any two or more combinations of a circle, an oval, a triangle, a rectangle, a trapezoid, an irregular polygon, or other similar graphics. The material, quantity, area, symmetry, etc. of the convexes may be similar to those in schematic diagram 1704.

Schematic diagram 1706 shown in FIG. 51 is an example illustrating a plurality of convexes (or convex parts) distributed at the edge and inside of the contact area. The count of the convexes may not be limited to that shown in FIG. 23. The ratio of the count of convexes located at the edge of the contact area to the total count of convexes may be 1%-80%. In some embodiments, the ratio may be 5%-70%. In some embodiments, the ratio may be 10%-50%. In some embodiments, the ratio may be 30%-40%. The material, quantity, area, shape, symmetry, etc. of the convexes may be similar to those in schematic diagram 1704.

Schematic diagram 1707 shown in FIG. 51 is an example illustrating a structure of concave parts on the contact area. The structure of the concave parts may be symmetrical or asymmetrical. The position distribution of the concave parts may be symmetrical or asymmetrical. The count of concave parts may be one or more. The shape of the concave parts may be the same or different. The concave parts may be hollow. The area of a single concave part may account for 1%-80% of the total area of the contact area. In some embodiments, the area of the single concave part may account for 5%-70% of the total area of the contact area. In some embodiments, the area of the single concave part may account for 8%-40% of the total area of the contact area. The area of all the concave parts may account for 5%-80% of the total area of the contact area. In some embodiments, the area of all the concave parts may account for 10%-60% of the total area of the contact area. There may be at least one concave parts. In some embodiments, there may be one concave part. In some embodiments, there may be two concave parts. In some embodiments, there may be at least five concave parts. The shape of the concave part(s) may include a circle, an oval, a triangle, a rectangle, a trapezoid, an irregular polygon, or other similar graphics.

Schematic diagram 1708 shown in FIG. 51 is an example where a contact area has both convex parts and concave parts. The count of convex parts and/or concave parts may not be limited to one or more. The ratio of the count of concave parts to the count of convex parts may be 0.1-100, 1-80, 5-60, or 10-20. The material, the area, the shape, the symmetry, etc. of a single convex part/concave part may be similar to those in schematic diagram 1704.

Schematic diagram 1709 in FIG. 51 is an example of a contact area with a certain count of ripples. The ripples may be generated by combining more than two convex parts/concave parts, or combining the convex parts and the concave parts. In some embodiments, the distance between adjacent convex parts/concave parts may be equal. In some embodiments, the distance between the convex parts/concave parts may be arranged equally.

Schematic diagram 1710 in FIG. 51 is an example of a contact area having a convex (or convex part) with a large area. The area of the convex may account for 30%-80% of the total area of the contact area. In some embodiments, part of the edge of the convex may be substantially in contact with part of the edge of the contact area.

Schematic diagram 1711 in FIG. 51 is an example of a contact area having a first convex (or convex part) with a larger area and a second convex with a smaller area on the first convex. The larger area of the convex may account for 30%-80% of the total area of the contact area. The smaller area of the convex may account for 1%-30% of the total area of the contact area. In some embodiments, the smaller area of the convex may account for 5%-20% of the total area of the contact area. The smaller area may account for 5%-80% of the larger area. In some embodiments, the smaller area may account for 10%-30% of the larger area.

Figure 52:
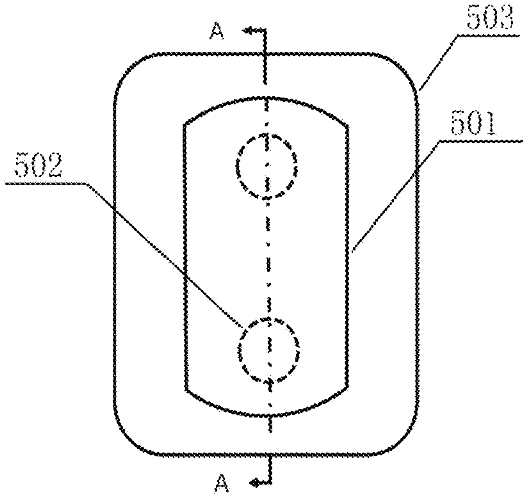
FIG. 52 and FIG. 53 are schematic diagrams respectively illustrating a front view and a side view of a panel and a vibration conductive layer according to some embodiments of the present disclosure.
Figure 53:
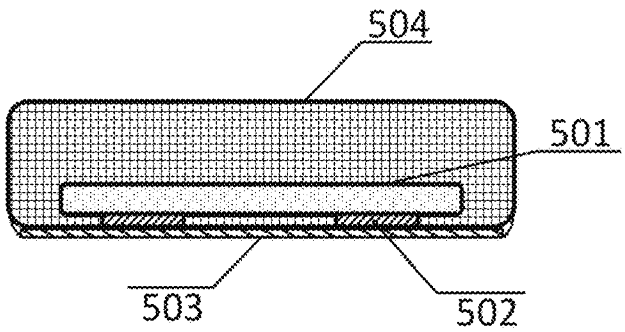

FIG. 52 is a schematic diagram illustrating a front view of a panel and a vibration conductive layer according to some embodiments of the present disclosure. FIG. 53 is a schematic diagram illustrating a side view of a panel and a vibration conductive layer according to some embodiments of the present disclosure.

In some embodiments, a vibration transmission layer may be disposed at an outer surface of a side wall of the core housing 20 that contacts the human. The vibration transmission layer may be a specific embodiment of changing the physical characteristics of the contact area of the vibration unit to change the sound transmission effect. Different regions on the vibration transmission layer may have different transmission effects on vibration. For example, the vibration transmission layer may include a first contact area region and a second contact area region. In some embodiments, the first contact area region may not be attached to the panel, and the second contact area region may be attached to the panel. In some embodiments, when the vibration transmission layer is in contact with the user directly or indirectly, the clamping force on the first contact area region may be less than the clamping force on the second contact area region (the clamping force herein refers to the pressure between the contact area of the vibration unit and the user). In some embodiments, the first contact area region may not be in contact with the user directly, and the second contact area region may be in contact with the user directly and may transmit vibration. The area of the first contact area region may be different from the area of the second contact area region. In some embodiments, the area of the first contact area region may be less than the area of the second contact area region. In some embodiments, the first contact area region may include small holes to reduce the area of the first contact region. The outer surface of the vibration transmission layer (that is, the surface facing the user) may be flat or uneven. In some embodiments, the first contact area region and the second contact area region may not be on the same plane. In some embodiments, the second contact area region may be higher than the first contact area region. In some embodiments, the second contact area region and the first contact area region may constitute a stepped structure. In some embodiments, the first contact area region may be in contact with the user, and the second contact area region may not be in contact with the user. The materials of the first contact area region and the second contact area region may be the same or different. The materials of the first contact area region and/or the second contact area region may include the materials of the vibration transmission layer described above.

The above descriptions of the clamping force on the contact surface are some embodiments of the present the present disclosure. Those skilled in the art can modify the structure and manner described above according to actual needs, and these modifications are still within the protection scope of the present the present disclosure. Inside. For example, the vibration transmission layer may not be necessary, the panel may directly contact the user, and different contact surface areas may be disposed on the panel, and different contact surface areas may have similar characteristic to the first contact surface area and the second contact surface area described above. For another example, a third contact surface area may be disposed on the contact surface, and a structure may be different from structures on the first contact surface area and the second contact surface area may be disposed on the third contact surface area, and the structure can reduce housing vibration, suppress leakage sound, and improve the frequency response curve of the vibrating unit.

As shown in FIGS. 52 and 53, in some embodiments, the panel 501 and the vibration transmission layer 503 may be bonded by glue 502. Glued joints may be located at both ends of the panel 501. The panel 501 may be located in a housing formed by the vibration transmission layer 503 and the housing 504. In some embodiments, a projection of the panel 501 on the vibration transmission layer 503 may be a first contact area region, and a region located around the first contact area region may be a second contact area region.

Figure 54:
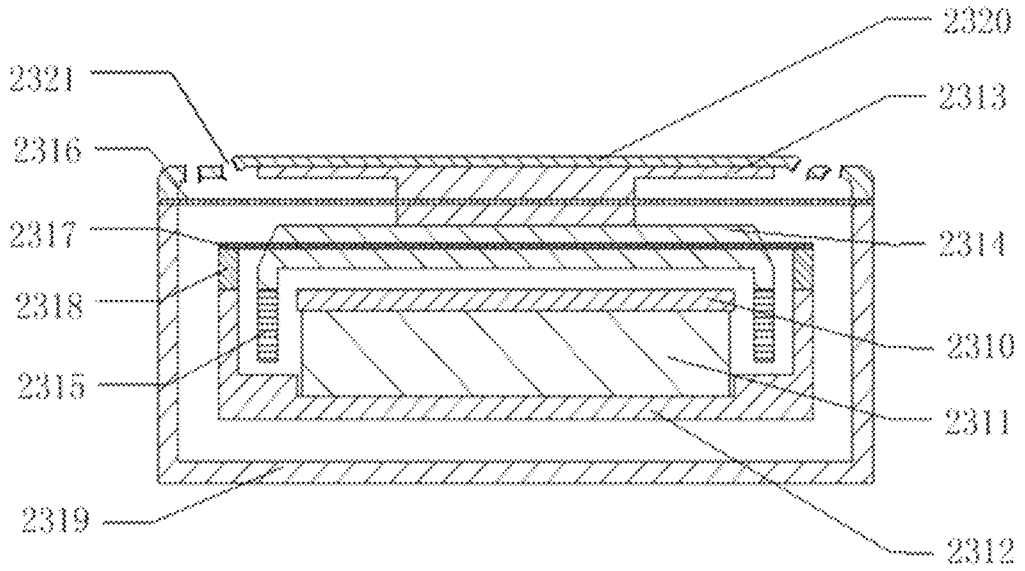
FIG. 54 is a structure diagram illustrating a vibration generating component of an exemplary MP3 player according to some embodiments of the present disclosure.

In some embodiments, as shown in FIG. 54, the earphone core may include a magnetic circuit system consisting of a magnetic conduction plate 2310, a magnet 2311, and a magnetic conductive body 2312. The earphone core may further include a vibration plate 2314, a coil 2315, a first vibration conductive plate 2316, a second vibration conductive plate 2317, and a washer 2318. The panel 2313 may protrude from the housing 2319 and be bonded to the vibration plate 2314 by glue. The first vibration transmission plate 2316 may fix the earphone core to the housing 2319 to form a suspension structure. A vibration transmission layer 2320 (e.g., silica gel) may be added to the panel 2313, and the vibration transmission layer 2320 may generate deformation to adapt to the shape of the skin. A portion of the vibration transmission layer 2320 that is in contact with the panel 2313 may be higher than a portion of the vibration transmission layer 2320 that is not in contact with the panel 2313, thereby forming a stepped structure. One or more small holes 2321 may be disposed on the portion where the vibration transmission layer 2320 does not contact the panel 2313 (a portion where the vibration transmission layer 2320 does not protrude in FIG. 26). The small holes on the vibration transmission layer may reduce the leaked sound. Specifically, the connection between the panel 2313 and the housing 2319 through the vibration transmission layer 2320 may be weakened, and the vibration transmitted from the panel 2313 to the housing 2319 through the vibration transmission layer 2320 may be reduced, thereby reducing the leaked sound generated by the vibration of the housing 2319. The area of the non-protruding portion of the vibration transmission layer 2320 may be reduced by disposing small holes 2321, which may drive less air and reduce the leaked sound caused by air vibration. When the small holes 2321 are disposed on the non-protruding part of the vibration transmission layer 2320, the air vibration in the housing may be guided out of the housing and counteract the air vibration caused by the housing 2319, thereby reducing the leaked sound. It should be noted that, since the small holes 2321 may guide the sound waves in the housing of the composite vibration component, and the guided sound waves may be superimposed with the sound waves from the leaked sound to reduce the leaked sound, the small holes may also be the sound guiding holes.

It should be noted that, in the embodiment, the panel may protrude from the housing of the bone conductive MP3 player. The first vibration conductive plate may be used to connect the panel and the housing of the MP3 player, and the coupling degree between the panel and the housing may be greatly reduced. The first vibration conductive plate may provide a certain deformation, so that the panel has a higher degree of freedom when the panel contacts the user, and may be better adapted to contact surfaces. The first vibration conductive plate may make the panel tilt at a certain angle relative to the housing. Preferably, the tilt angle may not exceed 5°.

Figure 55:
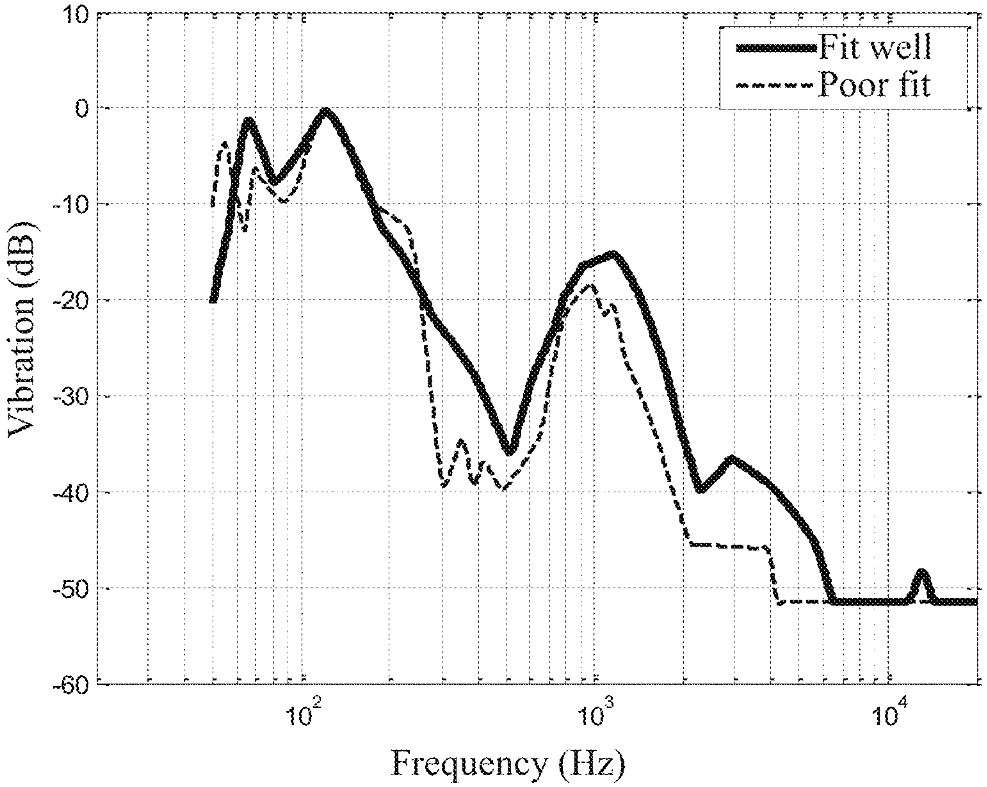
FIG. 55 is a structure diagram illustrating vibration response curves of a vibration generating component of an exemplary MP3 player according to some embodiments of the present disclosure.

Further, the vibration efficiency of the MP3 player may vary with the contact state. Good contact state may have higher vibration transmission efficiency. As shown in FIG. 55, the thick line shows the vibration transmission efficiency in a good contact state, and the thin line shows the vibration transmission efficiency in a poor contact state. In some embodiments, better contact state may have higher vibration transmission efficiency.

Figure 56:
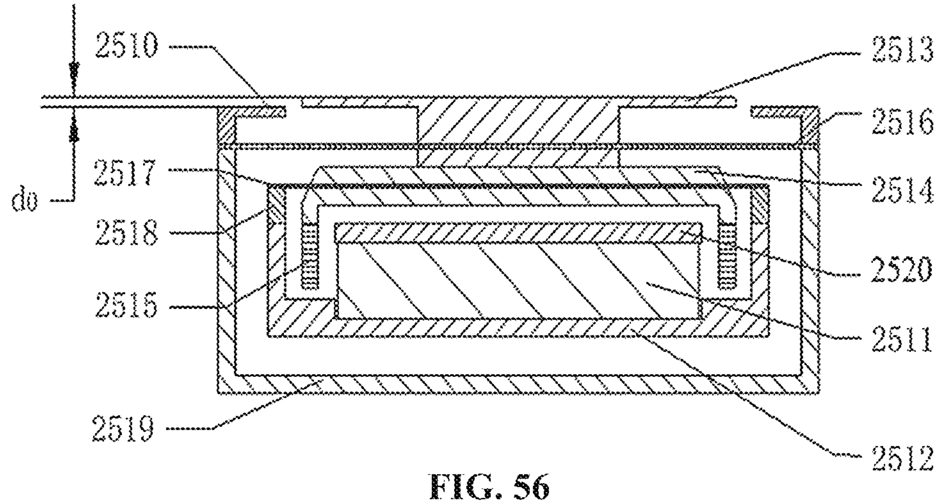
FIG. 56 is a structure diagram illustrating a vibration generating component of an exemplary MP3 player according to some embodiments of the present disclosure.

FIG. 56 is a structure diagram illustrating a vibration generating component of an exemplary MP3 player according to some embodiments of the present disclosure. As shown in FIG. 56, in this embodiment, the earphone core may include a magnetic circuit system composed of a magnetic conduction plate 2510, a magnet 2511 and a magnetic conduction plate 2512, a vibration plate 2514, a coil 2515, a first vibration conductive plate 2516, a second vibration conductive plate 2517, and a washer 2518. The panel 2513 may protrude from the housing 2519, and may be bonded to the vibration plate 2514 by glue. The first vibration piece 2516 may fix the earphone core to the housing 2519 to form a suspension structure.

The difference between the embodiment and the embodiment in FIG. 54 is that an edge is added to the edge of the housing. During the contact between the housing and the skin, the edge may make the force distribution more uniform and increase the wearing comfort of the MP3 player. There is a height difference d0 between the surrounding edge 2510 and the panel 2513. The force of the skin on the panel 2513 may reduce the distance d between the panel 2513 and the surrounding edge 2510. When the pressure between the MP3 player and the user is greater than the force that the first vibration conductive plate 2516 suffers when the deformation of the first vibration conductive plate 2516 is d0, excessive clamping force will be transmitted to the skin through the surrounding edge 2510 without affecting the clamping force of the vibration part, which makes the clamping force more uniform, thereby improving the sound quality.

Under normal circumstances, the sound quality of the MP3 player is affected by various factors, such as the physical properties of the components of the MP3 player, the vibration transmission relationship among the components, the vibration transmission relationship between the MP3 player and the outside world, and the efficiency of the vibration transmission system in transmitting vibration, or the like. The components of the MP3 player may include components that generate vibrations (such as but not limited to transducers), components that fix the MP3 player (such as but not limited to hooks/earphone straps), and components that transmit vibrations (such as but not limited to panels, vibration transmission layer, etc.). The vibration transmission relationship among the components and the vibration transmission relationship between the MP3 player and the outside world are determined by the contact mode between the loudspeaker and the user (such as but not limited to clamping force, contact area, contact shape, etc.).

Figure 57:
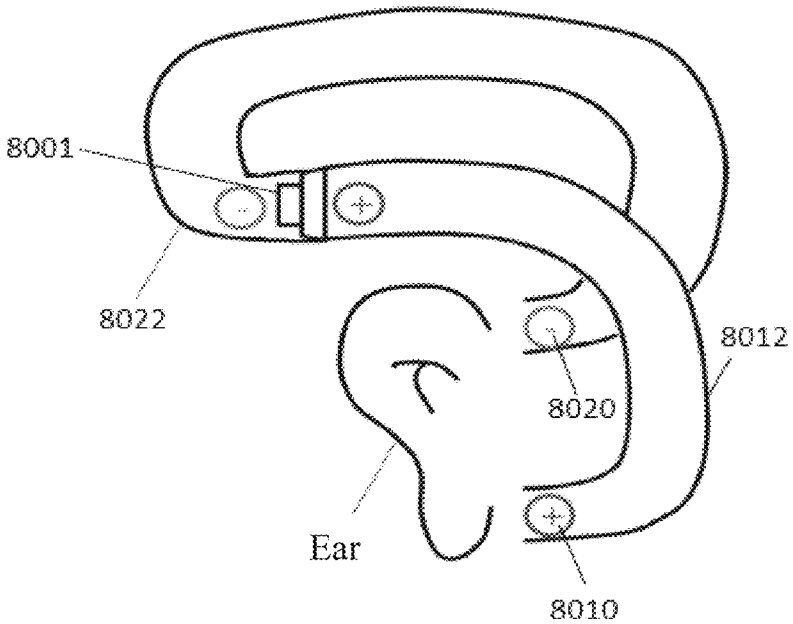
FIG. 57 is a schematic diagram illustrating transmitting sound through air conduction according to some embodiments of the present disclosure.

In some embodiments, the speaker described above may also transmit the sound to the user through air conduction. When the air condition is used to transmit the sound, the speaker device may include one or more sound sources. The sound source may be located at a specific position of the user's head, for example, the top of the head, a forehead, a cheek, a temple, an auricle, the back of an auricle, etc., without blocking or covering an ear canal. FIG. 57 is a schematic diagram illustrating transmitting sound through air conduction according to some embodiments of the present disclosure.

As shown in FIG. 57, a sound source 8010 and a sound source 8020 may generate sound waves with opposite phases ("+" and "−" in the figure may indicate the opposite phases). For brevity, the sound sources mentioned herein may refer to sound outlets of the speaker that may output sounds. For example, the sound source 8010 and the sound source 8020 may be two sound outlets respectively located at specific positions of the speaker (e.g., the core housing 20 or the circuit housing 30).

In some embodiments, the sound source 8010 and the sound source 8020 may be generated by the same vibration device 8001. The vibration device 8001 may include a diaphragm (not shown in the figure). When the diaphragm is driven to vibrate by an electric signal, the front side of the diaphragm may drive air to vibrate. The sound source 8010 may form at the sound output through a sound guiding channel 8012. The back of the diaphragm may drive air to vibrate, and the sound source 8020 may be formed at the sound output hole through a sound guiding channel 8022. The sound guiding channel may refer to a sound transmission route from the diaphragm to the corresponding outlet. In some embodiments, the sound guiding channel may be a route surrounded by a specific structure (e.g., the core housing 20 or the circuit housing 30) on the speaker device. It should be known that in some alternative embodiments, the sound source 8010 and the sound source 8020 may also be generated by different vibrating diaphragms of different vibration devices, respectively.

Among the sounds generated by the sound source 8010 and the sound source 8020, one portion of the sounds may be transmitted to the ear of the user to form the sound heard by the user. Another portion of the sound may be transmitted to the environment to form a leaked sound. Considering that the sound source 8010 and the sound source 8020 are relatively close to the ears of the user, for convenience of description, the sound transmitted to the ears of the user may be referred to as a near-field sound. The leaked sound transmitted to the environment may be referred to as a far-field sound. In some embodiments, the near-field/far-field sounds of different frequencies generated by the speaker device may be related to a distance between the sound source 8010 and the sound source 8020. Generally speaking, the near-field sound generated by the speaker device may increase as the distance between the two sound sources increases, while the generated far-field sound (the leaked sound) may increase as the frequency increases.

For the sounds of different frequencies, the distance between the sound source 8010 and the sound source 8020 may be designed, respectively, so that a low-frequency near-field sound (e.g., a sound with a frequency less than 800 Hz) generated by the speaker device may be as large as possible and a high-frequency far-field sound (e.g., a sound with a frequency greater than 2000 Hz) may be as small as possible. In order to implement the above purpose, the speaker device may include two or more sets of dual sound sources. Each set of the dual sound sources may include two sound sources similar to the sound source 8010 and the sound source 8020, and generate sounds with specific frequencies, respectively. Specifically, a first set of the dual sound sources may be used to generate relatively low frequency sounds. A second set of the dual sound sources may be used to generate relatively high frequency sounds. In order to obtain more low-frequency near-field sounds, the distance between two sound sources in the first set of the dual sound sources may be set with a larger value. Since the low-frequency signal has a relatively long wavelength, the relatively large distance between the two sound sources may not cause a large phase difference in the far-field, and not form excessive leaked sound in the far-field. In order to make the high-frequency far-field sound smaller, the distance between the two sound sources in the second set of the dual sound sources may be set with a smaller value. Since the high-frequency signal has a relatively short wavelength, the smaller distance between the two sound sources may avoid the generation of the large phase difference in the far-field, and thus the generation of the excessive leaked sounds may be avoided. The distance between the second set of the dual sound sources may be less than the distance between the first set of the dual sound sources.

We claim:

1. A speaker device, comprising:

a first housing, a second housing and an ear hook connecting the first housing with the second housing, wherein the ear hook includes a wire and a protective sleeve disposed around periphery of the wire, the wire extending from the first housing to the second housing;

a button disposed at a button hole on the second housing; and an elastic pad disposed between the button and the button hole, the elastic pad being configured to hinder a movement of the button toward the button hole.

2. The speaker device of claim 1, wherein the ear hook further includes an elastic metal wire and the protective sleeve is injection molded around a periphery of the elastic metal wire.

3. The speaker device of claim 2, wherein the ear hook includes a first plug end and a second plug end respectively disposed at two ends of the elastic metal wire, the first plug end is at least partially inserted into the first housing, and the second plug end is at least partially inserted into the second housing.

4. The speaker device of claim 3, wherein the first housing is disposed with a first socket, and the first plug end is connected to the first socket in a plug manner.

5. The speaker device of claim 3, wherein the second housing is disposed with a second socket, and the second plug end is connected to the second socket via a fixing member.

6. The speaker device of claim 5, wherein:

the second plug end is disposed with a slot that is perpendicular to an insertion direction of the second socket, a through hole corresponding to a position of the slot is disposed on a side wall of the second housing, and the wire passes through the slot and the second through hole.

7. The speaker device of claim 6, wherein:
the fixing member includes two pins and a connecting portion configured to connect the two pins, and the two pins are inserted into the slot from outside of the second housing through the through hole to fix the second housing and the second plug end.

8. The speaker device of claim 3, wherein a first wiring channel and a second wiring channel are disposed respectively on the first plug end and the second plug end to extend the wire along the first wiring channel and the second wiring channel after injection molding of the first plug end and the second plug end.

9. The speaker device of claim 2, wherein the ear hook includes at least one fixing sleeve configured to fix the wire on the elastic metal wire.

10. The speaker device of claim 9, wherein the ear hook includes at least two fixing sleeves spaced apart along the elastic metal wire.

11. The speaker device of claim 1, wherein the protective sleeve at least partially covers the first housing or the second housing.

12. The speaker device of claim 11, wherein:
the protective sleeve includes a bag-like structure with an open end; and
the second housing enters an inside of the protective sleeve through the open end of the protective sleeve.

13. The speaker device of claim 12, wherein
the open end of the protective sleeve includes an annular flange that protrudes inward, and
the annular flange abuts against an end of the second housing away from the ear hook when the protective sleeve covers a periphery of the second housing.

14. The speaker device of claim 13, wherein
a sealant is applied to a joint area between the annular flange and the end of the second housing away from the ear hook to connect the protective sleeve and the second housing in a sealed manner.

15. The speaker device of claim 1, wherein
the second housing includes a main side wall and an auxiliary side wall connected to the main side wall;
a first concave region is disposed on the auxiliary side wall, the elastic pad being disposed in the first concave region.

16. The speaker device of claim 15, wherein:
the elastic pad includes a second concave region corresponding to the button hole, and
the second concave region extends to an inside of the button hole.

17. The speaker device of claim 16, wherein:
the button includes a button body and a button contact,
the button contact extends into the second concave region, and
the button body is disposed on a side of the button contact away from the elastic pad.

18. The speaker device of claim 17, wherein
the second housing accommodates a button circuit board,
a button switch corresponding to the button hole is disposed on the button circuit board, and
the button contact is configured to contact with and trigger the button switch when a user presses the button.

19. The speaker device of claim 17, wherein
the button includes at least two button units disposed apart from each other and a connecting part configured to connect the at least two button units, and
the elastic pad includes an elastic convex configured to support the connecting part.

20. The speaker device of claim 17, wherein
the speaker device includes a rigid pad, the rigid pad being disposed between the elastic pad and the second housing, and
the rigid pad includes a first through hole through which the second concave region passes.

* * * * *